(12) United States Patent (10) Patent No.: US 8,929,715 B2
Kobayashi (45) Date of Patent: *Jan. 6, 2015

(54) INFORMATION PROCESSING DEVICE, INFORMATION PROCESSING METHOD, AND PROGRAM

(71) Applicant: Sony Corporation, Tokyo (JP)

(72) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,737

(22) Filed: Aug. 23, 2013

(65) Prior Publication Data

US 2013/0342645 A1 Dec. 26, 2013

Related U.S. Application Data

(63) Continuation of application No. 12/993,510, filed as application No. PCT/JP2010/055133 on Mar. 24, 2010, now Pat. No. 8,559,790.

(30) Foreign Application Priority Data

Apr. 3, 2009 (JP) ................................ 2009-091161
Mar. 3, 2010 (JP) ................................ 2010-046029

(51) Int. Cl.
*H04N 9/80* (2006.01)
*H04N 5/92* (2006.01)
(Continued)

(52) U.S. Cl.
CPC ............ *H04N 9/7921* (2013.01); *G11B 27/329* (2013.01); *H04N 9/8227* (2013.01); *H04N 13/0048* (2013.01); *H04N 13/0055* (2013.01); *H04N 13/0066* (2013.01); *H04N 13/007* (2013.01); *H04N 21/42646* (2013.01); *H04N 21/431* (2013.01); *H04N 21/4325* (2013.01); *H04N 21/4431* (2013.01); *H04N 13/0029* (2013.01); *G11B 2220/2541* (2013.01); *H04N 5/85* (2013.01); *H04N 9/8205* (2013.01)
USPC ............ 386/248; 386/239; 386/244; 386/341

(58) Field of Classification Search
USPC ................. 386/239–248, 326–342, 353–357
See application file for complete search history.

(56) References Cited

U.S. PATENT DOCUMENTS

2007/0292107 A1* 12/2007 Yahata et al. ................... 386/68
2009/0228520 A1* 9/2009 Yahata et al. .............. 707/104.1
(Continued)

FOREIGN PATENT DOCUMENTS

JP 11-191895 7/1999
JP 2004-163447 6/2004
(Continued)

OTHER PUBLICATIONS

U.S. Appl. No. 12/732,343, filed Mar. 26, 2010, Yoshiyuki Kobayashi.
(Continued)

*Primary Examiner* — Hung Dang
(74) *Attorney, Agent, or Firm* — Wolf, Greenfield & Sacks, P.C.

(57) ABSTRACT

The present invention relates to an information processing device, an information processing method, and a program, whereby playback of PG and TextST images can be controlled from a BD-J application. There are defined a mono PG/TextST stream of a PG/TextST image that is a mono image serving as a 2D image, a stereo PG/TextST stream of a PG/TextST image that is a stereo image serving as a 3D image, and a PG/TextST stream for offset of a PG/TextST image that is a mono image to be used for generating a stereo image along with an offset value for giving disparity to the mono image, as a PG/TextST stream of a PG/TextST image. An stream selecting API selects a mono PG/TextST stream, a stereo PG/TextST stream, or a PG/TextST stream for offset. The present invention may be applied to a BD player configured to play a BD, or the like.

3 Claims, 44 Drawing Sheets

(51) Int. Cl.
*H04N 5/76* (2006.01)
*H04N 9/79* (2006.01)
*G11B 27/32* (2006.01)
*H04N 9/82* (2006.01)
*H04N 13/00* (2006.01)
*H04N 21/426* (2011.01)
*H04N 21/431* (2011.01)
*H04N 21/432* (2011.01)
*H04N 21/443* (2011.01)
*H04N 5/85* (2006.01)

(56) References Cited

U.S. PATENT DOCUMENTS

| | | |
|---|---|---|
| 2010/0215347 A1 | 8/2010 | Ikeda et al. |
| 2010/0253680 A1 | 10/2010 | Kobayashi |
| 2010/0253681 A1 | 10/2010 | Kobayashi |
| 2010/0254677 A1 | 10/2010 | Kobayashi |
| 2010/0254678 A1 | 10/2010 | Kobayashi |
| 2010/0254681 A1 | 10/2010 | Ogawa et al. |
| 2011/0064300 A1 | 3/2011 | Kobayashi |
| 2011/0096153 A1 | 4/2011 | Kobayashi |
| 2012/0075416 A1 | 3/2012 | Kobayashi |
| 2012/0275765 A1 | 11/2012 | Ikeda et al. |
| 2013/0343723 A1 | 12/2013 | Kobayashi |
| 2013/0343724 A1 | 12/2013 | Kobayashi |
| 2014/0003793 A1 | 1/2014 | Kobayashi |

FOREIGN PATENT DOCUMENTS

| | | |
|---|---|---|
| WO | WO 2008/038205 A2 | 4/2008 |
| WO | WO 2008/044191 A2 | 4/2008 |

OTHER PUBLICATIONS

U.S. Appl. No. 12/730,532, filed Mar. 24, 2010, Yoshiyuki Kobayashi.

U.S. Appl. No. 12/731,509, filed Mar. 25, 2010, Yoshiyuki Kobayashi.

U.S. Appl. No. 12/731,582, filed Mar. 25, 2010, Yoshiyuki Kobayashi.

U.S. Appl. No. 12/993,538, filed Jan. 13, 2011, Yoshiyuki Kobayashi.

U.S. Appl. No. 12/993,417, filed Dec. 16, 2011, Yoshiyuki Kobayashi.

U.S. Appl. No. 12/993,386, filed Nov. 18, 2010, Yoshiyuki Kobayashi.

Ju et al., A multi-format Blu-ray player SoC in 90nm CMOS. ISSCC Dig. Tech. Papers. Jan. 2009;152-153.

[No Author Listed], Application definition Blu-ray disc format BD-J baseline application and logical model definition for BD-ROM. Mar. 2005;1-45. Last accessed Jun. 18, 2008 via http://www.blurayjukebox.com/pdfs/bdj_gem_application_definition_050307-13404.

* cited by examiner

| Video plane Resolution | | Graphics Plane resolution/color-depth | | Background Plane resolution/color-depth | |
|---|---|---|---|---|---|
| FOR 3D IMAGES | 1920x2160 | 1920x2160 | 32bpp | 1920x2160 | 16bpp/24bpp |
| | 1280x1440 | 1280x1440 | 32bpp | 1280x1440 | 16bpp/24bpp |
| | 1920x2160 | 960x1080 | 32bpp | 960x1080 | 16bpp/24bpp |
| | 720x960 | 720x960 | 32bpp | 720x960 | 16bpp/24bpp |
| | 720x1152 | 720x1152 | 32bpp | 720x1152 | 16bpp/24bpp |
| FOR 2D IMAGES | 1920x1080 | 1920x1080 | 32bpp | 1920x1080 | 16bpp/24bpp |
| | 1920x1080 | 960x540 | 32bpp | 1920x1080 | 16bpp/24bpp |
| | 1280x720 | 1280x720 | 32bpp | 1280x720 | 16bpp/24bpp |
| | 720x480 | 720x480 | 32bpp | 720x480 | 16bpp/24bpp |
| | 720x576 | 720x576 | 32bpp | 720x576 | 16bpp/24bpp |

FIG. 14

| FIELD NAME | NUMBER OF BITS | FORMAT |
|---|---|---|
| initial_configuration_id | 4 | uimsbf |
| initial_graphics_mode | 2 | uimsbf |
| initial_video_mode | 2 | uimsbf |
| initial_background_mode | 2 | uimsbf | uimsbf = unsigned integer most significant bit first

FIG. 15

| initial_configuration_id | initial_video_mode | initial_graphics_mode | initial_background_mode |
|---|---|---|---|
| HD_1920_2160 | STEREO_VIEW | STEREO_VIEW | STEREO_VIEW |
| QHD_960_1080 | STEREO_VIEW | STEREO_VIEW | STEREO_VIEW |
| HD_1280_1440 | STEREO_VIEW | STEREO_VIEW | STEREO_VIEW |
| SD_720_960 | STEREO_VIEW | STEREO_VIEW | STEREO_VIEW |
| SD_720_1152 | STEREO_VIEW | STEREO_VIEW | STEREO_VIEW |
| HD_1920_1080 | MONO_VIEW | MONO_VIEW | MONO_VIEW |
| QHD_960_540 | MONO_VIEW | MONO_VIEW | MONO_VIEW |
| HD_1280_720 | MONO_VIEW | MONO_VIEW | MONO_VIEW |
| SD_720_480 | MONO_VIEW | MONO_VIEW | MONO_VIEW |
| SD_720_576 | MONO_VIEW | MONO_VIEW | MONO_VIEW |

FIG. 16

| # | Video+PG | BD-J graphics | background |
|---|---|---|---|
| 1 | 1920x1080 (legacy) | 1920x1080 (legacy) | 1920x1080 (legacy) |
| 2 | 1280x720 (legacy) | 1280x720 (legacy) | 1280x720 (legacy) |
| 3 | 720x480 (legacy) | 720x480 (legacy) | 720x480 (legacy) |
| 4 | 720x576 (legacy) | 720x576 (legacy) | 720x576 (legacy) |
| 5 | 1920x1080 (legacy) | 960x540 (legacy) | 1920x1080 (legacy) |
| 6 | 1920x2160 (stereo) | 1920x2160 (stereo) | 1920x2160 (stereo) |
| 7 | 1920x2160 (stereo) | 1920x1080 (stereo) | 1920x2160 (stereo) |
| 8 | 1920x2160 (stereo) | 1920x2160 (stereo) | 1920x1080 (dual-mono) |
| 9 | 1920x2160 (stereo) | 1920x1080 (stereo) | 1920x1080 (dual-mono) |
| 10 | 1920x2160 (stereo) | 960x1080 (stereo) | 1920x2160 (stereo) |
| 11 | 1920x2160 (stereo) | 960x540 (offset) | 1920x2160 (stereo) |
| 12 | 1920x2160 (stereo) | 960x1080 (stereo) | 1920x1080 (dual-mono) |
| 13 | 1920x2160 (stereo) | 960x540 (offset) | 1920x1080 (dual-mono) |
| 14 | 1280x1440 (stereo) | 1280x1440 (stereo) | 1280x1440 (stereo) |
| 15 | 1280x1440 (stereo) | 1280x720 (offset) | 1280x1440 (stereo) |
| 16 | 1280x1440 (stereo) | 1280x1440 (stereo) | 1280x720 (dual-mono) |
| 17 | 1280x1440 (stereo) | 1280x720 (offset) | 1280x720 (dual-mono) |
| 18 | 720 x 960 (stereo) | 720 x 960 (stereo) | 720x960 (stereo) |
| 19 | 720x960 (stereo) | 720x480 (offset) | 720x960 (stereo) |
| 20 | 720x960 (stereo) | 720x960 (stereo) | 720x480 (dual-mono) |
| 21 | 720x960 (stereo) | 720x480 (offset) | 720x480 (dual-mono) |
| 22 | 720x1152 (stereo) | 720x1152 (stereo) | 720x1152 (stereo) |
| 23 | 720x1152 (stereo) | 720x576 (offset) | 720x1152 (stereo) |
| 24 | 720x1152 (stereo) | 720x1152 (stereo) | 720x576 (dual-mono) |
| 25 | 720x1152 (stereo) | 720x576 (offset) | 720x576 (dual-mono) |
| 26 | 1920x2160 (flattened stereo) | 1920x2160 (stereo) | 1920x2160 (stereo) |
| 27 | 1920x2160 (flattened stereo) | 1920x1080 (offset) | 1920x2160 (stereo) |
| 28 | 1920x2160 (flattened stereo) | 1920x2160 (stereo) | 1920x1080 (dual-mono) |
| 29 | 1920x2160 (flattened stereo) | 1920x1080 (offset) | 1920x1080 (dual-mono) |
| 30 | 1920x2160 (flattened stereo) | 960x1080 (stereo) | 1920x2160 (stereo) |
| 31 | 1920x2160 (flattened stereo) | 960x540 (offset) | 1920x2160 (stereo) |
| 32 | 1920x2160 (flattened stereo) | 960x1080 (stereo) | 1920x1080 (dual-mono) |
| 33 | 1920x2160 (flattened stereo) | 960x540 (offset) | 1920x1080 (dual-mono) |
| 34 | 1280x1440 (flattened stereo) | 1280x1440 (stereo) | 1280x1440 (stereo) |
| 35 | 1280x1440 (flattened stereo) | 1280x720 (offset) | 1280x1440 (stereo) |

FIG. 17

| 36 | 1280x1440 (flattened stereo) | 1280x1440 (stereo) | 1280x720 (dual-mono) |
|----|------------------------------|---------------------|-----------------------|
| 37 | 1280x1440 (flattened stereo) | 1280x720 (offset) | 1280x720 (dual-mono) |
| 38 | 720x960 (flattened stereo) | 720x960 (stereo) | 720x960 (stereo) |
| 39 | 720x960 (flattened stereo) | 720x480 (offset) | 720x960 (stereo) |
| 40 | 720x960 (flattened stereo) | 720x960 (stereo) | 720x480 (dual-mono) |
| 41 | 720x960 (flattened stereo) | 720x480 (offset) | 720x480 (dual-mono) |
| 42 | 720x576 (flattened stereo) | 720x1152 (stereo) | 720x1152 (stereo) |
| 43 | 720x576 (flattened stereo) | 720x576 (offset) | 720x1152 (stereo) |
| 44 | 720x576 (flattened stereo) | 720x1152 (stereo) | 720x576 (dual-mono) |
| 45 | 720x576 (flattened stereo) | 720x576 (offset) | 720x576 (dual-mono) |
| 46 | 1920x1080 (dual-mono) | 1920x2160 (stereo) | 1920x2160 (stereo) |
| 47 | 1920x1080 (dual-mono) | 1920x1080 (offset) | 1920x2160 (stereo) |
| 48 | 1920x1080 (dual-mono) | 1920x2160 (stereo) | 1920x1080 (dual-mono) |
| 49 | 1920x1080 (dual-mono) | 1920x1080 (offset) | 1920x1080 (dual-mono) |
| 50 | 1920x1080 (dual-mono) | 960x1080 (stereo) | 1920x2160 (stereo) |
| 51 | 1920x1080 (dual-mono) | 960x540 (offset) | 1920x2160 (stereo) |
| 52 | 1920x1080 (dual-mono) | 960x1080 (stereo) | 1920x1080 (dual-mono) |
| 53 | 1920x1080 (dual-mono) | 960x540 (offset) | 1920x1080 (dual-mono) |
| 54 | 1280x720 (dual-mono) | 1280x1440 (stereo) | 1280x1440 (stereo) |
| 55 | 1280x720 (dual-mono) | 1280x720 (offset) | 1280x1440 (stereo) |
| 56 | 1280x720 (dual-mono) | 1280x1440 (stereo) | 1280x720 (dual-mono) |
| 57 | 1280x720 (dual-mono) | 1280x720 (offset) | 1280x720 (dual-mono) |
| 58 | 720x480 (dual-mono) | 720x960 (stereo) | 720x960 (stereo) |
| 59 | 720x480 (dual-mono) | 720x480 (offset) | 720x960 (stereo) |
| 60 | 720x480 (dual-mono) | 720x960 (stereo) | 720x480 (dual-mono) |
| 61 | 720x480 (dual-mono) | 720x480 (offset) | 720x480 (dual-mono) |
| 62 | 720x576 (dual-mono) | 720x1152 (stereo) | 720x1152 (stereo) |
| 63 | 720x576 (dual-mono) | 720x480 (offset) | 720x1152 (stereo) |
| 64 | 720x576 (dual-mono) | 720x1152 (stereo) | 720x576 (dual-mono) |
| 65 | 720x576 (dual-mono) | 720x480 (offset) | 720x576 (dual-mono) |

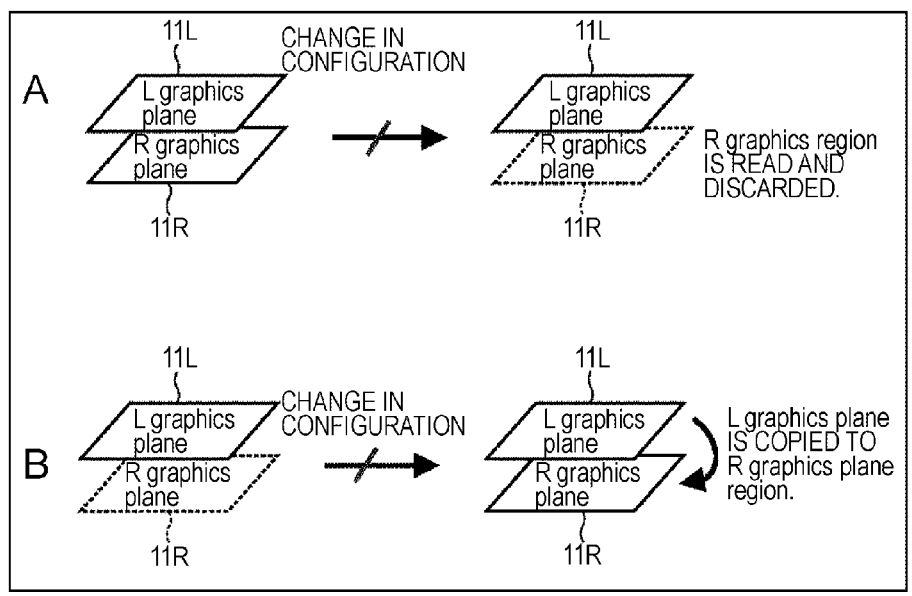

FIG. 27

| CONFIGURATION (VIDEO MODE) | PG | | TextST | |
|---|---|---|---|---|
| | PG stream for offset | Stereo PG stream | Text subtitle stream for offset | Stereo Text subtitle stream |
| MONO VIDEO | SELECTABLE. PLAY WHILE IGNORING Offset | SELECTABLE. ONLY LPG stream IS PLAYED | SELECTABLE. PLAY WHILE IGNORING Offset | SELECTABLE. ONLY LPG stream IS PLAYED |
| FORCED MONO VIDEO | SELECTABLE. PLAY WHILE IGNORING Offset | SELECTABLE. ONLY LPG stream IS PLAYED | SELECTABLE. PLAY WHILE IGNORING Offset | SELECTABLE. ONLY LPG stream IS PLAYED |
| FLATTENED STEREO VIDEO | SELECTABLE. PLAY WHILE IGNORING Offset | SELECTABLE. | SELECTABLE. PLAY WHILE IGNORING Offset | SELECTABLE. |
| DUAL MONO VIDEO | SELECTABLE. PLAY WHILE IGNORING Offset | SELECTABLE. | SELECTABLE. PLAY WHILE IGNORING Offset | SELECTABLE. |
| STEREO VIDEO | SELECTABLE. | SELECTABLE. | SELECTABLE | SELECTABLE. |

FIG. 47

```
public static ImageFrameAccurateAnimation getInstance(
java.awt.Image[] LImages,
java.awt.RctangL LRc,
java.awt.Image[] RImages,
java.awt.RctangL RRc,
AnimationParameters params,
int playmode)
throws java.lang.IlLgalArgumentException,java.lang.NullPointeRxception
CRates an ImageFrameAccurateAnimation with the given parameters. If params.RpeatCount ==
null then the Rpeat count of 1 shall be used instead.
Parameters:
LImages - The set of images to animate in the L graphics plane
LRc - the RctangL for L graphics plane in pixels
RImages - The set of images to animate in the R graphics plane
RRc - the RctangL for R graphics plane in pixels
params - Parameters of this animation. This method makes a copy of the value passed in;
application modifications to this value after this method compLtes will have no effect.
playmode - The playmode of this amimation, e.g. PLAY_ONCE
Throws:
NullPointeRxception - if any of the arguments aR null, or if any entry of images is null
IlLgalArgumentException - if images has zero entries, or if params.RpeatCount is
non-null and has a Lngth that differs from images, or if a value in params.RpeatCount[] < 0, or if
params.scaLFactor is <= 0, or if playmode or params.thRadPriority aR outside their the valid range.
```

FIG. 48

```
public static SyncFrameAccurateAnimation getInstance(
java.awt.RctangL LRc,
java.awt.RctangL RRc,
int numFrames,
AnimationParameters params)
throws java.lang.NullPointeRxception, java.lang.IlLgalArgumentException
CRates a SyncFrameAccurateAnimation with the given parameters.
If params.RpeatCount != null then the values in params.RpeatCount[] aR used in turn. If params.
RpeatCount == null then the Rpeat count of 1 shall be used instead. The size of the Rpeat count
array is unRlated to the number of image buffers. When the end of the array has been Rached,
the impLmentation wraps back to the beginning of the array. This is illustrated in the exampL given
in the class documentation of FrameAccurateAnimation.
Parameters:
LRc - the RctangL for L graphics plane in pixels
RRc - the RctangL for R graphics plane in pixels
numFrames - The number of frames to buffer internally. Must be >= 1
params - Parameters of this animation. This method makes a deep copy of the value passed in;
so any change within the application on the AnimationParameters object that was originally passed
to this method will not affect the params object used within the object cRated heR.
Throws:
NullPointeRxception - if size or params is null.
IlLgalArgumentException - if numFrames < 1 or if lockedToVideo == true, or if params.
RpeatCount.Lngth == 0, or if a value in params.RpeatCount[] < 0, or if all values in params.
RpeatCount[] == 0, or if params.scaLFactor is <= 0, or params.thRadPriority is outside its valid
range..
```

FIG. 49

```
ImageFrameAccurateAnimation for stereo graphics java.awt.Toolkit tk = java.awt.Toolkit.getDefaultToolkit();
    java.awt.Image imgs [] = new java.awt.Image [2];
    imgs[0] = tk.cRateImage(getClass().getClassLoader().getRsource("./a0.png"));
    imgs[1] = tk.cRateImage(getClass().getClassLoader().getRsource("./a1.png"));

java.awt.Dimension d = new java.awt.Dimension(100, 2060);
    int mode = 1;
    org.bluray.ui.AnimationParameters params = new AnimationParameters();
    params.thRadPriority = 5;
    params.scaLFactor = 1;
    params.RpeatCount = null;

org.bluray.ui.ImageFrameAccurateAnimation faa =
        org.bluray.ui.ImageFrameAccurateAnimation.getInstance(imgs, d, params, mode);
    faa.pRpaRImages();
    faa.setBounds(100, 0, 200, 2060);
    scene.add(faa);

faa.start();

...(waiting)...

faa.stop();
    faa.destroy();
    imgs[0].dispose();
    imgs[1].dispose();
    imgs = null;

java.awt.Toolkit tk = java.awt.Toolkit.getDefaultToolkit();
    java.awt.Image imgsL [] = new java.awt.Image [2];
    imgsL[0] = tk.cRateImage(getClass().getClassLoader().getRsource("./l0.png"));
    imgsL[1] = tk.cRateImage(getClass().getClassLoader().getRsource("./l1.png"));
    java.awt.Image imgsR [] = new java.awt.Image [2];
    imgsR[0] = tk.cRateImage(getClass().getClassLoader().getRsource("./r0.png"));
    imgsR[1] = tk.cRateImage(getClass().getClassLoader().getRsource("./r1.png"));

java.awt.RctangL rl = new java.awt.RctangL(100, 100, 100, 100);
    java.awt.RctangL rr = new java.awt.RctangL(100, 1180, 100, 100);
    int mode = 1;
    org.bluray.ui.AnimationParameters params = new AnimationParameters();
    params.thRadPriority = 5;
    params.scaLFactor = 1;
    params.RpeatCount = null;

org.bluray.ui.ImageFrameAccurateAnimation faa =
        org.bluray.ui.ImageFrameAccurateAnimation.getInstance(imgsL, rl, imgsR, rr, params, mode);
    faa.pRpaRImages();
    faa.setBounds(100, 0, 200, 2060);
    scene.add(faa);

faa.start();

...(waiting)...

faa.stop();
```

FIG. 50

```
faa.destroy();
imgsL[0].dispose();
imgsL[1].dispose();
imgsL = null;
imgsR[0].dispose();
imgsR[1].dispose();
imgsR = null;
```

FIG. 51

```
SyncFrameAccurateAnimation for stereo graphics org.bluray.ui.AnimationParameters params = new AnimationParameters();
    params.thRadPriority = 5;
    params.scaLFactor = 1;
    params.RpeatCount = null;
    int numFrames = 300;
    java.awt.Dimension d = new java.awt.Dimension(100, 2060);

org.bluray.ui.SyncFrameAccurateAnimation faa =
        org.bluray.ui.SyncFrameAccurateAnimation.getInstance(d, numFrames, params);

for (long i = 0L; i < numFrames; i++) {
        java.awt.Graphics g = faa.startDrawing(i);
        if (g != null) {
            int c = i % 255;
            g.setColor(new java.awt.Color(c, c, c, 255));
            g.fillRct(100, 0, 200, 1080);
            g.fillRct(100, 1080, 200, 2060);
            faa.finishDrawing(i);
        }
    }
    faa.stop();
    faa.destroy();

org.bluray.ui.AnimationParameters params = new AnimationParameters();
    params.thRadPriority = 5;
    params.scaLFactor = 1;
    params.RpeatCount = null;
    int numFrames = 300;
    java.awt.Dimension d = new Dimension(100, 2060);

org.bluray.ui.SyncFrameAccurateAnimation faa =
        org.bluray.ui.SyncFrameAccurateAnimation.getInstance(d, numFrames, params);

for (long i = 0L; i < numFrames; i++) {
        java.awt.Graphics g = faa.startDrawing(i);
        if (g != null) {
            int c = i % 255;
            g.setColor(new java.awt.Color(c, c, c, 255));
            g.fillRct(100, 0, 200, 1080);
            g.fillRct(100, 1080, 200, 2060);
            faa.finishDrawing(i);
        }
    }
    faa.stop();
    faa.destroy();

org.bluray.ui.AnimationParameters params = new AnimationParameters();
    params.thRadPriority = 5;
    params.scaLFactor = 1;
    params.RpeatCount = null;
    int numFrames = 300;
    java.awt.Dimension d = new java.awt.Dimension(100, 2060);
```

FIG. 52

```
org.bluray.ui.SyncFrameAccurateAnimation faa =
    org.bluray.ui.SyncFrameAccurateAnimation.getInstance(d, numFrames, params);

for (long i = 0L; i < numFrames; i++) {
    java.awt.Graphics g = faa.startDrawing(i);
    if (g != null) {
        int c = i % 255;
        g.setColor(new java.awt.Color(c, c, c, 255));
        g.fillRct(100, 0, 200, 1080);
        g.fillRct(100, 1080, 200, 2060);
        faa.finishDrawing(i);
    }
} faa.stop();
faa.destroy();

org.bluray.ui.AnimationParameters params = new AnimationParameters();
params.thRadPriority = 5;
params.scaLFactor = 1;
params.RpeatCount = null;
int numFrames = 300;
java.awt.RctangL rl = new java.awt.RctangL(100, 100, 100, 100);
java.awt.RctangL rr = new java.awt.RctangL(100, 1180, 100, 100);

org.bluray.ui.SyncFrameAccurateAnimation faa =
    org.bluray.ui.SyncFrameAccurateAnimation.getInstance(rl, rr, numFrames, params);

for (long i = 0L; i < numFrames; i++) {
    java.awt.Graphics g = faa.startDrawing(i);
    if (g != null) {
        int c = i % 255;
        g.setColor(new java.awt.Color(c, c, c, 255));
        g.fillRct(100, 100, 100, 100);
        g.fillRct(100, 1180, 100, 100);
        faa.finishDrawing(i);
    }
}
faa.stop();
faa.destroy();
```

INFORMATION PROCESSING DEVICE, INFORMATION PROCESSING METHOD, AND PROGRAM

CROSS REFERENCES TO RELATED APPLICATIONS

This application claims the benefit under 35 U.S.C. §120 as a continuation of U.S. application Ser. No. 12/993,510, filed on Feb. 3, 2011, which is a national stage filing under 35 U.S.C. §371 of international PCT application PCT/JP2010/055133, filed Mar. 24, 2010, which claims priority to Japanese Patent Application No. 2009-091161, filed in the Japanese Patent Office on Apr. 3, 2009, and claims priority to Japanese Patent Application No. 2010-046029, filed in the Japanese Patent Office Mar. 3, 2010, the entire contents of each of which are incorporated herein by reference.

TECHNICAL FIELD

The present invention relates to an information processing device, an information processing method, and a program, and specifically relates to, for example, an information processing device, an information processing method, and a program, whereby the content of a 3D (Dimension) image can suitably be played from a recording medium.

BACKGROUND ART

For example, 2-dimensional (2D) image contents are the mainstream for contents such as movies, but lately, the 3-dimensional (3D) image (graphics) contents realizing stereoscopic viewing have attracted attention.

There are various types of methods for 3D image (hereafter, also referred to as stereo image) display methods, but regardless of the method employed, the data amount of a 3D image is greater than the data amount of a 2D image.

Also, the contents of high-resolution images such as movies may have a great size, and in order to record such a large-volume image content as a 3D image having great data amount, a large-capacity recording medium needs to be provided.

Examples of such a large-capacity recording medium include Blu-Ray (registered trademark) Discs (hereafter, also referred to as BD) such as BD (Blu-Ray (registered trademark)-ROM (Read Only Memory) and so forth.

With BD, BD-J (BD Java (registered trademark)) can be handled, and according to BD-J, a high-interactive function can be provided (PTL 1).

CITATION LIST

Patent Literature

PTL 1: International Publication No. 2005/052940

SUMMARY OF INVENTION

Technical Problem

Incidentally, with the current BD standard, how to record or play a 3D image content has not yet been stipulated.

However, relegating how to record or play a 3D image content to an author who performs authoring of 3D image contents may result in 3D image contents not being suitably played.

The present invention has been made in light of the above problems, and enables a 3D image content to be suitably played from a recording medium such as BD or the like.

Solution to Problem

An information processing device or program according to an aspect of the present invention is an information processing device or program causing a computer to serve as an information processing device with a video plane configured to store a video image being a storage region where two images worth of image storage regions of an L region that is one image worth of image storage region to store an image for the left eye, and an R region that is one image worth of image storage region to store an image for the right eye, are collaterally disposed; with the configuration of the video plane being defined as to the whole of the video plane that is the two images worth of image storage regions; with as a video mode that is a mode for playing the video image, there being defined five modes of a mono video mode to store, in the case that the video image is a mono image that is a 2D (Dimensional) image, the mono image in one of storage regions of the L region and the R region of the video plane, a dual mono video mode to store, in the case that the video image is the mono image, the mono image in both of the L region and the R region of the video plane, a stereo video mode to store, in the case that the video image is a stereo image that is a 3D image, the image for the left eye and the image for the right eye making up the stereo image in the L region and the R region of the video plane respectively, a flattened stereo video mode to store, in the event that the video image is the stereo image, one of the image for the left eye, and the image for the right eye making up the stereo image in both of the L region and the R region of the video plane, and a forced mono video mode to store, in the event that the video image is the stereo image, one of the image for the left eye, and the image for the right eye making up the stereo image in one storage region of the L region and the R region of the video plane; with as a PG stream of a PG (Presentation Graphics image) image, there being defined a mono PG stream that is a PG stream of the PG image that is a mono image serving as a 2D image, a stereo PG stream that is a PG stream of the PG image that is a stereo image serving as a 3D image, and a PG stream for offset that is a PG stream of the PG image that is the mono image to be used for generating a stereo image along with an offset value that is data for giving disparity to the mono image; with as a Text subtitle stream of a captioned image, there being defined a mono Text subtitle stream that is a Text subtitle stream of the Text subtitle image that is a mono image serving as a 2D image, a stereo Text subtitle stream that is a Text subtitle stream of the Text subtitle image that is a stereo image serving as a 3D image, and a Text subtitle stream for offset that is a Text subtitle stream of the Text subtitle image that is the mono image to be used for generating a stereo image along with an offset value that is data for giving disparity to the mono image; the information processing device or the program including: a stream selecting API (Application Programming Interface) for performing selection of the mono PG stream, the stereo PG stream, or the PG stream for offset, and selection of the mono Text subtitle stream, the stereo Text subtitle stream, or the Text subtitle stream for offset; with the PG stream for offset being selectable even in the event that the video mode is any of the mono video mode, the forced mono video mode, the flattened stereo video mode, the dual mono video mode, and the stereo video mode; with the stereo PG stream being selectable even in the event that the video mode is any of the mono video mode, the forced mono video mode, the flattened stereo video mode, the dual mono video mode, and the stereo video mode; with a case where the video mode is the mono video mode, the forced mono video mode, the flattened stereo video mode, or the dual mono video mode, when the PG stream for offset is selected, the offset value being set to 0, and the mono image corresponding to the PG stream for offset being played; with a case where the video mode is the mono video mode or the forced mono video mode, when the stereo PG stream is selected, one of the image for the left eye and the image for the right eye making up the stereo image corresponding to the stereo PG stream being played; with a case where the video mode is the flattened stereo video mode or the dual mono video mode, when the stereo PG stream is selected, if there is the PG stream for offset having the same stream number that is a number to be assigned thereto as that of the selected stereo PG stream, the offset value being set to 0, and the mono image corresponding to the PG stream for offset thereof being played; with the Text subtitle stream for offset being selectable even in the event that the video mode is any of the mono video mode, the forced mono video mode, the flattened stereo video mode, the dual mono video mode, and the stereo video mode; with the stereo PG stream being selectable even in the event that the video mode is any of the mono video mode, the forced mono video mode, the flattened stereo video mode, the dual mono video mode, and the stereo video mode; with a case where the video mode is the mono video mode, the forced mono video mode, the flattened stereo video mode, or the dual mono video mode, when the Text subtitle stream for offset is selected, the offset value being set to 0, and the mono image corresponding to the PG stream for offset being played; with a case where the video mode is the mono video mode or the forced mono video mode, when the stereo Text subtitle stream is selected, one of the image for the left eye and the image for the right eye making up the stereo image corresponding to the stereo Text subtitle stream being played; and with a case where the video mode is the flattened stereo video mode or the dual mono video mode, when the stereo Text subtitle stream is selected, if there is the Text stream for offset having the stream number that is the same number as that of the selected stereo Text subtitle stream, the offset value being set to 0, and the mono image corresponding to the Text subtitle stream for offset thereof being played.

An information processing method according to an aspect of the present invention is an information processing method, with a video plane configured to store a video image being a storage region where two images worth of image storage regions of an L region that is one image worth of image storage region to store an image for the left eye, and an R region that is one image worth of image storage region to store an image for the right eye, are collaterally disposed; with the configuration of the video plane being defined as to the whole of the video plane that is the two images worth of image storage regions; with as a video mode that is a mode for playing the video image, there being defined five modes of a mono video mode to store, in the case that the video image is a mono image that is a 2D (Dimensional) image, the mono image in one of storage regions of the L region and the R region of the video plane, a dual mono video mode to store, in the case that the video image is the mono image, the mono image in both of the L region and the R region of the video plane, a stereo video mode to store, in the case that the video image is a stereo image that is a 3D image, the image for the left eye and the image for the right eye making up the stereo image in the L region and the R region of the video plane respectively, a flattened stereo video mode to store, in the event that the video image is the stereo image, one of the image for the left eye, and the image for the right eye making up the stereo image in both of the L region and the R region of the video plane, and a forced mono video mode to store, in the event that the video image is the stereo image, one of the image for the left eye, and the image for the right eye making up the stereo image in one storage region of the L region and the R region of the video plane; with as a PG stream of a PG (Presentation Graphics image) image, there being defined a mono PG stream that is a PG stream of the PG image that is a mono image serving as a 2D image, a stereo PG stream that is a PG stream of the PG image that is a stereo image serving as a 3D image, and a PG stream for offset that is a PG stream of the PG image that is the mono image to be used for generating a stereo image along with an offset value that is data for giving disparity to the mono image; with as a Text subtitle stream of a captioned image, there being defined a mono Text subtitle stream that is a Text subtitle stream of the Text subtitle image that is a mono image serving as a 2D image, a stereo Text subtitle stream that is a Text subtitle stream of the Text subtitle image that is a stereo image serving as a 3D image, and a Text subtitle stream for offset that is a Text subtitle stream of the Text subtitle image that is the mono image to be used for generating a stereo image along with an offset value that is data for giving disparity to the mono image; the information processing method including the step of:

performing, with a stream selecting API (Application Programming Interface) for performing selection of the mono PG stream, the stereo PG stream, or the PG stream for offset, and selection of the mono Text subtitle stream, the stereo Text subtitle stream, or the Text subtitle stream for offset, selection of the stereo PG stream or the PG stream for offset, and selection of the mono Text subtitle stream, the stereo Text subtitle stream, or the Text subtitle stream for offset; with the PG stream for offset being selectable even in the event that the video mode is any of the mono video mode, the forced mono video mode, the flattened stereo video mode, the dual mono video mode, and the stereo video mode; with the stereo PG stream being selectable even in the event that the video mode is any of the mono video mode, the forced mono video mode, the flattened stereo video mode, the dual mono video mode, and the stereo video mode; with a case where the video mode is the mono video mode, the forced mono video mode, the flattened stereo video mode, or the dual mono video mode, when the PG stream for offset is selected, the offset value being set to 0, and the mono image corresponding to the PG stream for offset being played; with a case where the video mode is the mono video mode or the forced mono video mode, when the stereo PG stream is selected, one of the image for the left eye and the image for the right eye making up the stereo image corresponding to the stereo PG stream being played; with a case where the video mode is the flattened stereo video mode or the dual mono video mode, when the stereo PG stream is selected, if there is the PG stream for offset having the same stream number that is a number to be assigned thereto as that of the selected stereo PG stream, the offset value being set to 0, and the mono image corresponding to the PG stream for offset thereof being played; with the Text subtitle stream for offset being selectable even in the event that the video mode is any of the mono video mode, the forced mono video mode, the flattened stereo video mode, the dual mono video mode, and the stereo video mode; with the stereo PG stream being selectable even in the event that the video mode is any of the mono video mode, the forced mono video mode, the flattened stereo video mode, the dual mono video mode, and the stereo video mode; with a case where the video mode is the mono video mode, the forced mono video mode, the flattened stereo video mode, or the dual mono video mode, when the Text subtitle stream for offset is selected, the offset value being set to 0, and the mono image corresponding to the PG stream for offset being played; with a case where the video mode is the mono video mode or the forced mono video mode, when the stereo Text subtitle stream is selected, one of the image for the left eye and the image for the right eye making up the stereo image corresponding to the stereo Text subtitle stream being played; and with a case where the video mode is the flattened stereo video mode or the dual mono video mode, when the stereo Text subtitle stream is selected, if there is the Text stream for offset having the stream number that is the same number as that of the selected stereo Text subtitle stream, the offset value being set to 0, and the mono image corresponding to the Text subtitle stream for offset thereof being played.

With the above aspects of the present invention, a video plane configured to store a video image is a storage region where two images worth of image storage regions of an L region that is one image worth of image storage region to store an image for the left eye, and an R region that is one image worth of image storage region to store an image for the right eye, are collaterally disposed, and the configuration of the video plane is defined as to the whole of the video plane that is the two images worth of image storage regions.

Also, as a video mode that is a mode for playing the video image, there are defined five modes of a mono video mode to store, in the case that the video image is a mono image that is a 2D (Dimensional) image, the mono image in one of storage regions of the L region and the R region of the video plane, a dual mono video mode to store, in the case that the video image is the mono image, the mono image in both of the L region and the R region of the video plane, a stereo video mode to store, in the case that the video image is a stereo image that is a 3D image, the image for the left eye and the image for the right eye making up the stereo image in the L region and the R region of the video plane respectively, a flattened stereo video mode to store, in the event that the video image is the stereo image, one of the image for the left eye, and the image for the right eye making up the stereo image in both of the L region and the R region of the video plane, and a forced mono video mode to store, in the event that the video image is the stereo image, one of the image for the left eye, and the image for the right eye making up the stereo image in one storage region of the L region and the R region of the video plane.

Further, as a PG stream of a PG (Presentation Graphics image) image, there are defined a mono PG stream that is a PG stream of the PG image that is a mono image serving as a 2D image, a stereo PG stream that is a PG stream of the PG image that is a stereo image serving as a 3D image, and a PG stream for offset that is a PG stream of the PG image that is the mono image to be used for generating a stereo image along with an offset value that is data for giving disparity to the mono image.

Also, as a Text subtitle stream of a captioned image, there are defined a mono Text subtitle stream that is a Text subtitle stream of the Text subtitle image that is a mono image serving as a 2D image, a stereo Text subtitle stream that is a Text subtitle stream of the Text subtitle image that is a stereo image serving as a 3D image, and a Text subtitle stream for offset that is a Text subtitle stream of the Text subtitle image that is the mono image to be used for generating a stereo image along with an offset value that is data for giving disparity to the mono image.

Subsequently, a stream selecting API (Application Programming Interface) performs selection of the mono PG stream, the stereo PG stream, or the PG stream for offset, and selection of the mono Text subtitle stream, the stereo Text subtitle stream, or the Text subtitle stream for offset.

Here, the PG stream for offset is selectable even in the event that the video mode is any of the mono video mode, the forced mono video mode, the flattened stereo video mode, the dual mono video mode, and the stereo video mode, and the stereo PG stream is selectable even in the event that the video mode is any of the mono video mode, the forced mono video mode, the flattened stereo video mode, the dual mono video mode, and the stereo video mode.

However, in the event that the video mode is the mono video mode, the forced mono video mode, the flattened stereo video mode, or the dual mono video mode, when the PG stream for offset is selected, the offset value is set to 0, and the mono image corresponding to the PG stream for offset is played.

Also, in the event that the video mode is the mono video mode or the forced mono video mode, when the stereo PG stream is selected, one of the image for the left eye and the image for the right eye making up the stereo image corresponding to the stereo PG stream is played.

Further, in the event that the video mode is the flattened stereo video mode or the dual mono video mode, when the stereo PG stream is selected, if there is the PG stream for offset having the same stream number that is a number to be assigned thereto as that of the selected stereo PG stream, the offset value is set to 0, and the mono image corresponding to the PG stream for offset thereof is played.

Also, the Text subtitle stream for offset is selectable even in the event that the video mode is any of the mono video mode, the forced mono video mode, the flattened stereo video mode, the dual mono video mode, and the stereo video mode, and the stereo PG stream is selectable even in the event that the video mode is any of the mono video mode, the forced mono video mode, the flattened stereo video mode, the dual mono video mode, and the stereo video mode.

However, in the event that the video mode is the mono video mode, the forced mono video mode, the flattened stereo video mode, or the dual mono video mode, when the Text subtitle stream for offset is selected, the offset value is set to 0, and the mono image corresponding to the PG stream for offset is played.

Also, in the event that the video mode is the mono video mode or the forced mono video mode, when the stereo Text subtitle stream is selected, one of the image for the left eye and the image for the right eye making up the stereo image corresponding to the stereo Text subtitle stream is played.

Further, in the event that the video mode is the flattened stereo video mode or the dual mono video mode, when the stereo Text subtitle stream is selected, if there is the Text stream for offset having the stream number that is the same number as that of the selected stereo Text subtitle stream, the offset value is set to 0, and the mono image corresponding to the Text subtitle stream for offset thereof is played.

The information processing device may be a stand-alone device, or may be an internal block making up a device.

Also, the program may be provided by being transmitted via a transmission medium, or by being recorded in a recording medium.

Advantageous Effects of Invention

According to the present invention, 3D image contents can suitably be played.

BRIEF DESCRIPTION OF DRAWINGS

FIG. 14 is a diagram illustrating bit fields provided within a BD-J object file to specify a configuration.

FIG. 15 is a diagram illustrating the default stipulated values of initial_video_mode, initial_graphics_mode, and initial_background_mode.

FIG. 16 is a diagram illustrating combinations of the resolutions (image frames) of Video+PG, BD-J graphics, and background of playback other than KEEP_RESOLUTION playback.

FIG. 17 is a diagram illustrating combinations of the resolutions (image frames) of Video+PG, BD-J graphics, and background of playback other than KEEP_RESOLUTION playback.

FIG. 18 is a diagram illustrating examples of change processing of the configurations.

FIG. 19 is a diagram illustrating predetermined initial values of the graphics mode and the background mode.

FIG. 27 is a diagram illustrating a PG playback mode and a TextST playback mode that can be selected in each video mode.

FIG. 47 is a diagram illustrating the definition of extended API of Image Frame Accurate Animation.

FIG. 48 is a diagram illustrating the definition of extended API of Sync Frame Accurate Animation.

FIG. 49 is a diagram illustrating sample code of the Image Frame Accurate Animation.

FIG. 50 is a diagram illustrating the sample code of the Image Frame Accurate Animation.

FIG. 51 is a diagram illustrating sample code of the Sync Frame Accurate Animation.

FIG. 52 is a diagram illustrating the sample code of the Sync Frame Accurate Animation.

DESCRIPTION OF EMBODIMENTS

Description will be made below regarding a case where an embodiment of the present invention has been applied to BD.

Managing Structure of BD

First, with regard to the current BD, description will be made regarding a managing structure (hereafter, also referred to as "BDMV format") such as a content recorded in BD-ROM which is read-only BD, i.e., AV (Audio/Video) data, or the like stipulated in "Blu-ray Disc Read-Only Format Ver1.0 part3 Audio Visual Specifications".

For example, bit streams encoded by an encoding method such as an MPEG (Moving Picture Experts Group) video, MPEG audio, or the like and multiplexed in accordance with MPEG2 system are referred to as clip AV streams (or AV streams). Clip AV streams are recorded in BD as a file by a file system defined with "Blu-ray Disc Read-Only Format part2" that is one of standards regarding BD. The file of clip AV streams is referred to as a clip AV stream file (or AV stream file).

Clip AV stream files are managing units on a file system, and information necessary for playback of (clip AV streams of) a clip AV stream file, and the like are recorded in BD as a database. This database is stipulated in "Blu-ray Disc Read-Only Format part3" that is one of the BD standards.

Figure 1:
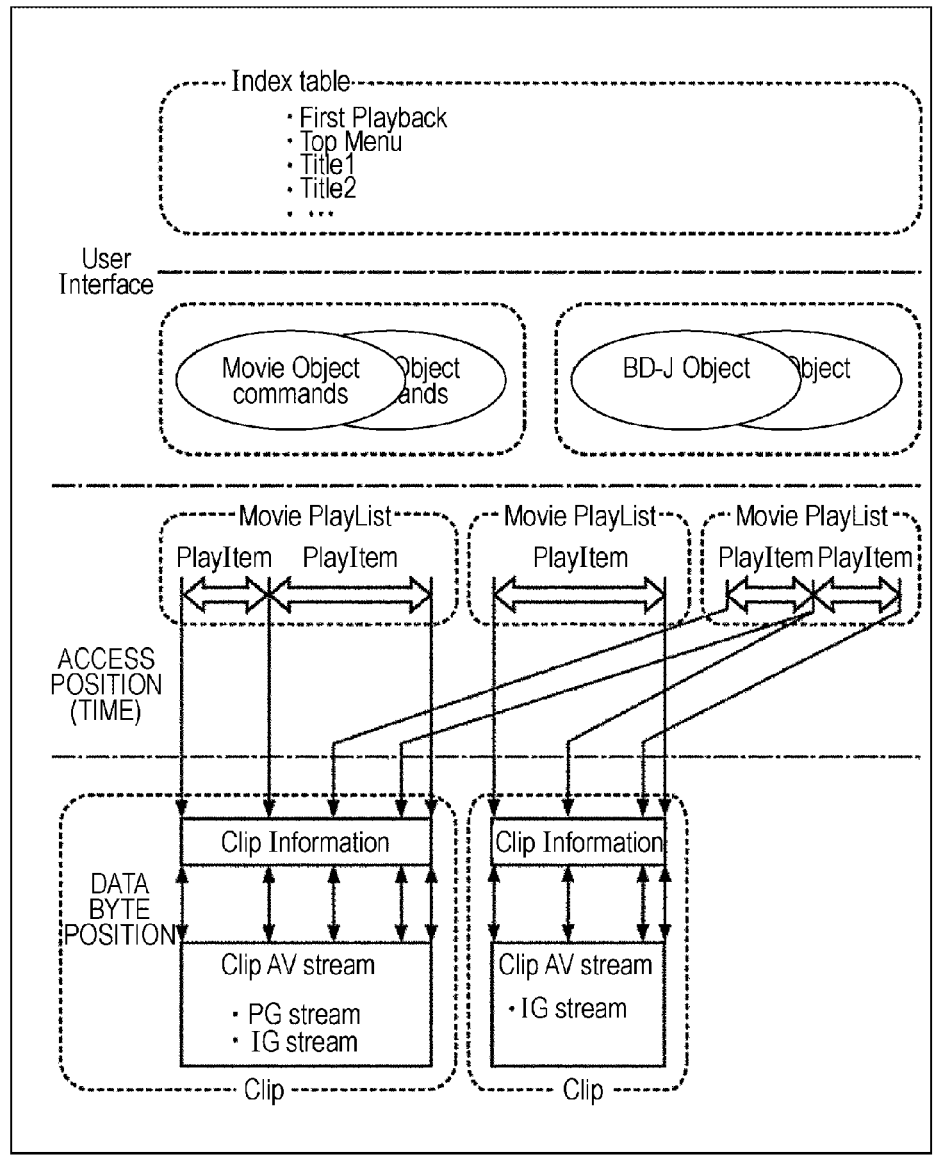
FIG. 1 is a diagram for describing the outline of BDMV format.

FIG. 1 is a diagram for describing the outline of the BDMV format.

The BDMV format is configured of four layers.

The lowermost layer is a layer to which clip AV streams belong, and hereafter, will also be referred to as a clip layer as appropriate.

The layer one above layer of the clip layer is a layer to which playlists (Movie PlayLists) for specifying playback positions as to clip AV streams belong, and hereafter will also be referred to as a playlist layer.

The layer one above the playlist layer is a layer to which movie objects (Movie Objects) made up of a command for specifying playback order as to a playlist, and the like, belong, and hereafter will also be referred to as an object layer.

The layer (uppermost layer) one above the object layer is a layer to which an index table for managing titles and the like to be stored in BD belongs, and hereafter will also be referred to as an index layer.

Description will be further made regarding the clip layer, playlist layer, object layer, and index layer.

Clip AV streams, clip information (Clip Information), and the like belong to the clip layer.

Clip AV streams are streams wherein video data, audio data, which serve as the data of a content, or the like is converted into a TS (MPEG2 TS (Transport Stream)) format.

Clip information (Clip Information) is information relating to clip AV streams, and is recorded in BD as a file.

Note that clip AV streams include graphics streams such as captions, menus, and the like, as necessary.

The stream of (graphics of) a caption is referred to as a presentation graphics (PG (Presentation Graphics)) stream, and the stream of (graphics of) a menu is referred to as an interactive graphics (IG (Interactive Graphics)) stream.

Also, a set of a clip AV stream file, and the file (clip information file) of corresponding clip information (clip information relating to the clip AV streams of the clip AV stream file thereof) is referred to as a clip (Clip).

A clip is a single object configured of clip AV streams and clip information.

Multiple positions including the first and last positions (point-in-time) when laying out a content corresponding to clip AV streams making up a clip on a temporal axis are set as access points. Access points are specified principally with a timestamp by a playlist (PlayList) on the upper layer.

Clip information making up a clip includes the address (logical address) of the position of a clip AV stream represented with the access point that a playlist specified using a timestamp.

Playlists (Movie PlayLists) belong to the playlist layer.

Playlists are configured of an AV stream file to be played, and a play item (PlayItem) including a playback start point (IN point) and a playback end point (OUT point) for specifying a playback position of the AV stream file thereof.

Accordingly, playlists are configured of a group of play items.

Now, playback of a play item means playback of a section of a clip AV stream specified with the IN point and the OUT point included in the play item thereof.

Movie objects (Movie Objects) and BD-J objects (Blu-ray Disc Java (registered trademark) objects) belong to the object layer.

A movie object includes terminal information that correlates a HDMV (High Definition Movie) navigation command program (navigation command) with the movie object thereof.

Navigation commands are commands for controlling playback of playlists. Terminal information includes information for allowing a user's interactive operation as to a BD player for playing BD. With the BD player, user operation such as call-up for a menu, title search, or the like is controlled based on terminal information.

BD-J objects are Java (registered trademark) programs, and can provide a more advanced (sophisticated) interactive function than navigation commands to the user.

An index table (Index table) belongs to the index layer.

The index table is a top-level table for defining the title of a BD-ROM disc.

Entries (fields) of the index table correspond to titles, and a link is provided from each entry to the object (movie object or BD-J object) of the title (HDMV title or BD-J title) corresponding to the entry.

Figure 2:
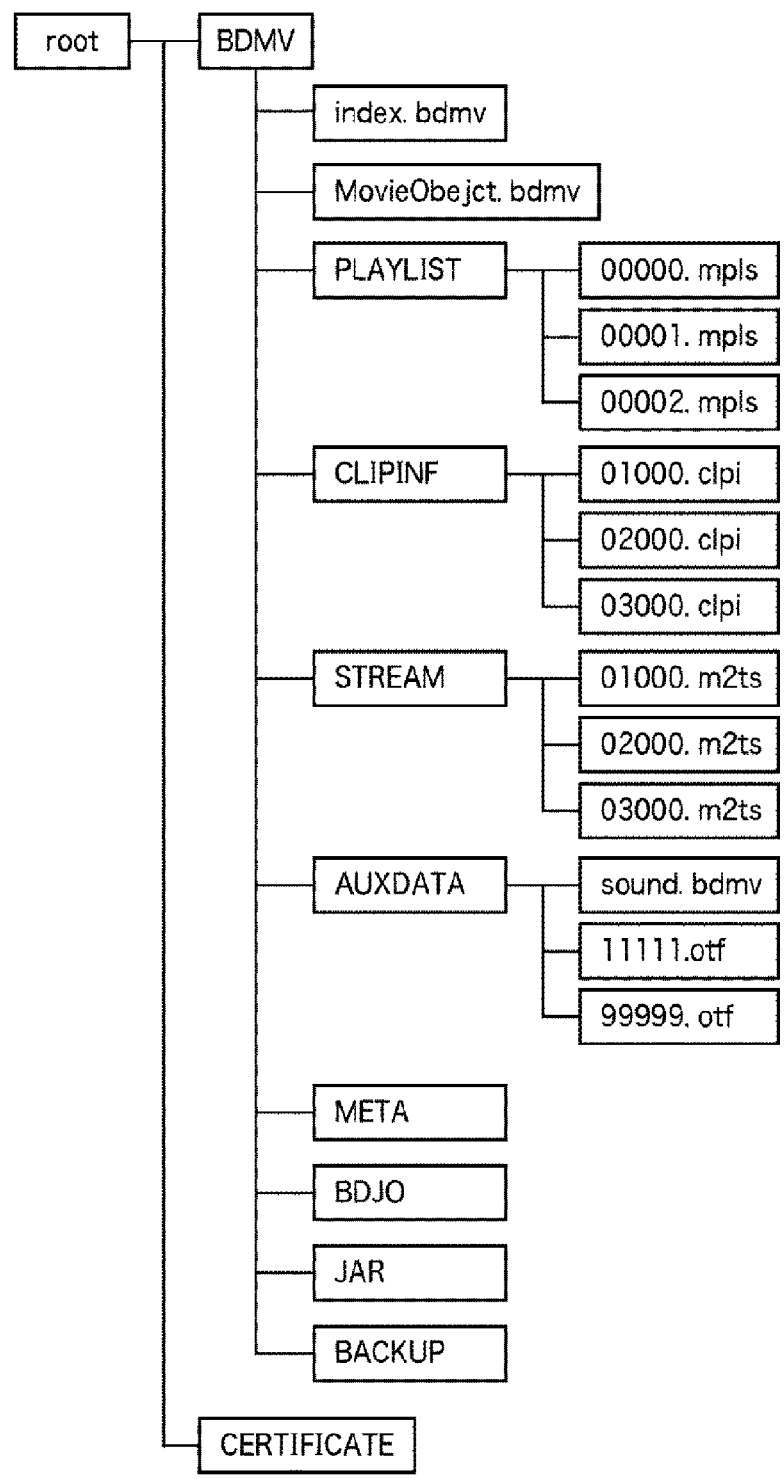
FIG. 2 is a diagram for describing the managing structure of BD files.

FIG. 2 is a diagram for describing the managing structure of a BD file, stipulated by "Blu-ray Disc Read-Only Format Part3".

With BD, files are managed with a directory structure in a hierarchical manner.

Now, in FIG. 2, files (including directories) under a directory mean files immediately under the directory thereof, and files included in a directory mean files immediately under the directory thereof and also files under a so-called subdirectory of the directory thereof.

The highest hierarchical directory of BD is the root directory.

There are a directory "BDMV" and a directory "CERTIFICATE" immediately under the root directory.

Information (files) relating to a copy right is stored in the directory "CERTIFICATE".

Files in the BDMV format described in FIG. 1 are stored in the directory "BDMV".

Two files "index.bdmv" and "MovieObject.bdmv" are stored immediately under the directory "BDMV". Note that files other than "index.bdmv" and "MovieObject.bdmv" (excluding directories) cannot be stored immediately under the directory "BDMV".

The file "index.bdmv" includes the index table described in FIG. 1 serving as information relating to a menu for playing BD.

For example, the BD player plays (the screen of) an initial menu including content items such as playing of all of the contents of BD, playing of a particular chapter alone, repeatedly performing playback, or displaying of a predetermined menu, and the like, based on the file "index.bdmv".

Also, a movie object (Movie Object) to be executed at the time of each item being selected can be set to the file "index.bdmv", and in the case that one item is selected from the initial menu screen by the user, the BD player executes a Movie Object command set to the file "index.bdmv".

The file "MovieObject.bdmv" is a file including the information of a Movie Object. Movie Objects include a command for controlling playback of a PlayList recorded in BD, and for example, the BD player plays a content (title) recorded in the BD by selecting one of the Movie Objects recorded in the BD and executing this.

Directories "PLAYLIST", "CLIPINF", "STREAM", "AUXDATA", "META", "BDJO", "JAR", and "BACKUP" are provided immediately under the directory "BDMV".

A database of playlists is stored in the directory "PLAYLIST". Specifically, playlist files "xxxxx.mpls" are stored in the directory "PLAYLIST". A file name made up of a 5-digit numeral "xxxxx" and an extension "mpls" is used as the file names of playlist files "xxxxx.mpls".

A database of clips is stored in the directory "CLIPINF". Specifically, a clip information file "xxxxx.clpi" as to each of the clip AV stream files is stored in the directory "CLIPINF". A file name made up of a 5-digit numeral "xxxxx" and an extension "clpi" is used as the file names of clip information files "xxxxx.clpi".

Clip AV stream files "xxxxx.m2ts" are stored in the directory "STREAM". TSs are stored in clip AV stream files "xxxxx.m2ts". A file name made up of a 5-digit numeral "xxxxx" and an extension "m2ts" is used as the file names of clip AV stream files "xxxxx.m2ts".

Note that a matched file name excluding its extension is used as the file names of a clip information file "xxxxx.clpi" and a clip AV stream file "xxxxx.m2ts" making up a given clip. Thus, a clip information file "xxxxx.clpi" and a clip AV stream file "xxxxx.m2ts" making up a given clip can be readily specified.

A sound file, a font file, a font index file, a bitmap file, and the like, which are used for display of the menu, are stored in the directory "AUXDATA".

In FIG. 2, a file "sound.bdmv", and files having an extension of "otf" are stored in the directory "AUXDATA".

Predetermined sound data (audio data) is stored in the file "sound.bdmv". This "sound.bdmv" is fixedly used as the file name of the file "sound.bdmv".

Font data used for display of a caption, a BD-J object (application), or the like is stored in the files having the extension "otf". A 5-digit numeral is used as the portion other than the extension of the file names of the files having the extension "otf".

Metadata files are stored in the directory "META". BD-J object files are stored in the directories "BDJO" and "JAR". The backup of a file recorded in BD is stored in the directory "BACKUP".

Hardware Configuration Example of BD Player

Figure 3:
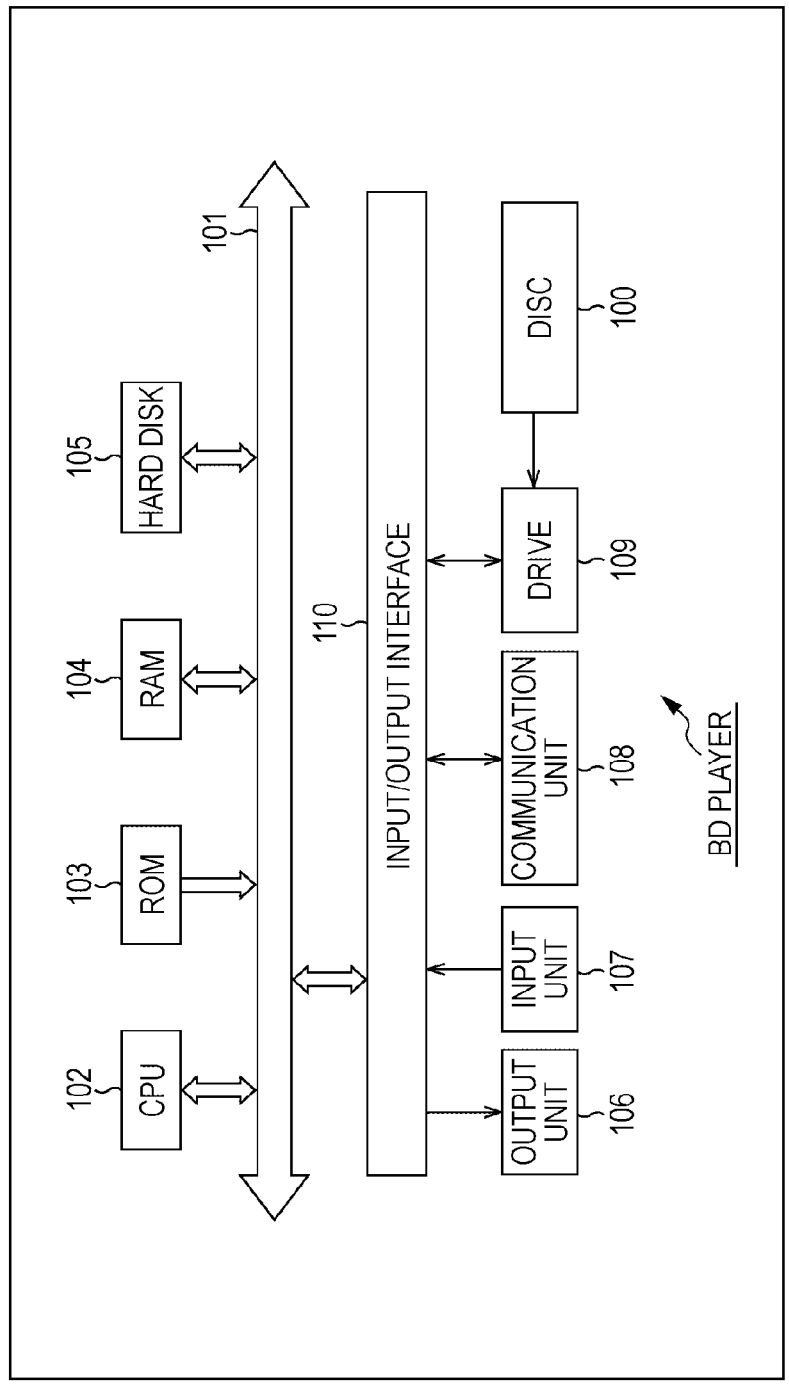
FIG. 3 is a block diagram illustrating a configuration example of the hardware of a BD player.

FIG. 3 is a block diagram illustrating a hardware configuration example of a BD player for playing BD.

The BD player in FIG. 3 is configured so as to perform playback of BD in which a 3D image content is recorded.

A processor (computer) such as a CPU (Central Processing Unit) 102 or the like is embedded in the BD player. An input/output interface 110 is connected to the CPU 102 via a bus 101.

Upon a command being input by an input unit 107 being operated or the like by the user via the input/output interface 110, the CPU 102 executes a program stored in ROM (Read Only Memory) 103 in accordance therewith. Alternatively, the CPU 102 loads a program recorded in a hard disk 105 or disc 100 mounted on a drive 109 to RAM (Random Access Memory) 104, and executes this.

Thus, the CPU 102 performs later-described various types of processing. Subsequently, for example, the CPU 102 outputs the processing results thereof from an output unit 106 via the input/output interface 110, or transmits from a communication unit 108, or further records in the hard disk 105, or the like as necessary.

Note that the input unit 107 is configured of a keyboard, mouse, microphone, or the like. Also, the output unit 106 is configured of an LCD (Liquid Crystal Display), speaker, or the like. The communication unit 108 is configured of a network card or the like.

Now, a program that the CPU 102 executes may be recorded beforehand in the hard disk 105 or ROM 103 serving as a recording medium embedded in the BD player.

Alternatively, the program may be stored (recorded) in a removable recording medium such as the disc 100 or the like. Such a removable recording medium may be provided as so-called packaged software. Here, examples of a removable recording medium include a flexible disk, CD-ROM (Compact Disc Read Only Memory), MO (Magneto Optical) disk, DVD (Digital Versatile Disc), magnetic disk, and semiconductor memory.

Note that in addition to installing the program from such a removable recording medium into the BD player, the program may be downloaded to the BD player via a communication network or broadcast network so as to be installed into the built-in hard disk 105. Specifically, for example, the program may be transferred wirelessly from a download site to the BD player via an artificial satellite for digital satellite broadcasting, or may be transferred by cable to the BD player via a network such as a LAN (Local Area Network), the Internet, or the like.

In FIG. 3, the disc 100 is, for example, BD, where a 3D image content is recorded in a manner maintaining compatibility with BD to be played at a legacy player.

Accordingly, the disc 100 may be played at the legacy player, and also may be played at the BD player in FIG. 3 which is a BD player capable of playing a 3D image content (hereafter, also referred to as "3D-compatible player").

Now, the legacy player is a BD player which can play BD in which a 2D image content is recorded, but is incapable of playing a 3D image content.

With the legacy player, a 2D image content can be played from the disc 100, but a 3D image content cannot be played.

On the other hand, with the BD player in FIG. 3 which is a 3D-compatible player, not only a 2D image content but also a 3D image content can be played from the disc 100.

With the BD player in FIG. 3, upon the disc 100 which is a BD disc being mounted on the drive 109, the CPU 102 performs playback of the disc 100 by controlling the drive 109.

Description of BD-J Application

A BD-J application (BD-J title) (BD-J object) is recorded in the disc 100 (FIG. 3) as one of 3D image contents.

With the BD player in FIG. 3 which is a 3D-compatible player, the CPU 102 executes a Java (registered trademark) virtual machine, and on the Java (registered trademark) virtual machine a BD-J application is executed.

Figure 4:
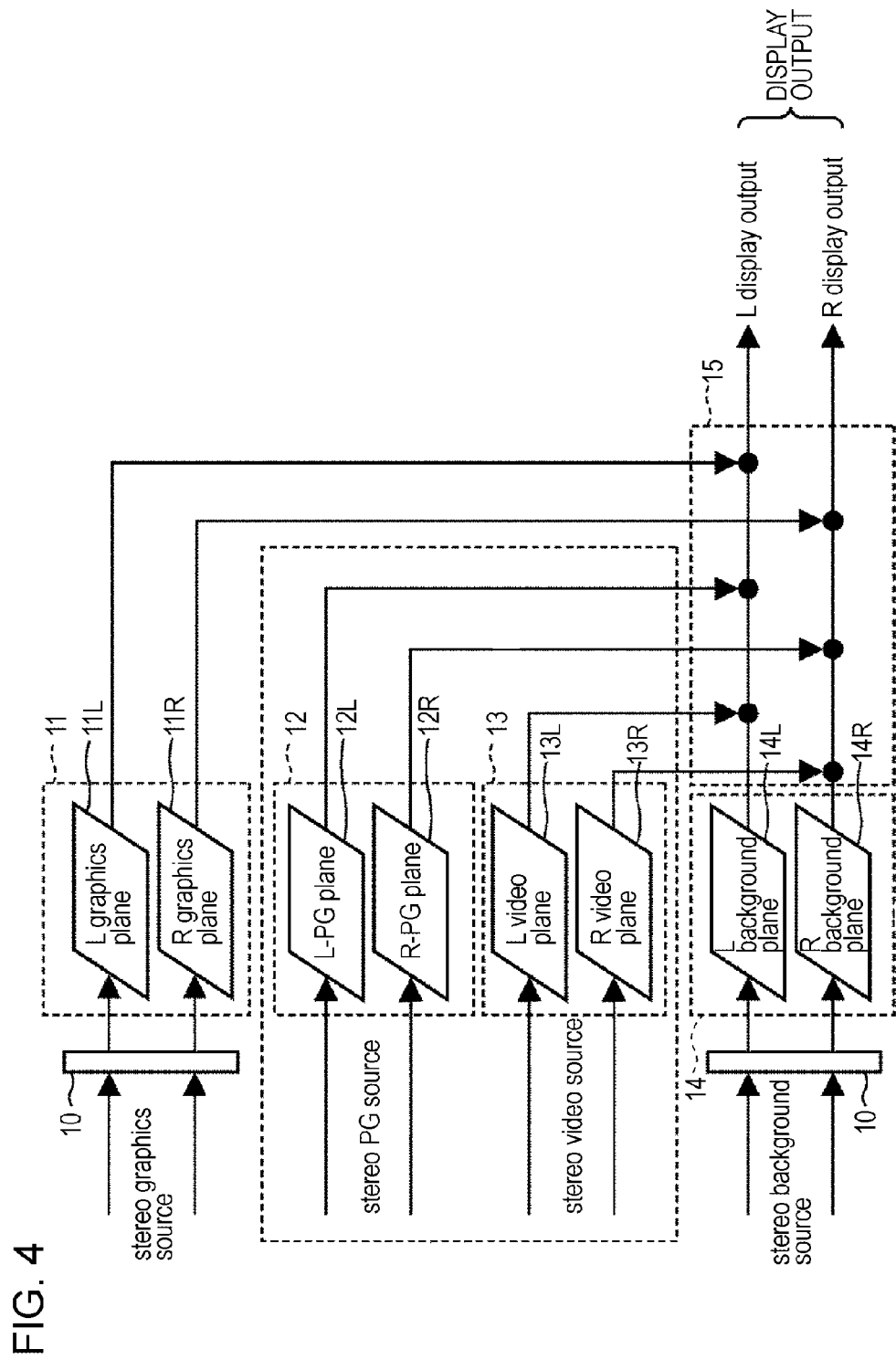
FIG. 4 is a diagram for describing the outline of 3D image processing by a 3D-compatible player.

FIG. 4 is a diagram for describing the outline of 3D image processing by the 3D-compatible player (outline of BD-J stereoscopic graphics).

The 3D-compatible player draws 3D images on a logical plane 10, a PG plane 12, or a video plane 13. Note that the entities of the logical plane 10, PG plane 12, and video plane 13 are, for example, a partial storage region in the RAM 104 in FIG. 3.

Examples of 3D images that the 3D-compatible player draws include BD-J graphics stipulated with BD standard, PG (Presentation Graphics), TextST (Test subtitle), video, and background.

Now, in FIG. 4, a graphics 3D image (stereo graphics source) is configured of an image for the left eye (L(Left)-view) which is an image to be observed by the left eye, and an image for the right eye (R(Right)-view) which is an image to be observed by the right eye.

A PG 3D image (stereo PG source), a video 3D image (stereo video source), and a background 3D image (stereo background source) are also configured of the image for the left eye and the image for the right eye.

Note that the image for the left eye and the image for the right eye making up a video 3D image and the like may be encoded with H.264 AVC (Advanced Video Coding)/(MVC (Multi-view Video coding) or the like, for example.

Now, with H.264 AVC/MVC, image streams called "base view" (Base View) and image streams called "dependent view" (Dependent View) are defined.

Predictive coding with another stream as a reference image is not allowed for base view, but predictive coding with base view as a reference image is allowed for dependent view. Of the image for the left eye and the image for the right eye, for example, the image for the left eye may be taken as base view, and the image for the right eye may be taken as dependent view.

The 3D-compatible player draws a 3D image drawn on the logical plane 10 on the graphics plane 11 or background plane 14.

The graphics plane 11 is configured of an L graphics plane (L(Left) graphics plane) 11L for storing the image for the left eye, and an R graphics plane (R(Right) graphics plane) 11R for storing the image for the right eye.

The image for the left eye making up the graphics 3D image drawn on the logical plane 10 is drawn on the L graphics plane 11L, and the image for the right eye is drawn on the R graphics plane 11R.

Here, the L graphics plane 11L is one image worth of image storage region (L region) for storing an image for L(Left) (image for the left eye) to be observed by the left eye. Also, the R graphics plane 11R is one image worth of image storage region (R region) for storing an image for R(Right) (image for the right eye) to be observed by the right eye.

The entities of the L graphics plane 11L and the R graphics plane 11R, i.e., the entity of the graphics plane 11, is a partial storage region in the RAM 104 in FIG. 3, separate from the logical plane 10.

The PG plane 12, video plane 13, and background plane 14 are also similarly configured.

The PG plane 12 is configured of an L-PG plane (L(Left) PG plane)) 12L for storing the image for the left eye, and an R-PG plane (R(Right) PG plane)) 12R for storing the image for the right eye.

The 3D-compatible player draws the image for the left eye making up a PG 3D image on the L-PG plane 12L, and draws the image for the right eye on the R-PG plane 12R.

The video plane 13 is configured of an L video plane (L(Left) video plane)) 13L for storing the image for the left eye, and an R video plane (R(Right) video plane)) 13R for storing the image for the right eye.

The 3D-compatible player draws the image for the left eye making up a video 3D image on the L video plane 13L, and draws the image for the right eye on the R video plane 13R.

The background plane 14 is configured of an L background plane (L(Left) background plane)) 14L for storing the image for the left eye, and an R background plane (R(Right) background plane)) 14R for storing the image for the right eye.

The image for the left eye making up the background 3D image drawn on the logical plane 10 is drawn on the L background plane 14L, and the image for the right eye is drawn on the R background plane 14R.

The image for the left eye and the image for the right eye drawn (recorded) on the graphics plane 11, PG plane 12, video plane 13, and background plane 14 are supplied to a mixer 15.

The mixer 15 blends (mixes) (synthesizes) the graphics image for the left eye from the graphics plane 11, the PG image for the left eye from the PG plane 12, the video image for the left eye from the video plane 13, and the background image for the left eye from the background plane 14 to output the image for the left eye that are the synthesized result thereof.

Also, the mixer 15 blends and synthesizes the graphics image for the right eye from the graphics plane 11, the PG image for the right eye from the PG plane 12, the video image for the right eye from the video plane 13, and the background image for the right eye from the background plane 14 to output the image for the right eye that are the synthesized result thereof.

The image for the left eye that the mixer 15 outputs is supplied to a display not illustrated in the drawing as display output for left (L(Left) display output). Also, the image for the right eye that the mixer 15 outputs is supplied to the display not illustrated in the drawing as display output for right (R(Right) display output).

With the display not illustrated in the drawing, a 3D image is displayed by the image for the left eye and the image for the right eye from the mixer 15 being alternately or simultaneously displayed.

BD-J applications can perform drawing of images on the graphics plane 11 and the background plane 14, of the graphics plane 11, PG plane 12, video plane 13, and background plane 14.

Now, with the present embodiment, let us say that BD-J applications can access the logical plane 10 alone, and the graphics plane 11 and the background plane 14 are directly inaccessible to BD-J applications.

Accordingly, BD-J applications can perform drawing of images as to the logical plane 10 alone, but cannot perform directly as to the graphics plane 11 and the background plane 14. Therefore, BD-J applications indirectly draw images on the graphics plane 11 or background plane 14 by drawing an image on the logical plane 10.

However, hereafter, for convenience of description, drawing of images as to the graphics plane 11 or background plane 14 via the logical plane 10 by a BD-J application will simply be described as drawing of an image as to the graphics plane 11 or background plane 14.

Note that the 3D-compatible player may be configured so as not to include the logical plane 10. In this case, BD-J applications directly draw images on the graphics plane 11 or background plane 14.

In addition to drawing of images on the graphic plane 11 and the background plane 14, BD-J applications can perform playback control of video and PG such as control of scaling or positions (display positions) of video and PG, and the like.

Note that BD-J applications handle video and PG as a set (collectively). In other words, BD-J applications do not distinguish (is incapable of distinguishing) between video and PG.

Drawing of Graphics Image by BD-J Application

Figure 5:
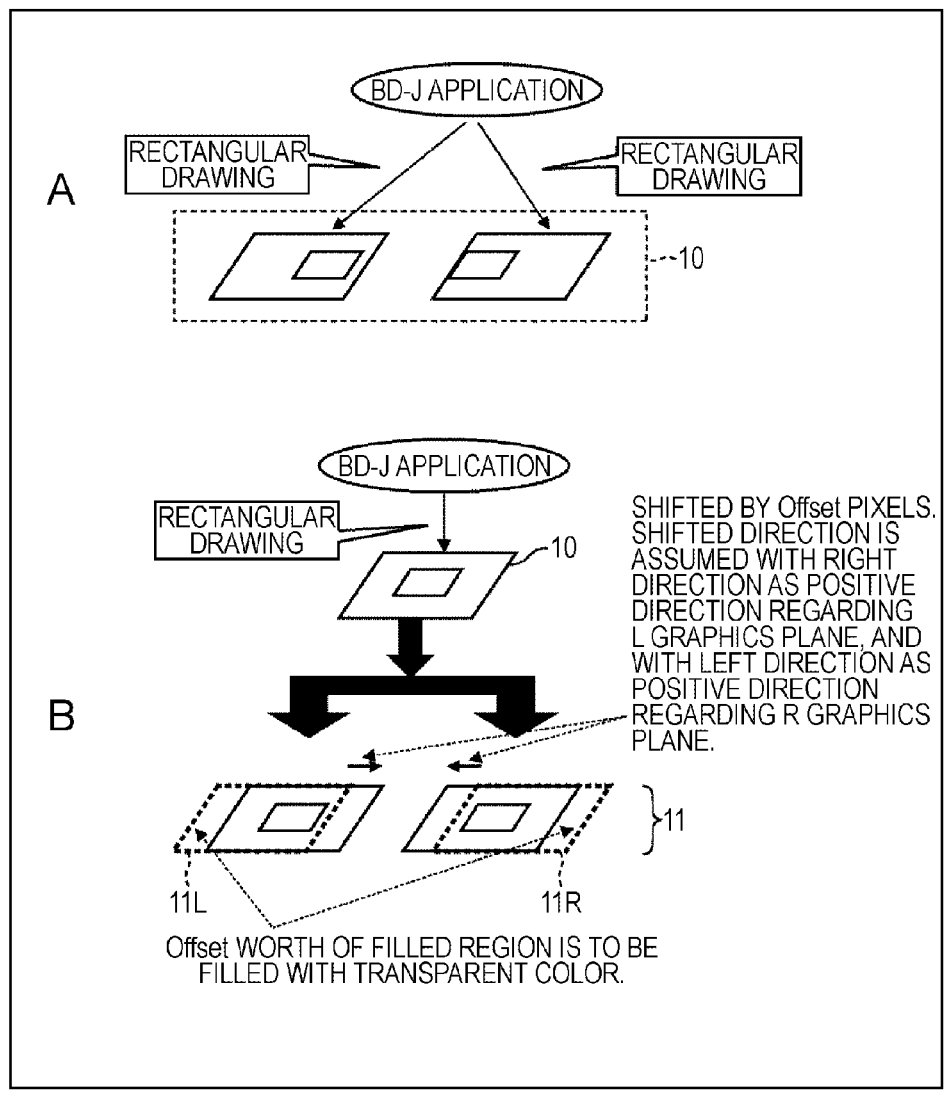
FIG. 5 is a diagram for describing drawing of graphics 3D images on a graphics plane 11 by a BD-J application.

FIG. 5 is a diagram for describing drawing of a graphics 3D image on the graphics plane 11 (Stereoscopic graphics planes) by a BD-J application.

A first drawing method and a second drawing method may be employed as a 3D image drawing method.

A in FIG. 5 is a diagram for describing the first drawing method.

With the first drawing method, the author of a BD-J application performs drawing as to a stereo plane.

Specifically, with the first drawing method, the data of a graphics 3D image is configured of the data of an image for the left eye, and the data of an image for the right eye, and the BD-J application draws the image for the left eye and the image for the right eye on the logical plane 10.

Subsequently, the image for the left eye and the image for the right eye drawn on the logical plane 10 are drawn on the graphics plane 11 without change. Specifically, the image for the left eye drawn on the logical plane 10 is drawn on the L graphics plane 11L without change, and the image for the right eye drawn on the logical plane 10 is drawn on the R graphics plane 11R without change.

B in FIG. 5 is a diagram for describing the second drawing method.

With the second drawing method, the author of a BD-J application performs drawing as to a mono plane. Also, the author supplies an offset value (graphics plane offset value) simultaneously. The 3D-compatible player generates a stereo plane from the mono plane based on the offset value.

That is to say, with the second drawing method, the data of a 3D image is configured of the data of the original image serving as a so-called source for generating a 3D image, and the data of disparity for generating an image for the left eye and an image for the right eye from the original image by applying disparity to the original image.

The BD-J application draws the original image on the logical plane 10. The 3D-compatible player draws the image for the left eye and the image for the right eye, generated by applying disparity to the original image drawn on the logical plane 10, on the L graphics plane 11L and the R graphics plane 11R, respectively.

Now, if we say that the data of disparity is an offset value (offset), the number of pixels to be shifted in the horizontal direction (x direction) from the position of the original image may be employed as this offset value.

With the L graphics plane 11L, the original image drawn on the logical plane 10 is drawn on a position shifted in the horizontal direction by the offset value with the right direction from the left as a positive direction. That is to say, an image obtained as a result of shifting the position in the horizontal direction of the original image drawn on the logical plane 10 by the offset value is drawn on the L graphics plane 11L as an image for the left eye.

With the R graphics plane 11R, the original image drawn on the logical plane 10 is drawn on a position shifted in the horizontal direction by the offset value with the left direction from the right as a positive direction. That is to say, an image obtained as a result of shifting the position in the horizontal direction of the original image drawn on the logical plane 10 by the offset value is drawn on the R graphics plane 11R as an image for the right eye.

Note that the original image drawn on the logical plane 10 is horizontally shifted and drawn on the L graphics plane 11L, and accordingly, a region (pixels) where drawing is not performed occurs within a region to be drawn (a region where drawing is performed in the case of the position in the horizontal direction being not shifted). The region where drawing of the original image is not performed of the L graphics plane 11L is drawn with a transparent color. This is also the same regarding the R graphics plane 11R.

Now, in the case that the offset value is positive, a 3D image displayed with the image for the left eye and the image for the right eye appears to float up toward the near side in the depth direction perpendicular to the display screen of an unshown display. On the other hand, in the case that the offset value is negative, a 3D image displayed with the image for the left eye and the image for the right eye appears to be concaved toward the depth side in the depth direction.

Figure 6:
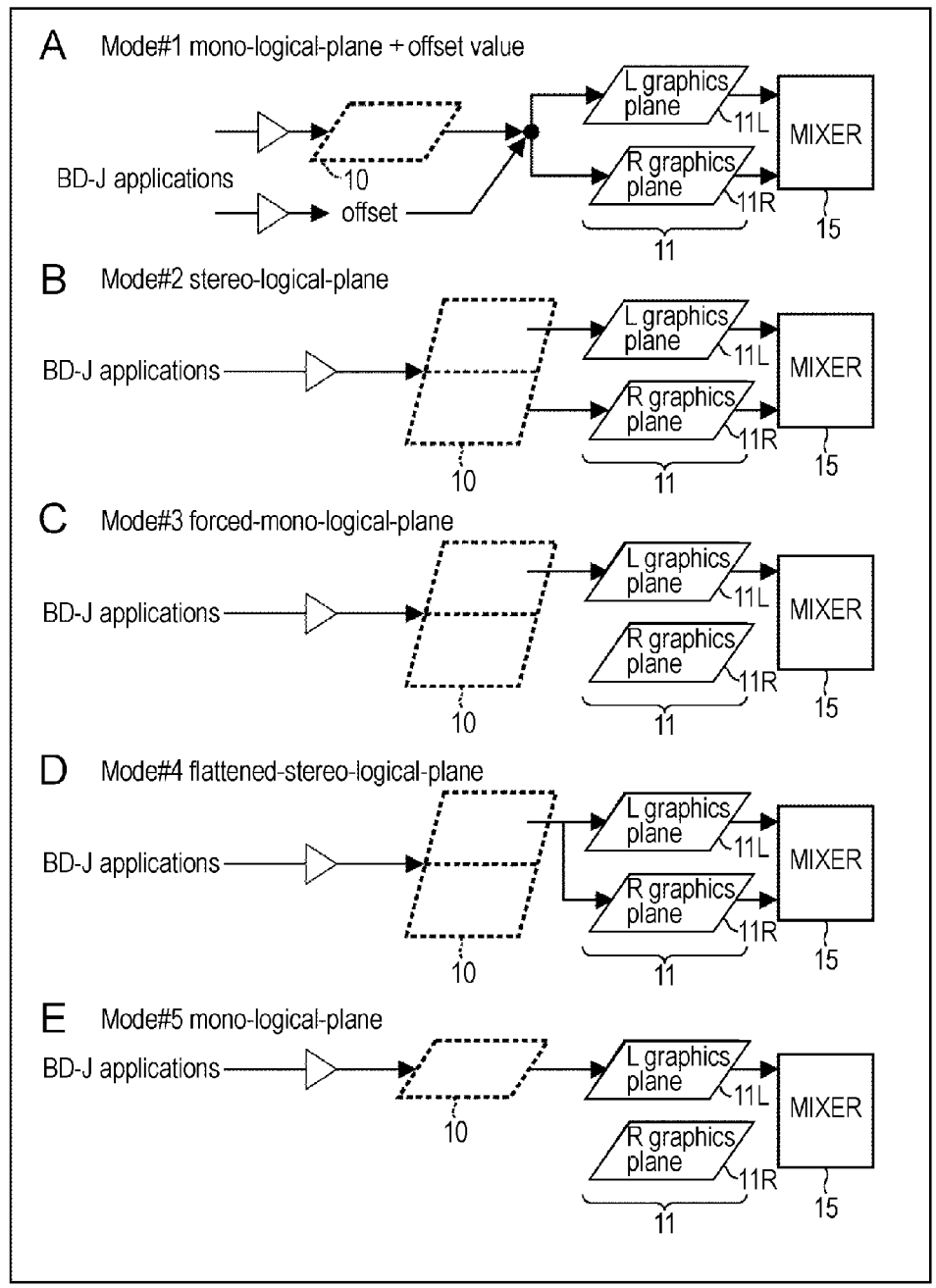
FIG. 6 is a diagram illustrating a graphics mode wherein graphics images are played by a BD-J application drawing the graphics 3D images on the graphics plane 11.

FIG. 6 is a diagram illustrating the graphics mode wherein the BD-J application draws a graphics 3D image on the graphics plane 11, thereby reproducing the graphics image.

Let us specify that with a Reference Decoder Model, the 3D-compatible player constantly includes two planes (L graphics plane 11L and R graphics plane 11R), and BD-J applications perform drawing as to the logical plane 10.

Subsequently, ultimately, the image for the left eye of a graphics drawn on the L graphics plane 11L (L graphics plane) is blended with the image for the left eye of a video (and PG) drawn on the L video plane 13L (L video plane). Also, the image for the right eye of a graphics drawn on the R graphics plane 11R (R graphics plane) is blended with the image for the right eye of a video drawn on the R video plane 13R (R video plane).

A in FIG. 6 illustrates a mono-logical-plane+offset value mode that is one mode Mode#1 of the graphics mode (hereafter, also referred to as "offset graphics mode").

With the offset graphics mode, BD-J applications draw a mono image that is a graphics 2D image on the logical plane 10. Also, BD-J applications give the 3D-compatible player an offset value.

The 3D-compatible player generates a stereo image that is a graphics 3D image from a mono image drawn on the logical plane 10, and the offset value given from a BD-J application. Further, the BD player draws (stores) an image for the left eye making up the stereo image on the L graphics plane 11L (L region), and also draws (stores) an image for the right eye making up the stereo image thereof on the R graphics plane 11R (R region).

Subsequently, the mixer 15 blends the graphics image for the left eye drawn (stored) on the L graphics plane 11L, with the video (and PG) image for the left eye drawn on the L video plane 13L, and outputs the blended result. Further, the mixer 15 blends the graphics image for the right eye drawn on the R graphics plane 11R, with the video image for the right eye drawn on the R video plane 13R, and outputs the blended result.

B in FIG. 6 illustrates a stereo-logical-plane mode that is one mode Mode#2 of the graphics mode (hereafter, also referred to as "stereo graphics mode").

With the stereo graphics mode, BD-J applications draw an image for the left eye and an image for the right eye, which make up a stereo image that is a graphics 3D image, on the logical plane 10.

The 3D-compatible player draws the image for the left eye drawn on the logical plane 10 on the L graphics plane 11L, and also draws the image for the right eye drawn on the logical plane 10 on the R graphics plane 11R.

Subsequently, the mixer 15 blends the graphics image for the left eye drawn on the L graphics plane 11L with the video image for the left eye drawn on the L video plane 13L, and outputs the blended result. Further, the mixer 15 blends the graphics image for the right eye drawn on the R graphics plane 11R with the video image for the right eye drawn on the R video plane 13R, and outputs the blended result.

C in FIG. 6 illustrates a forced-mono-logical-plane mode that is one mode Mode#3 of the graphics mode (hereafter, also referred to as "forced mono graphics mode").

With the forced mono graphics mode, BD-J applications draw a stereo image that is a graphics 3D image on the logical plane 10.

The 3D-compatible player draws one of the L graphics image and the R graphics image of the stereo image drawn on the logical plane 10, e.g., the L graphics image alone on one of the L graphics plane 11L and the R graphics plane 11R, e.g., the L graphics plane 11L alone.

Subsequently, the mixer 15 blends the graphics mono image drawn on the L graphics plane 11L with the video image drawn on the L video plane 13L, and outputs the blended result.

D in FIG. 6 illustrates a flattened-stereo-logical-plane mode that is one mode Mode#4 of the graphics mode (hereafter, also referred to as "flattened stereo graphics mode"). With the flattened stereo graphics mode, BD-J applications draw an image for the left eye and an image for the right eye making up a stereo image that is a graphics 3D image, on the logical plane 10.

The 3D-compatible player draws one of the image for the left eye and the image for the right eye drawn on the logical plane 10, e.g., the image for the left eye alone on both of the L graphics plane 14L and the R graphics plane 14R, and discards the other image for the right eye.

Subsequently, the graphics image for the left eye drawn on the L graphics plane 14L is supplied to the mixer 15, and also the graphics image for the left eye drawn on the graphics plane 14R is also supplied to the mixer 15 (as the image for the right eye).

E in FIG. 6 illustrates a mono-logical-plane mode that is one mode Mode#5 of the graphics mode (hereafter, also referred to as "mono graphics mode").

With the mono graphics mode, BD-J applications draw a mono image that is a graphics 2D image on the logical plane 10.

The 3D-compatible player draws the mono image drawn on the logical plane 10 on one of the L graphics plane 11L and the R graphics plane 11R, e.g., the L graphics plane 11L alone.

Subsequently, the mixer 15 blends the graphics mono image drawn on the L graphics plane 11L with the video image drawn on the L video plane 13L, and outputs the blended result.

Setting and Obtaining of Offset Value

With the 3D-compatible player, the offset value may be applied to the graphics plane 11 and the PG plane 12.

Here, an offset value to be applied to the graphics plane 11 (data to provide disparity to a graphics image) will also be referred to as a graphics plane offset (Graphics plane offset) value. Also, an offset value to be applied to the PG plane 12 (data to provide disparity to a PG image) will also be referred to as a PG plane offset (PG plane offset) value.

With regard to setting/obtaining of the graphics plane offset value, an API dedicated for reading/writing of an offset value such as the following is defined, and accordingly, setting/obtaining of the graphics plane offset value may be performed by the dedicated API thereof.
org.bluray.ui.3D
public void setOffset(int offset)
   The default value is 0.
public int getOffset( )
   The default value is 0.

Note that setOffset( ) method is a method for storing (setting) a graphics plane offset value in an internal storage region that is a storage region provided to the inside of the BD player, and getOffset( ) is a method for obtaining the graphics plane offset value stored in the internal storage region of the BD player.

Also, The BD player has a PSR (Player Setting Register) for storing information relating to playback of BD, and the graphics plane offset value and the PG plane offset value are reserved for legacy player of the PSR, e.g., may be stored in PSR#21.

Here, the entities of the internal storage region and the PSR are a partial storage region of the RAM 104 or hard disk 105 in FIG. 3.

Incidentally, with the current BD standard (BD-ROM standard), writing in the PSR of the BD player from BD-J applications is prohibited.

Allowing the BD player in FIG. 3 which is a 3D-compatible player to perform writing in the PSR from BD-J applications would necessitate revision of the current BD standard on a large scale.

Accordingly, with the 3D-compatible player, writing in the PSR is indirectly enabled by defining the offset value as General Preference.

Specifically, the 3D-compatible player includes General Preference API (Application Programming Interface) for reading/writing of the offset value as to PSR#21 for storing information relating to playback of BD with the offset value that is data for providing disparity to a graphics or PG image conforming to the BD standard as one of general preference (General Preference) conforming to the BD standard.

Here, PSR#21 is mapped to General Preference of BD standard part3-2 Annex L, of which the value may be set or obtained by org.dvb.user.GeneralPreference API.

The general preference name (General Preference name) for accessing the PSR by the General Preference API can be defined as follows.

Specifically, the General Preference name of the graphics plane offset value can be defined, for example, as "graphics offset". Also, the General Preference name of the PG plane offset value can be defined, for example, as "subtitle offset".

Now, let us say that the default values of the "graphics offset" General Preference and the "subtitle offset" General Preference are both 0, for example.

Also, with regard to setting/obtaining of the graphics plane offset value, dedicated API such as the following is defined, and accordingly, setting/obtaining of the graphics plane offset value may be performed by the dedicated API thereof.
org.bluray.ui.3D
public void setOffset(int offset)
   The default value is 0.
public int getOffset( )
   The default value is 0.

Note that setOffset( ) method is a method for storing the graphics plane offset value in the internal storage region (here, e.g., PSR), and getOffset( ) is a method for obtaining the graphics plane offset value stored in the internal storage region of the BD player.

Figure 7:
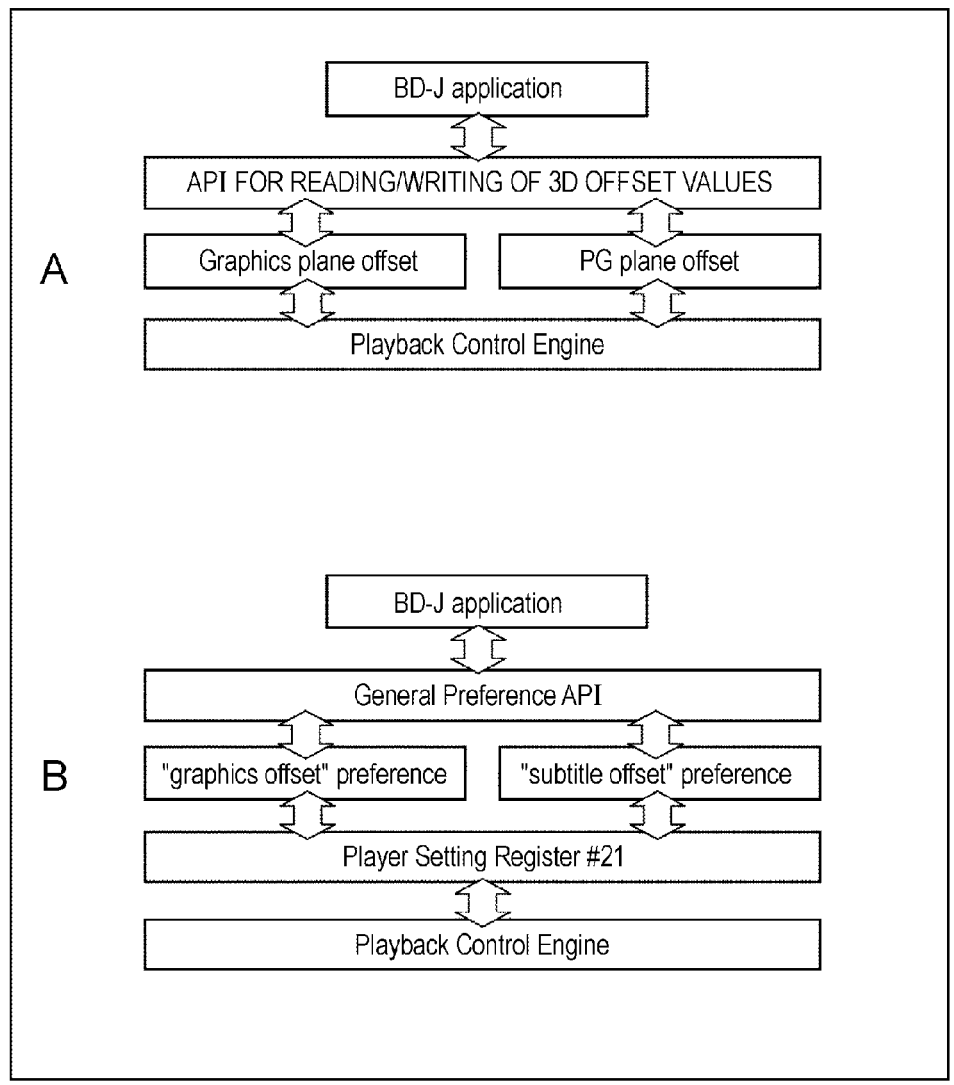
FIG. 7 is a block diagram illustrating a functional configuration example of a 3D-compatible player.

FIG. 7 is a block diagram illustrating a functional configuration example of the BD player in FIG. 3 which is a 3D-compatible player for performing reading/writing of the offset values of graphics and PG (hereinafter, including TextST unless otherwise noted) conforming to the BD standard.

Specifically, A in FIG. 7 is a block diagram illustrating a functional configuration example of the BD player in FIG. 3 which is a 3D-compatible player including an API dedicated for reading/writing an offset value for performing reading/writing of the offset values of the graphics and PG conforming to the BD standard as to the internal storage region of the 3D-compatible player.

With the 3D-compatible player in A in FIG. 7, a BD-J application requests the API dedicated for reading/writing of an offset value (General Preference API) of reading/writing (setting or obtaining) of the offset value.

In response to the request from the BD-J application, the API dedicated for reading/writing of an offset value sets the offset value (graphics plane offset value, PG plane offset value) to the internal storage region of the 3D-compatible player, or obtains the offset value from the internal storage region of the 3D-compatible player, and returns this to the BD-J application.

Note that in A in FIG. 7, according to the offset value set to the internal storage region of the 3D-compatible player, the play back control engine (Playback Control Engine) performs control for generating (playing) an image for the right eye and an image for the left eye from the image (original image) drawn on the logical plane by the BD-J application.

As described above, the API dedicated for reading/writing of an offset value is defined, the API dedicated for reading/writing of an offset value thereof performs, in response to the request from a BD-J application, reading/writing of an offset value that is data for providing disparity to the graphics and PG images conforming to the BD standard as to the internal storage region of the 3D-compatible player, whereby the offset value for providing disparity to the image can indirectly be set or obtained from the BD-J application.

B in FIG. 7 is a block diagram illustrating a functional configuration example of the BD player in FIG. 3 which is a 3D-compatible player including the General Preference API for performing reading/writing of an offset value as to PSR#21 with the offset values of graphics and PG conforming to the BD standard as one of General Preferences conforming to the BD standard.

With the 3D-compatible player in B in FIG. 7, a BD-J application requests the General Preference API of reading/writing (setting or obtaining) of an offset value.

Specifically, in the case that the offset value to be read/written is the graphics plane offset value, the BD-J application calls up the General Preference API with the general preference name (General Preference name) as "graphics offset".

Also, in the case that the offset value to be read/written is the PG plane offset value, the BD-J application calls up the General Preference API with the General Preference name as "subtitle offset".

In response to the request from the BD-J application, the General Preference API sets the offset value to PSR#21 of the PSR (Player Setting Register), or obtains the offset value from PSR#21 to return this to the BD-J application.

Note that, in B in FIG. 7, playback control engine (Playback Control Engine) performs control for generating (playing) an image for the left eye and an image for the right eye from an image (original image) that the BD-J application drew on the logical plane 10, according to the offset value set to PSR#21.

As described above, according to a request from the BD-J application, the General Preference API performs reading/writing of the offset value as to PSR#21 storing information relating to playback of BD with the offset value that is data giving disparity to graphics and PG images conforming to the BD standard as one of General Preferences conforming to the BD standard, whereby the offset value giving disparity to an image can indirectly be set or obtained from the BD-J application.

Configurations

Figure 8:
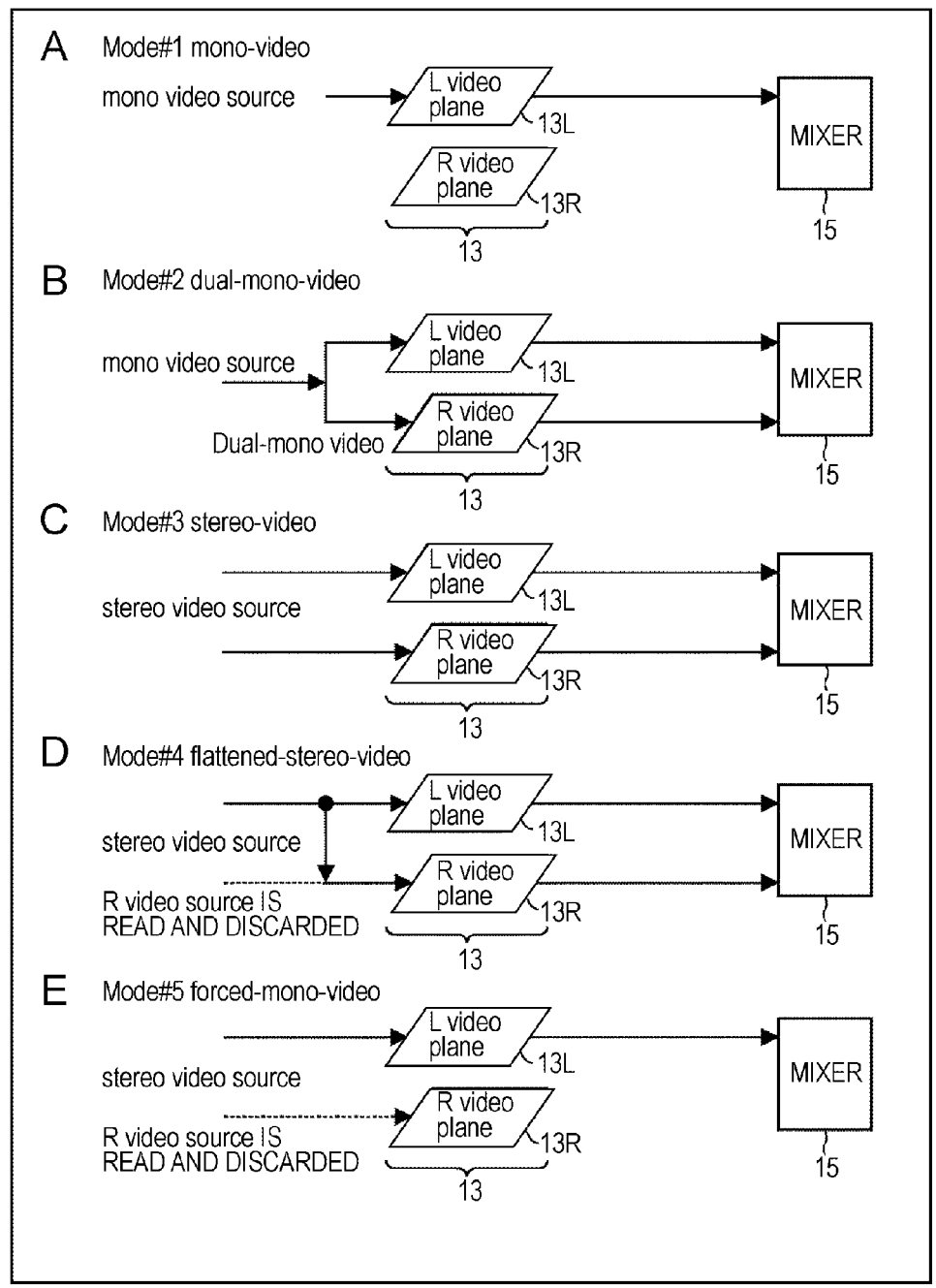
FIG. 8 is a diagram illustrating a video mode serving as one of configurations wherein a video image is played.

FIG. 8 is a diagram illustrating a video mode for playing video images that is one of the configurations (configuration) of the video plane 13.

A in FIG. 8 illustrates a mono-video mode (hereafter, also referred to as "mono video mode") that is one mode Mode#1 of the video mode.

With the mono video mode, the 3D-compatible player draws (stores) a mono image that is a video 2D image on one of the L video plane 13L (L region) and the R video plane 13R (R region), e.g., the L video plane 13L alone.

Subsequently, the video mono image drawn (stored) on the L video plane 13L alone is supplied to the mixer 15.

B in FIG. 8 illustrates a dual-mono-video mode (hereafter, also referred to as "dual mono video mode") that is one mode Mode#2 of the video mode.

With the dual mono video mode, the 3D-compatible player draws (stores) a mono image that is a video 2D image on the L video plane 13L (L region) (as an image for the left eye), and also draws (stores) the mono image thereof on the R video plane 13R (R region) (as an image for the right eye).

Subsequently, both of the video mono image drawn (stored) on the L video plane 13L, and the video mono image drawn (stored) on the R video plane 13R, are supplied to the mixer 15.

C in FIG. 8 illustrates a stereo-video mode (hereafter, also referred to as "stereo video mode") that is one mode Mode#3 of the video mode.

With the stereo video mode, the 3D-compatible player draws an image for the left eye making up a stereo image that is a video 3D image on the L video plane 13L, and also draws an image for the right eye making up the stereo image thereof on the R video plane 13R.

Subsequently, the video image for the left eye drawn (stored) on the L video plane 13L, and the video image for the right eye drawn (stored) on the R video plane 13R are both supplied to the mixer 15.

D in FIG. 8 illustrates a flattened-stereo-video mode (hereafter, also referred to as "flattened stereo video mode") that is one mode Mode#4 of the video mode.

With the flattened stereo video mode, the 3D-compatible player draws one of an image for the left eye and an image for the right eye making up a stereo image that is a video 3D image, e.g., the image for the left eye alone on both of the L video plane 13L and the R video plane 13R, and discards the other image for the right eye.

Subsequently, the video image for the left eye drawn (stored) on the L video plane 13L is supplied to the mixer 15, and also the video image for the left eye drawn on the R video plane 13R is supplied to the mixer 15 (as the image for the right eye).

E in FIG. 8 illustrates a forced-mono-video mode (hereafter, also referred to as "forced mono video mode") that is one mode Mode#5 of the video mode.

With the forced mono video mode, the 3D-compatible player draws one of an image for the left eye and an image for the right eye making up a stereo image that is a video 3D image, e.g., the image for the left eye alone on one of the L video plane 13L and the R video plane 13R, e.g., the L video plane 13L alone, and discards the other image for the right eye.

Subsequently, the video image for the left eye alone drawn (stored) on the L video plane 13L is supplied to the mixer 15.

Figure 9:
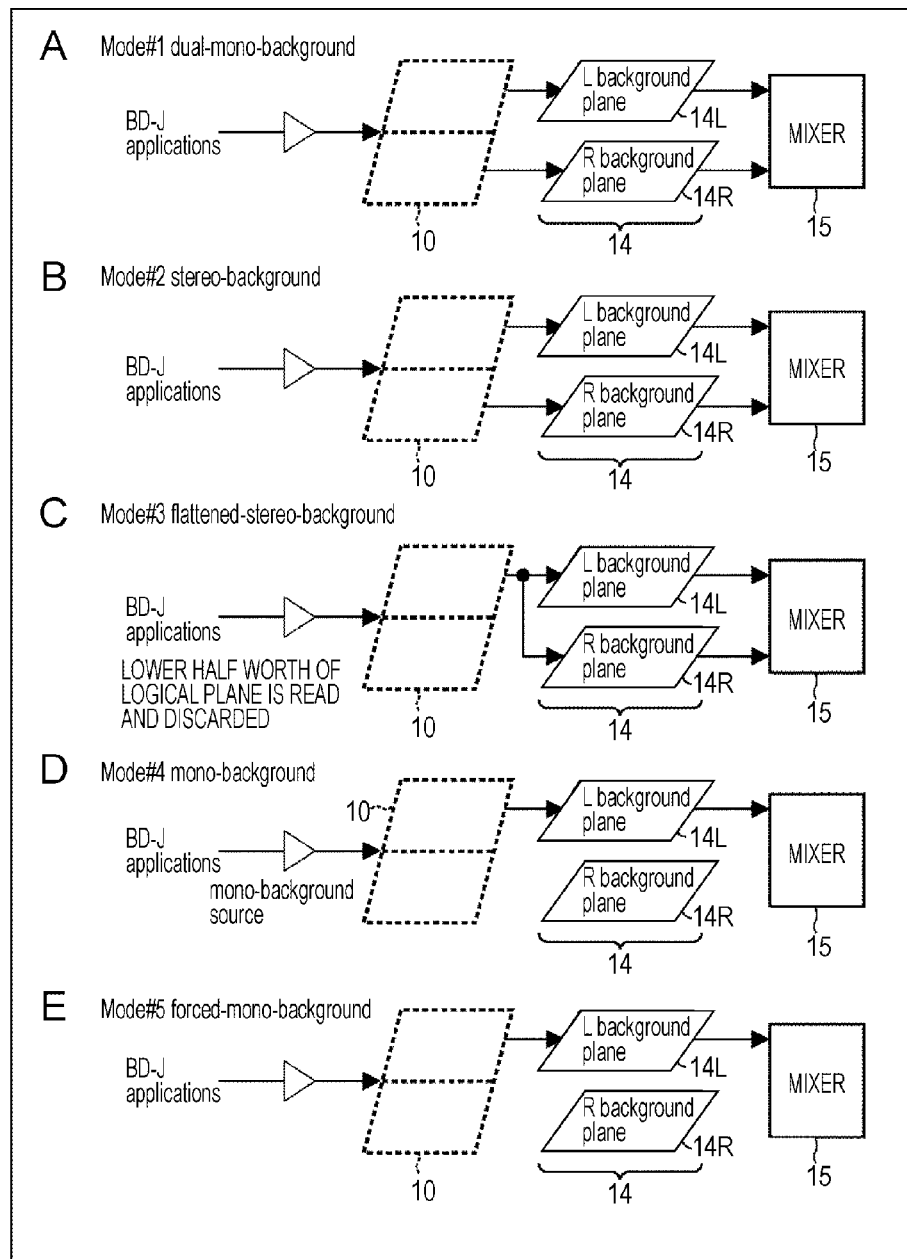
FIG. 9 is a diagram illustrating a background mode serving as one of configurations wherein a background image is played.

FIG. 9 is a diagram illustrating a background mode for playing background images that is one of the configurations (configuration) of the background plane 14.

A in FIG. 9 illustrates a dual-mono-background mode (hereafter, also referred to as "dual mono background mode") that is one mode Mode#1 of the background mode.

With the dual mono background mode, the BD-J application draws a mono image that is a 2D image in the background mode on the logical plane 10 as an image for the left eye and an image for the right eye.

Subsequently, the 3D-compatible player draws (stores) the image for the left eye drawn on the logical plane 10 on the L background plane 14L (L region), and also draws (stores) the image for the right eye drawn on the logical plane 10 on the R background plane 14R (R region).

Both of the background image for the left eye drawn (stored) on the L background plane 14L, and the background image for the right eye drawn on the R background plane 14R are supplied to the mixer 15.

B in FIG. 9 illustrates a stereo-background mode (hereafter, also referred to as "stereo background mode") that is one mode Mode#2 of the background mode.

With the stereo background mode, the BD-J application draws an image for the left eye and an image for the right eye, which make up a stereo image that is a background 3D image, on the logical plane 10.

Subsequently, the 3D-compatible player draws the image for the left eye drawn on the logical plane 10 on the L background plane 14L, and also draws the image for the right eye drawn on the logical plane 10 on the R background plane 14R.

Both of the background image for the left eye drawn on the L background plane 14L, and the background image for the right eye drawn on the R background plane 14R are supplied to the mixer 15.

C in FIG. 9 illustrates a flattened-stereo-background mode (hereafter, also referred to as "flattened stereo background mode") that is one mode Mode#3 of the background mode.

With the flattened stereo background mode, the BD-J application draws an image for the left eye and an image for the right eye, which make up a stereo image that is a background 3D image, on the logical plane 10.

Subsequently, the 3D-compatible player draws one of the image for the left eye and the image for the right eye drawn on the logical plane 10, e.g., the image for the left eye alone on both of the L background plane 14L and the R background plane 14R, and discards the other image for the right eye.

The background image for the left eye drawn on the L background plane 14L is supplied to the mixer 15, and also the background image for the left eye drawn on the R background plane 14R is supplied to the mixer 15 (as the image for the right eye).

D in FIG. 9 illustrates a mono-background mode (hereafter, also referred to as "mono background mode") that is one mode Mode#4 of the background mode.

With the mono background mode, the BD-J application draws a mono image that is a background 2D image, on the logical plane 10.

Subsequently, the 3D-compatible player draws the mono image drawn on the logical plane 10 on one of the L background plane 14L and the R background plane 14R, e.g., the L background plane 14L alone.

The background mono image drawn on the L background plane 14L is supplied to the mixer 15.

E in FIG. 9 illustrates a forced-mono-background mode (hereafter, also referred to as "forced mono background mode") that is one mode Mode#5 of the background mode.

With the forced mono background mode, the BD-J application draws an image for the left eye and an image for the right eye, which make up a stereo image that is a background 3D image, on the logical plane 10.

Subsequently, the 3D-compatible player draws one of the image for the left eye and the image for the right eye drawn on the logical plane 10, e.g., the image for the left eye alone on one of the L background plane 14L and the R background plane 14R, e.g., the L background plane 14L alone, and discards the other image for the right eye.

The background image for the left eye drawn on the L background plane 14L is supplied to the mixer 15.

Now, let us say that the graphics plane 11 which stores graphics, the video plane 13 which stores video (and also the PG plane 12 which stores PG), and the background plane 14 which stores background, illustrated in FIG. 4, are also collectively referred to as device planes.

With the BD player in FIG. 3 which is a 3D-compatible player, the configurations of the device planes are defined so as to be represented with four attributes of (1) resolution and color depth, (2) video mode (Video mode), (3) graphics mode (BD-J Graphics mode), and (4) background mode (Background mode).

Figures 10, 11:
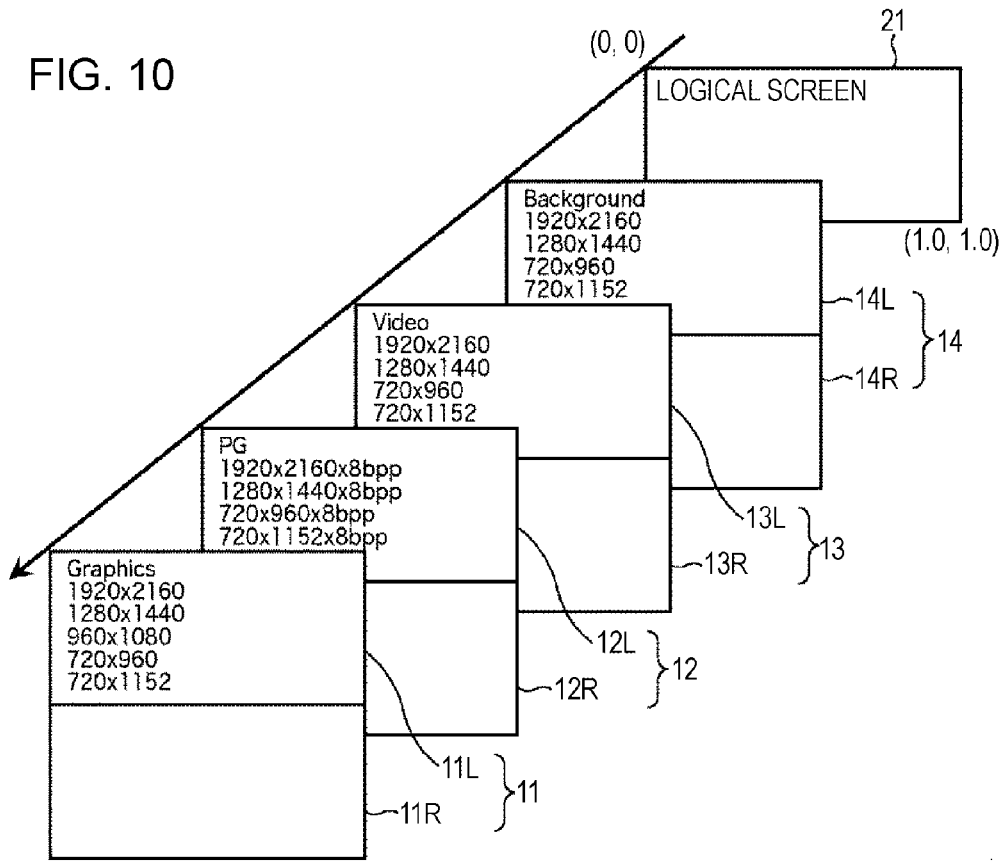
FIG. 10 is a diagram illustrating relationship between the graphics plane 11, a PG plane 12, a video plane 13, and a background plane 14, which are device planes.
FIG. 11 is a diagram illustrating image frames (resolution) and color depth, serving as one of configurations.

FIG. 10 illustrates relationship between the graphics plane 11, PG plane 12, video plane 13, and background plane 14, which are device planes.

The graphics plane 11 is configured of the L graphics plane 11L serving as an L region that is a storage region for storing an image for the left eye, and the R graphics plane 11R serving as a R region that is a storage region for storing an image for the right eye. Subsequently, with the graphics plane 11, the L graphics plane 11L and the R graphics plane 11R are collaterally disposed.

Specifically, in FIG. 10, the L graphics plane 11L and the R graphics plane 11R are vertically collaterally disposed in a form wherein the L graphics plane 11L that is an L region is disposed on the upper side, and also the R graphics plane 11R that is an R region is disposed on the lower side, thereby configuring the graphics plane 11.

The other device planes, i.e., the PG plane 12, video plane 13, and background plane 14 are also configured in the same way as the graphics plane 11.

The images drawn on the graphics plane 11, PG plane 12, video plane 13, and background plane 14 are overlaid (blended) in the order of the graphics plane 11, PG plane 12, video plane 13, and background plane 14 from the near side, and the images of the L region and the images of the R region obtained as a result thereof are alternately drawn (stored) on a logical screen 21 wherein the display screen of a display is abstracted.

Here, the entity of the logical screen 21 is a partial storage region of the RAM 104.

Also, the device planes are all made up of a storage region where an L region and a R region which are each one image worth of image storage region are vertically arrayed, and accordingly, are two images worth of image storage region, but the logical screen 21 is one image worth of image storage region.

With regard to 3D images, the configurations of the device planes are defined as to the entirety of device planes which are two images worth of image storage regions.

FIG. 11 illustrates (1) Image frames (Resolution) and color depth (color-depth) that is one configuration of the device planes.

In FIG. 11, the image frames (the number of horizontal× vertical pixels of a device plane) (resolution) and color depths of five rows from the top indicate the image frame and color depths of 3D images, and the image frames and color depths of the remaining five rows (five rows from the bottom) indicate the image frames and color depths of 2D images.

With one image worth of 2D image as one image worth of image, a 3D image is made up of an image for the left eye and an image for the right eye, and accordingly, is two images worth of image. Also, all of the device planes are storage regions where an L region and a R region which are one image worth of image storage regions are vertically arrayed, and accordingly, the image frame of a 3D image to be stored in such a device plane has a size obtained by doubling the number of pixels in the vertical direction of the image frame of the corresponding 2D image (2D image having the same size as the image for the left eye (or image for the right eye)).

Note that, with the current BD standard, with regard to 2D images, both of the image frame of graphics (image) stored in the graphics plane 11, and the image frame of background (image) stored in the background plane 14 are essentially matched with the image frame of video (image) stored in the video plane 13.

However, with regard to 2D images, in the case that the image frame of video to be stored in the video plane 13 is 1920×1080 pixels, the image frame of background to be stored in the background plane 14 is 1920×1080 pixels in the same way as the image frame of video to be stored in the video plane 13, but the image frame of graphics to be stored in the graphics plane 11 may be 960×540 pixels obtained by dividing each of the width and length of the image frame of video to be stored in the video plane 13 into halves (the fourth row from the bottom in FIG. 11) (hereafter, also referred to as "mismatched case of 2D images").

In this case, the graphics of 960×540 pixels to be stored in the graphics plane 11 is displayed after the size thereof is matched with 1920×1080 pixels that is the image frame of video to be stored in the video plane 13 by doubling each of the width and length thereof.

With regard to 3D images as well, there may be a case corresponding to a mismatched case of 2D images (hereafter, also referred to as "mismatched case of 3D images").

With a mismatched case of 3D images, in the event that the image frame of video to be stored in the video plane 13 is 1920×2160 pixels, the image frame of background to be stored in the background plane 14 is 1920×2160 pixels in the same way as the image frame of video to be stored in the video plane 13, but the image frame of graphics to be stored in the graphics plane 11 may be 960×1080 pixels obtained by dividing each of the width and length of the image frame of video to be stored in the video plane 13 into halves (the third row from the top in FIG. 11).

Even in a mismatched case of 3D images, the graphics of 960×1080 pixels is displayed after the size thereof is matched with 1920×2160 pixels that is the image frame of video to be stored in the video plane 13 by doubling each of the width and length thereof.

Figure 12:
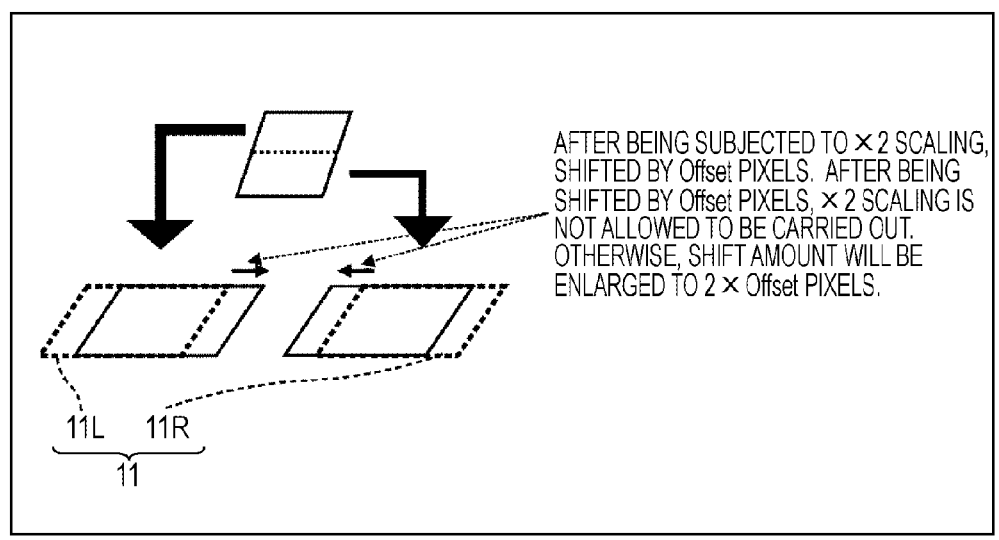
FIG. 12 is a diagram for describing a method for drawing 3D images using a second drawing method in the case that the 3D images are mismatched.

FIG. 12 is a diagram for describing a method for drawing 3D images using the second drawing method (B in FIG. 5) with a mismatched case of 3D images.

With the second drawing method, such as described in B in FIG. 5, the original image serving as a source for generating a 3D image is drawn on the logical plane 10, and then an image for the left eye and an image for the right eye to be generated by the shifting of the original image in the horizontal direction by the offset value are drawn on the graphics plane 11.

Now, the second drawing method may also be described as a method wherein two images obtained by horizontally shifting the upper side half and the lower side half of a vertically long image where two images of the original image and a copy of the original image are vertically arrayed, in accordance with the offset value are drawn on the graphics plane 11 as an image for the left eye and an image for the right eye.

With the second drawing method, in a mismatched case of 3D images, an image for the left eye and an image for the right eye of 960×540 pixels obtained by shifting each of the upper side half and the lower side half of graphics of 960×1080 pixels in the horizontal direction in accordance with the offset value are drawn on the graphics plane 11, and then upon doubling each of the width and length of the image for the left eye and the image for the right eye of the graphics plane 11, an image for the left eye and an image for the right eye obtained as a result thereof are images of which the shift amount in the horizontal direction is double of the offset value.

Accordingly, in this case, the position in the depth direction of a 3D image displayed with the image for the left eye and the image for the right eye is a position different from the position intended by the author.

Therefore, in a mismatched case of 3D images, in the event of drawing a 3D image using the second drawing method, an image obtained by doubling each of the width and length of the original image serving as a source for generating a 3D image needs to be drawn on the logical plane 10, and then an image for the left eye and an image for the right eye to be generated by shifting the image drawn on the logical plane 10 in the horizontal direction by the offset value needs to be drawn on the graphics plane 11.

Thus, the position in the depth direction of a 3D image displayed with the image for the left eye and the image for the right eye is the position intended by the author.

Figure 13:
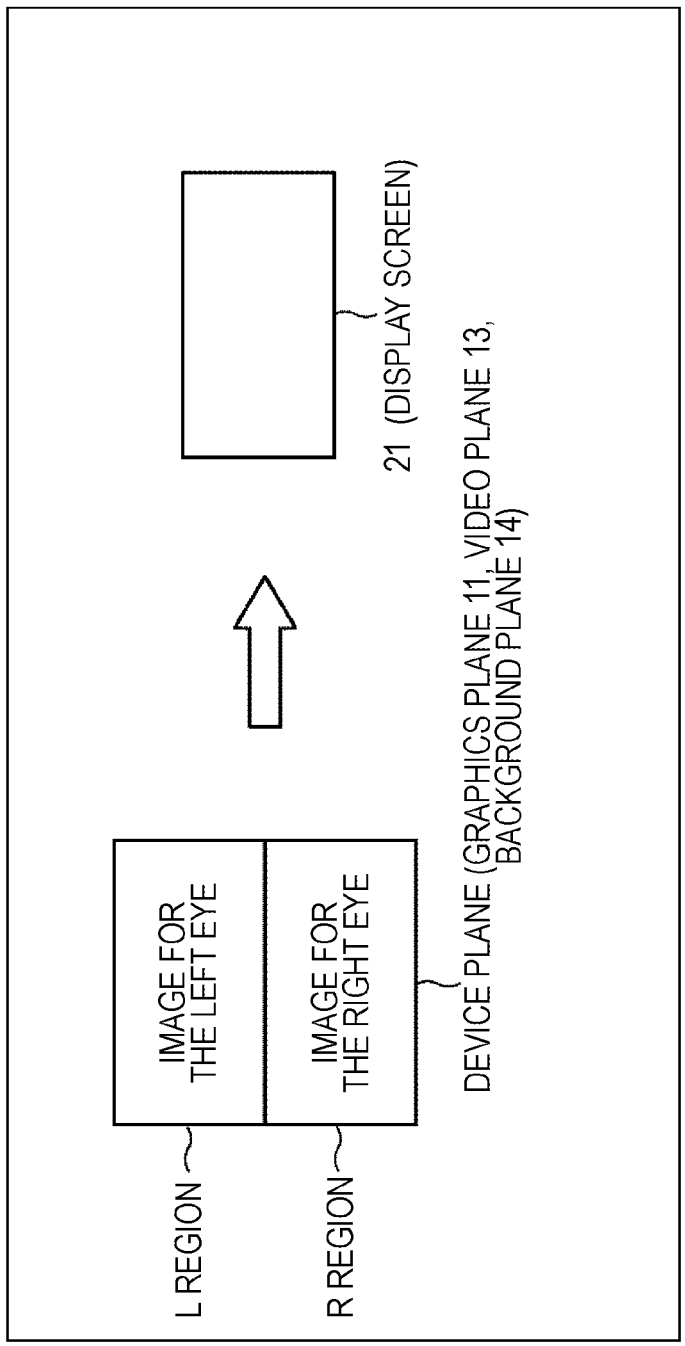
FIG. 13 is a diagram for describing the device planes.

FIG. 13 is a diagram for describing the device planes.

With the current BD standard, one image worth of image storage region is assumed as the logical screen 21, and it is not assumed that an image for the left eye (Left/Left-eye) and an image for the right eye (Right/Right-eye) are alternately drawn on the logical screen 21 which is one image worth of image storage region thereof.

Further, with the current BD standard, it is assumed that there is one-on-one relationship between the configuration of a device plane and the logical screen 21. Under such an assumption, two separate logical screens of a logical screen for drawing the image for the left eye, and a logical screen for drawing the image for the right eye need to be provided as the logical screen 21 regarding 3D image processing.

Therefore, with the BD player in FIG. 3 which is a 3D-compatible player, the device configurations for L/R are defined with one image by doubling the definition of resolution in the vertical direction. A drawing model is defined wherein the logical screen itself is taken as one image in a conventional manner, and outputs for L/R are drawn thereon simultaneously.

That is to say, the BD player in FIG. 3 includes the device planes (graphics plane 11, video plane 13 (PG plane 12), and background plane 14) storing graphics, video, or background image conforming to the BD standard.

The device planes are storage regions where two images worth of image storage regions of an L region which is one image worth of image storage region storing an image for the left eye, and a R region which is one image worth of image storage region storing an image for the right eye are collaterally disposed, and the configurations of the device planes are defined as to the entirety of device planes which are two images worth of image storage regions.

Subsequently, the image for the left eye and the image for the right eye stored in the device planes are, for example, alternately drawn on the logical screen 21.

Thus, a logical screen storing an image for the left eye (image for L), and a logical screen storing an image for the right eye (image for R) do not have to be provided separately.
Video Mode, Graphics Mode, and Background Mode Configurations can be specified (set) with a bit field for specifying a configuration by providing this within a BD-J object (Object) file.

FIG. 14 illustrates bit fields to be provided within a BD-J object file to specify a configuration.

Four fields of initial_configuration_id, initial_graphics_mode, initial_video_mode, and initial_background_mode can be provided within a BD-J object file to specify a configuration.

The initial_configuration_id is a field for specifying (1) image frame and color depth. If we say that the value that initial_configuration_id takes is configuration id, the following values can be defined as configuration ids.
HD__1920__1080=1
HD__1280__720=2
SD__720__576=3
SD__720__480=4
QHD__960__540=5
HD__1920__2160=6
HD__1280__1440=7
SD__720__1152=8
SD__720__960=9
QHD__960__1080=10

Note that HD__1920__1080 represents the image frame and color depth at the sixth row from the top of FIG. 11, HD__1280__720 represents the image frame and color depth at the eighth row from the top of FIG. 11, SD__720__576 represents the image frame and color depth at the tenth row from the top of FIG. 11, SD__720__480 represents the image frame and color depth at the ninth row from the top of FIG. 11, QHD__960__540 represents the image frame and color depth at the seventh row from the top of FIG. 11, HD__1920__2160 represents the image frame and color depth at the first row from the top of FIG. 11, HD__1280__1440 represents the image frame and color depth at the second row from the top of FIG. 11, SD__720__1152 represents the image frame and color depth at the fifth row from the top of FIG. 11, SD__720__960 represents the image frame and color depth at the fourth row from the top of FIG. 11, and QHD__960__1080 represents the image frame and color depth at the third row from the top of FIG. 11, respectively.

initial_graphics_mode is a field for specifying (3) graphics mode.

Now, there are a total of five modes of the offset graphics mode (offset), stereo graphics mode (stereo), mono graphics mode (mono (Legacy playback mode)), forced mono graphics mode (forced mono (Legacy playback mode)), and flattened stereo graphics mode (flattened-stereo), described in FIG. 6, as the graphics mode (BD-J Graphics mode).

Let us say that the following values are defined as initial_graphics_mode for specifying the graphics mode.
GRAPHICS_MONO_VIEW=22
GRAPHICS_STEREO_VIEW=23
GRAPHICS_PLANE_OFFSET=24
GRAPHICS_DUAL_MONO_VIEW=25
GRAPHICS_FORCED_MONO_VIEW=26

Note that GRAPHICS_MONO_VIEW represents the mono graphics mode, GRAPHICS_STEREO_VIEW represents the stereo graphics mode, GRAPHICS_PLANE_OFFSET represents the offset graphics mode, GRAPHICS_DUAL_MONO_VIEW represents the flattened stereo graphics mode, and GRAPHICS_FORCED_MONO_VIEW represents the forced mono graphics mode, respectively.

Also, in the case that initial_configuration_id is set to any one of 1, 2, 3, 4, and 5, initial_graphics_mode is ignored.

initial_video_mode is a field for specifying (2) video mode.

Now, there are a total of five modes of the dual mono video mode (dual-mono), stereo video mode (stereo), flattened stereo video mode (flattened-stereo), mono video mode (mono (Legacy playback mode)), and forced mono video mode (forced-mono), described in FIG. 8, as the video mode (Video mode).

Let us say that the following values are defined as initial_video_mode for specifying the video mode.
VIDEO_MONO_VIEW=27
VIDEO_STEREO_VIEW=28
VIDEO_FLATTENED_STEREO_VIEW=29
VIDEO_DUAL_MONO_VIEW=30
VIDEO_FORCED_MONO_VIEW=31

Note that VIDEO_MONO_VIEW represents the mono video mode, VIDEO_STEREO_VIEW represents the stereo video mode, VIDEO_FLATTENED_STEREO_VIEW represents the flattened stereo video mode, VIDEO_DUAL_MONO_VIEW represents the dual mono video mode, and VIDEO_FORCED_MONO_VIEW represents the forced mono video mode, respectively.

Also, in the case that initial_configuration_id is set to one of 1, 2, 3, 4, and 5, initial_video_mode is ignored.

initial_background_mode is a field for specifying (4) background mode.

Now, there are a total of five modes of the dual mono background mode (dual-mono), stereo background mode (stereo), flattened stereo background mode (flattened-stereo), mono background mode (mono (Legacy playback mode)), and forced mono background mode (forced-mono), described in FIG. 9, as the background mode (Background mode).

Let us say that the following values are defined as initial_background_mode for specifying the background mode.
BACKGROUND_MONO_VIEW=17
BACKGROUND_STEREO_VIEW=18
BACKGROUND_FLATTENED_STEREO_VIEW=19
BACKGROUND_DUAL_MONO_VIEW=20
BACKGROUND_FORCED_MONO_VIEW=21

Note that BACKGROUND_MONO_VIEW represents the mono background mode, BACKGROUND_STEREO_VIEW represents the stereo background mode, BACKGROUND_FLATTENED_STEREO_VIEW represents the flattened stereo background mode, BACKGROUND_DUAL_MONO_VIEW represents the dual mono background mode, and BACKGROUND_FORCED_MONO_VIEW represents the forced mono background mode, respectively.

Also, in the case that initial_configuration_id is set to one of 1, 2, 3, 4, and 5, initial_background_mode is ignored.

Now, with the BD-J Object file, specifications may be employed wherein of initial_configuration_id, initial_graphics_mode, initial_video_mode, and initial_background_mode, initial_configuration_id alone is specified.

With the BD-J Object file, in the case of specifying initial_configuration_id alone, the default stipulated values of initial_video_mode, initial_graphics_mode, and initial_background_mode need to be provided.

FIG. 15 illustrates the default stipulated values of initial_video_mode, initial_graphics_mode, and initial_background_mode.

Note that STEREO_VIEW of the video mode (initial_video_mode) represents the above VIDEO_STEREO_VIEW or VIDEO_FLATTENED_STEREO_

VIEW, and MONO_VIEW represents the above VIDEO_MONO_VIEW or VIDEO_DUAL_MONO_VIEW.

Also, STEREO_VIEW of the graphics mode (initial_graphics_mode) represents the above GRAPHICS_STEREO_VIEW or GRAPHICS_PLANE_OFFSET, and MONO_VIEW represents the above GRAPHICS_MONO_VIEW or GRAPHICS_DUAL_MONO_VIEW.

Further, STEREO_VIEW of the background mode (initial_background_mode) represents the above BACKGROUND_STEREO_VIEW or BACKGROUND_FLATTENED_STEREO_VIEW, and MONO_VIEW represents the above BACKGROUND_MONO_VIEW or BACKGROUND_DUAL_MONO_VIEW Change in Configuration Next, change in a configuration will be described.

The configurations can be changed at timing of when auto reset at the time of starting a BD-J title or at the time of playing a PlayList is performed (dynamic change), and when API call-up by a BD-J application is performed (dynamic change).

Unlike at the time of conventional playback of mono video+mono graphics, change in a plane configuration is available even during playback of AV.

That is to say, with the 3D-compatible player, the configuration may be changed when playing AV streams (video).

Similar to Mono-view, with playback other than KEEP_RESOLUTION playback, the 3D-compatible player performs configuration change processing so that image frames are aligned (so that video/background is aligned with the image frame of graphics at the time of starting a BD-J title, so that graphics/background is aligned with the image frame of video at the time of playback of a PlayList, or so that the image frame of a plane set by API is aligned with the image frame of an unset plane other than that plane at the time of API call-up by a BD-J application). Also, error processing at the time of change in the configuration depends on the 3D-compatible player.

Now, KEEP_RESOLUTION playback is a playback mode for synthesizing SD (Standard Definition) video and HD (High Definition) graphics, and HD background, and there is a case where Graphics of 1920×1080 pixels, Video+PG of 720×480 pixels, and Background of 1920×1080 pixels are synthesized, and a case where Graphics of 1920×1080 pixels, Video +PG of 720×576 pixels, and Background of 1920×1080 pixels are synthesized. Note that, regardless of an HD image, reproduction of an image of 1280×720 pixels is not included in KEEP_RESOLUTION playback.

FIGS. 16 and 17 illustrate combinations of resolutions (image frames) of Video+PG, BD-J graphics, and background, of playback other than KEEP_RESOLUTION playback. Note that FIG. 17 is a diagram continuous with FIG. 16.

FIG. 18 illustrates an example of the configuration change processing.

A in FIG. 18 illustrates an example of processing of the 3D-compatible player in the case that the configuration (video mode) of graphics (graphics plane 11) is changed from STEREO_VIEW to MONO_VIEW.

For example, with the 3D-compatible player, in the case that the video mode is STEREO_VIEW, graphics is drawn on the L graphics plane 11L and the R graphics plane 11R making up the graphics plane 11 of 1920×2160 pixels, let us say that the video mode is changed from STEREO_VIEW to MONO_VIEW without resetting (the storage region serving as) the graphics plane 11.

In this case, with the 3D-compatible player, only the image stored (drawn) on one of the L graphics plane 11L and the R graphics plane 11R making up the graphics plane 11, e.g., the L graphics plane 11L is supplied to the logical screen 21 and displayed, and the image stored in the R graphics plane 11R which is the other is discarded.

Note that, in this case, the 3D-compatible player may forcibly end (playback of the image) as an error.

B in FIG. 18 illustrates an example of the processing of the 3D-compatible player in the case that the video mode is changed from MONO_VIEW to STEREO_VIEW.

For example, with the 3D-compatible player, in the case that the video mode is MONO_VIEW, graphics is drawn on the L graphics plane 11L alone making up the graphics plane 11 of 1920×1080 pixels, let us say that the video mode is changed from MONO_VIEW to STEREO_VIEW without resetting the graphics plane 11.

In this case, with the 3D-compatible player, the graphics drawn on the L graphics plane 11L is copied to the R graphics plane 11R, the graphics drawn on the L graphics plane 11L is supplied to the logical screen 21 as the image for the left eye, and also the graphics copied to the R graphics plane 11R is supplied to the logical screen 21 as the image for the right eye.

Note that, in this case, the 3D-compatible player may forcibly end (playback of the image) as an error.

Change in Configuration When Starting BD-J Title

The following three rules #1-1, #1-2, and #1-3 are applied to change in a configuration at the time of starting a BD-J title in principle.

Specifically, the rule #1-1 is a rule wherein, with the configuration (of a device plane), the resolutions (image frames) of three images of Graphics, Video, and Background have to be the same resolutions all the time.

The rule #1-2 is a rule wherein, in the case that playback of a PlayList other than KEEP_RESOLUTION playback is performed, with the configuration, the resolutions (image frames) of three images of Graphics, Video, and Background have to be aligned with the resolution of video.

The rule #1-3 is a rule wherein, with the configuration, in the case that graphics is QHD graphics, resolution after scaling double in the vertical direction and double in the horizontal direction is taken as the resolution of the configuration.

Note that the value of each of the video mode, graphics mode, and background mode is determined in accordance with the default value stipulation by the initial_configuration_id of a BD-J object file (video mode, graphics mode, and background mode are determined).

Also, in the case that autostart_first_PlayList_flag of the BD-J object file is set to 1b, change in the configuration of the video plane follows not the default value but an auto reset (dynamic change) rule at the time of playback of a PlayList.

Change in Configuration when PlayList-Playback-Time Auto Reset is Performed (Dynamic Change)

The following three rules #2-1, #2-2, and #2-3 are applied to change in a configuration when auto reset at the time of playing a PlayList is performed in principle.

Specifically, the rule #2-1 is a rule wherein, with the configuration (of a device plane), the resolutions (image frames) of three images of Graphics, Video, and Background have to be the same resolutions all the time.

The rule #2-2 is a rule wherein, in the case that playback of a PlayList other than KEEP_RESOLUTION playback is performed, with the configuration, the resolutions (image frames) of three images of Graphics, Video, and Background have to be aligned with the resolution of video.

The rule #2-3 is a rule wherein, with the configuration, in the case that graphics is QHD graphics, resolution after scaling double in the vertical direction and double in the horizontal direction is taken as the resolution of the configuration.

At the time of start of playback of a PlayList, the video plane configuration is automatically aligned with the video attribute of the PlayList.

In the case that the configuration is automatically aligned with the video attribute of the PlayList, with the current BD standard, it is stipulated to automatically align the graphics plane and background plane with the attribute of the video plane as an indispensable function on the BD player side. However, with the 3D-compatible player, at the time of switching from a stereo PlayList (playlist for playing a 3D image) to a mono PlayList (playlist for playing a 2D image), or at the time of switching from a mono PlayList to a stereo PlayList, the modes of the graphics and background (graphics mode and background mode) are set to predetermined initial values.

FIG. 19 illustrates the predetermined initial values of the graphics mode and the background mode.

Figure 20:
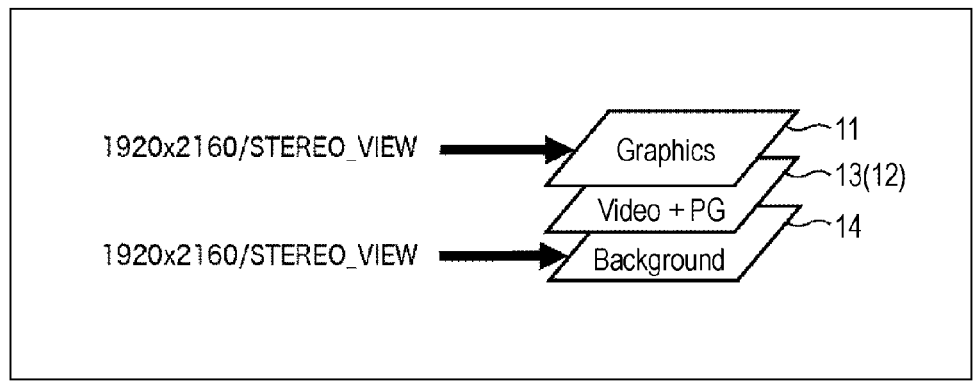
FIG. 20 is a diagram illustrating the graphics and the background modes to be played in the case of 3D images (stereo images) of 1920×2160 pixels being played.

FIG. 20 illustrates the graphics and background images to be played in the case of playing a 3D image (stereo image) of 1920×2160 pixels.

A 3D image of 1920×2160 pixels is played as graphics, and a 3D image of 1920×2160 pixels is played as background.

Change in Configuration when API Call-Up by BD-J Application is Performed (Dynamic Change)

The following three rules #3-1, #3-2, and #3-3 are applied to change in a configuration when API call-up by a BD-J application is performed in principle.

Specifically, the rule #3-1 is a rule wherein, with the configuration (of a device plane), the resolutions (image frames) of three images of Graphics, Video, and Background have to be the same resolutions all the time.

The rule #3-2 is a rule wherein, with the configuration, in the case that playback of a PlayList other than KEEP_RESOLUTION playback is performed, the resolutions (image frames) of three images of Graphics, Video, and Background have to be aligned with the resolution of video.

The rule #3-3 is a rule wherein, with the configuration, in the case that graphics is QHD graphics, resolution after scaling double in the vertical direction and double in the horizontal direction is taken as the resolution of the configuration.

Figure 21:
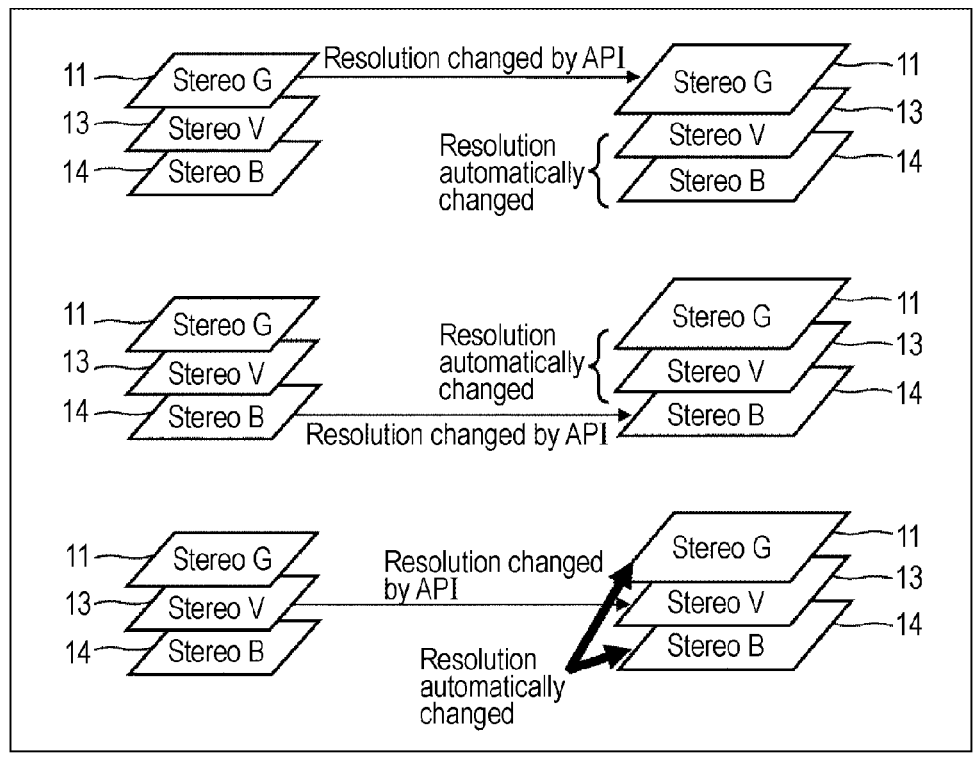
FIG. 21 is a diagram for describing change in resolution (image frame) serving as a configuration due to call-up of an API by a BD-J application.

FIG. 21 is a diagram for describing change in resolution (image frame) serving as a configuration according to API call-up by a BD-J application.

During playback of a graphics 3D image (stereo G), video 3D image (stereo V), and background 3D image (stereo B), in the case that the resolution of the graphics 3D image has been changed according to API call-up, the 3D-compatible BD player automatically changes the resolutions of the video 3D image and background 3D image in accordance with the above rules #3-1, #3-2, and #3-3.

Also, during playback of a graphics 3D image (stereo G), video 3D image (stereo V), and background 3D image (stereo B), in the case that the resolution of the background 3D image has been changed according to API call-up, the 3D-compatible BD player automatically changes the resolutions of the graphics 3D image and video 3D image in accordance with the above rules #3-1, #3-2, and #3-3.

Further, during playback of a graphics 3D image (stereo G), video 3D image (stereo V), and background 3D image (stereo B), in the case that the resolution of the video 3D image has been changed according to API call-up, the 3D-compatible BD player automatically changes the resolutions of the graphics 3D image and background 3D image in accordance with the above rules #3-1, #3-2, and #3-3

Change in Mode of Plane Configuration (Change in Graphics Mode, Video Mode, and Background Mode)

The 3D-compatible player can seamlessly perform change (switching) in the graphics mode between the stereo graphics mode (stereo graphics) and the offset graphics mode (offset graphics).

Figure 22:
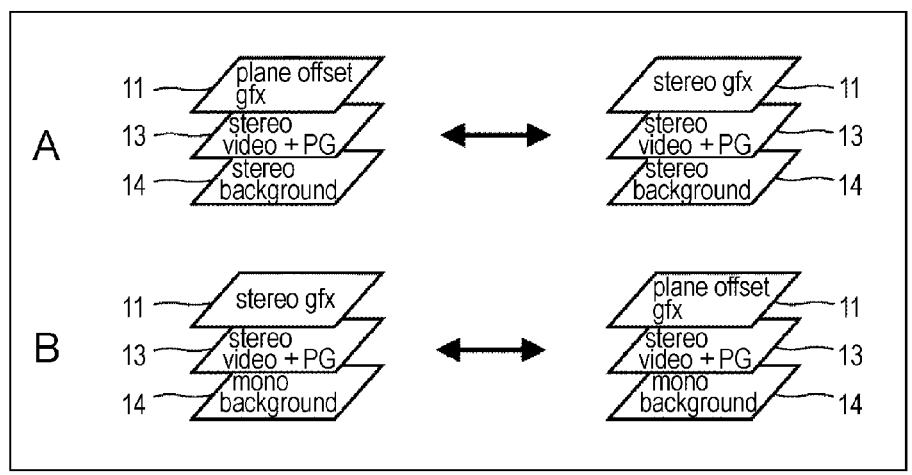
FIG. 22 is a diagram for describing changes in the graphics mode.

FIG. 22 is a diagram for describing change in the graphics mode.

A in FIG. 22 illustrates a case where, during playback of a graphics 3D image (plane offset gfx (graphics)) in the offset graphics mode, video (and PG) 3D image (stereo video +PG), and background 3D image (stereo background), the graphics mode has been changed from the offset graphics mode to the stereo graphics mode.

In this case, switching from playback of the graphics 3D image (plane offset gfx) in the offset graphics mode, video (and PG) 3D image (stereo video+PG), and background 3D image (stereo background) to playback of the graphics 3D image (stereo gfx (graphics)) in the stereo graphics mode, video (and PG) 3D image (stereo video+PG), and background 3D image (stereo background) is performed, and this switching can be performed seamlessly.

Inverse switching, i.e., switching from playback of the graphics 3D image (stereo gfx) in the stereo graphics mode, video (and PG) 3D image (stereo video+PG), and background 3D image (stereo background) to playback of the graphics 3D image (plane offset gfx) in the offset graphics mode, video (and PG) 3D image (stereo video+PG), and background 3D image (stereo background) can also be performed seamlessly.

B in FIG. 22 illustrates a case where, during playback of a graphics 3D image (stereo gfx) in the stereo graphics mode, video (and PG) 3D image (stereo video+PG), and background 2D image (mono background), the graphics mode has been changed from the stereo graphics mode to the offset graphics mode.

In this case, switching from playback of the graphics 3D image (stereo gfx) in the stereo graphics mode, video (and PG) 3D image (stereo video+PG), and background 2D image (mono background) to playback of the graphics 3D image (plane offset gfx) in the offset graphics mode, video (and PG) 3D image (stereo video+PG), and background 2D image (mono background) is performed, and this switching can be performed seamlessly.

Inverse switching, i.e., switching from playback of the graphics 3D image (plane offset gfx) in the offset graphics mode, video (and PG) 3D image (stereo video+PG), and background 2D image (mono background) to playback of the graphics 3D image (stereo gfx) in the stereo graphics mode, video (and PG) 3D image (stereo video+PG), and background 2D image (mono background) can also be performed seamlessly.

Figure 23:
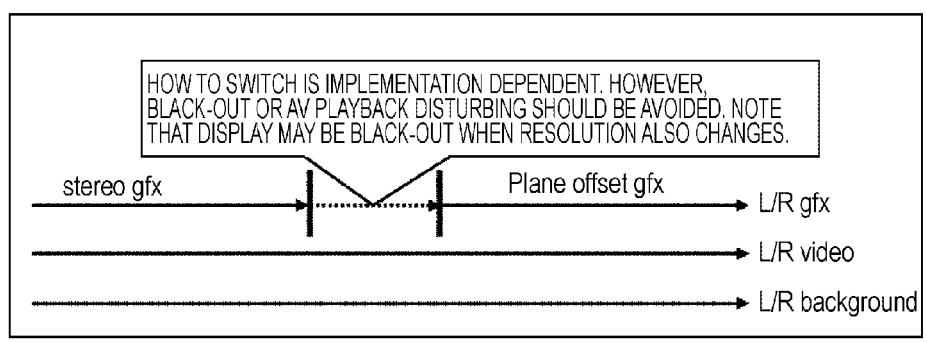
FIG. 23 is a diagram illustrating change in the graphics mode from a stereo graphics mode to an offset graphics mode.

FIG. 23 illustrates change in the graphics mode from the stereo graphics mode to the offset graphics mode.

In the case that the graphics mode has been changed from the stereo graphics mode (stereo gfx) to the offset graphics mode (plane offset gfx), playback of video (L/R(Left/Right) video), and background (L/R(Left/Right) background) are still continued.

On the other hand, with regard to graphics, a playback object is switched from a graphics 3D image (stereo gfx) in the stereo graphics mode to a graphics 3D image (plane offset gfx) in the offset graphics mode.

Implementation of a switching method of this playback object depends on an individual 3D-compatible player. However, at the time of switching of a playback object, so-called black-out, and interruption of playback of AV (video) have to be prevented from occurrence.

Note that, in the case that resolution is also changed at the time of change in the graphics mode, black-out may occur.

Next, the 3D-compatible player can seamlessly perform change (switching) in the background mode between the stereo background mode (stereo background) and the mono background mode (mono background).

Figure 24:
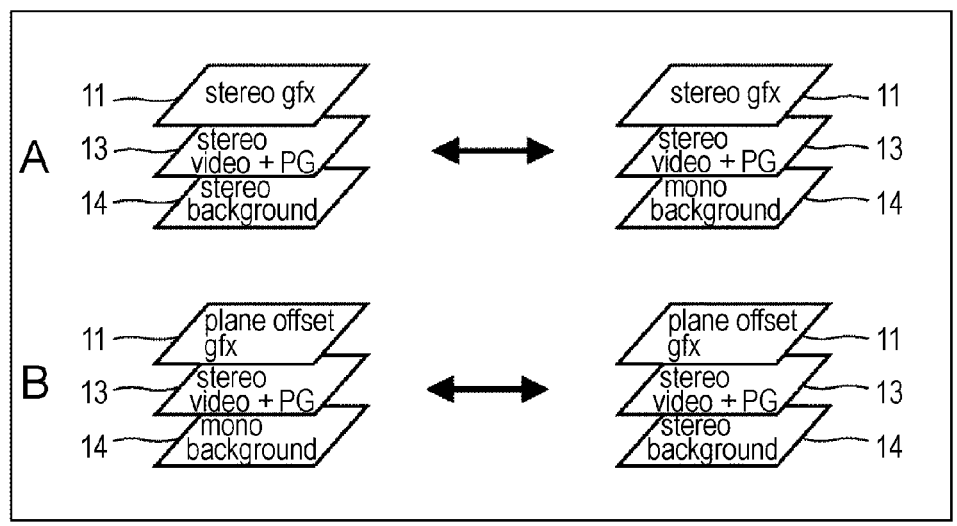
FIG. 24 is a diagram for describing changes in the background mode.

FIG. 24 is a diagram for describing change in the background mode.

A in FIG. 24 illustrates a case where, during playback of a graphics 3D image (stereo gfx), a video (and PG) 3D image (stereo video+PG), and a background 3D image (stereo background) in the stereo background mode, the background mode has been changed from the stereo background mode to the mono background mode.

In this case, switching from playback of the graphics 3D image (stereo gfx), video (and PG) 3D image (stereo video+PG), and background 3D image (stereo background) in the stereo background mode to playback of the graphics 3D image (stereo gfx), video (and PG) 3D image (stereo video+PG), and background 2D image (mono background) in the mono background mode is performed, and this switching can be performed seamlessly.

Inverse switching can also be performed seamlessly.

B in FIG. 24 illustrates a case where, during playback of a graphics 3D image (plane offset gfx), a video (and PG) 3D image (stereo video+PG), and a background 2D image (mono background) in the mono background mode, the background mode has been changed from the mono background mode to the stereo background mode.

In this case, switching from playback of the graphics 3D image (plane offset gfx), video (and PG) 3D image (stereo video+PG), and background 2D image (mono background) in the mono background mode to playback of the graphics 3D image (plane offset gfx), video (and PG) 3D image (stereo video+PG), and background 3D image (stereo background) in the stereo background mode is performed, and this switching can be performed seamlessly.

Inverse switching can also be performed seamlessly.

Next, the 3D-compatible player can seamlessly perform change (switching) in the video mode between the stereo video mode (stereo video), the flattened stereo video mode (flattened-stereo video), and the dual mono video mode (dual-mono video).

Figure 25:
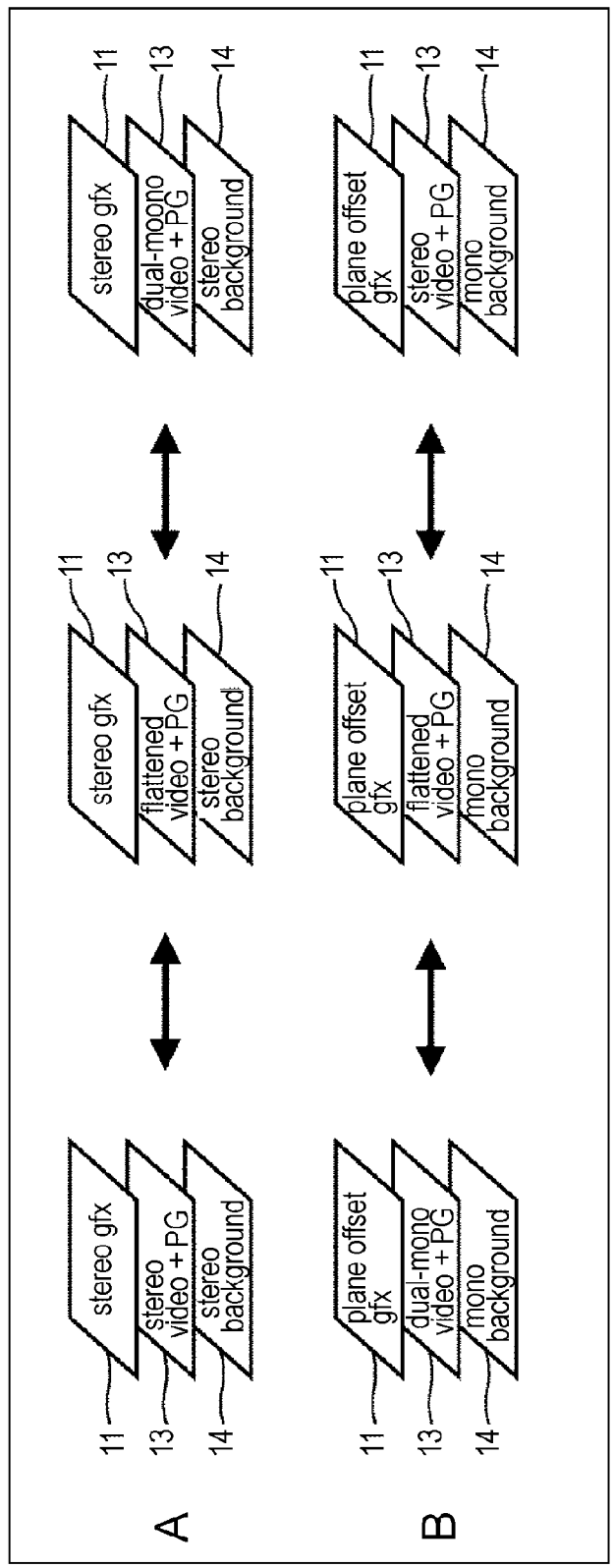
FIG. 25 is a diagram for describing changes in the video mode.

FIG. 25 is a diagram for describing change in the video mode.

A in FIG. 25 is a diagram for describing change in the video mode in the case that a graphics 3D image (stereo gfx), a background 3D image (stereo background), and also a video image are being played.

In the case that the video mode is the stereo video mode, and a video (and PG) 3D image (stereo video+PG) in the stereo video mode is being played, when the video mode is changed from the stereo video mode to the flattened stereo video mode, the video image is switched from the video (and PG) 3D image (stereo video+PG) in the stereo video mode to a video (and PG) 3D image (flattened video+PG) in the flattened stereo video mode, and this switching can be performed seamlessly.

Inverse switching can also be performed seamlessly.

Also, in the case that the video mode is the flattened stereo video mode, and a video (and PG) 3D image (flattened video+PG) in the flattened stereo video mode is being played, when the video mode is changed from the flattened stereo video mode to the dual mono video mode, the video image is switched from the video (and PG) 3D image (flattened video+PG) in the flattened stereo video mode to a video (and PG) 3D image (dual-mono video+PG) in the dual mono video mode, and this switching can be performed seamlessly.

Inverse switching can also be performed seamlessly.

B in FIG. 25 is a diagram for describing change in the video mode in the case that a graphics 3D image (plane offset gfx), a background 2D image (mono background), and also a video image are being played.

In the case that the video mode is the dual mono video mode, and a video (and PG) 3D image (dual-mono video+PG) in the dual mono video mode is being played, when the video mode is changed from the dual mono video mode to the flattened stereo video mode, the video image is switched from the video (and PG) 3D image (dual-mono video+PG) in the dual video mode to a video (and PG) 3D image (flattened video+PG) in the flattened stereo video mode, and this switching can be performed seamlessly.

Inverse switching can also be performed seamlessly.

Also, in the case that the video mode is the flattened stereo video mode, and a video (and PG) 3D image (flattened video+PG) in the flattened stereo video mode is being played, when the video mode is changed from the flattened stereo video mode to the stereo video mode, the video image is switched from the video (and PG) 3D image (flattened video+PG) in the flattened stereo video mode to a video (and PG) 3D image (stereo video+PG) in the stereo video mode, and this switching can be performed seamlessly.

Inverse switching can also be performed seamlessly.

3D-Compatible Player for Changing Configurations

With the current BD standard, a configuration is stipulated with resolution (image frame) and color depth. Therefore, change in a configuration means change in resolution. However, at the time of change in resolution, playback is temporarily stopped, and the display screen turns to a blacked-out state.

On the other hand, for example, the mono-logical-plane +offset value playback mode of the graphics plane, or the like can be stipulated as a configuration of 1920×1080/32 bpp, but this case may induce black-out, for example, by switching from mono-logical-plane+offset value to stereo-logical-plane, or the like.

Therefore, with the 3D-compatible player, plane configurations are unified into a two-face definition (configuration of 1920×2160 pixels, 1280×1440 pixels, (960×1080 pixels,) 720×960 pixels, or 720×1152 pixels), and an attribute other than resolution/color depth is defined as a mode value. Thus, in the case that only the mode is changed without changing resolution, a configuration can be changed without causing the display screen to go into a blacked-out state. Further, similar to a legacy player, change in a configuration can be performed by calling up the Configuration Preference setting API.

Figure 26:
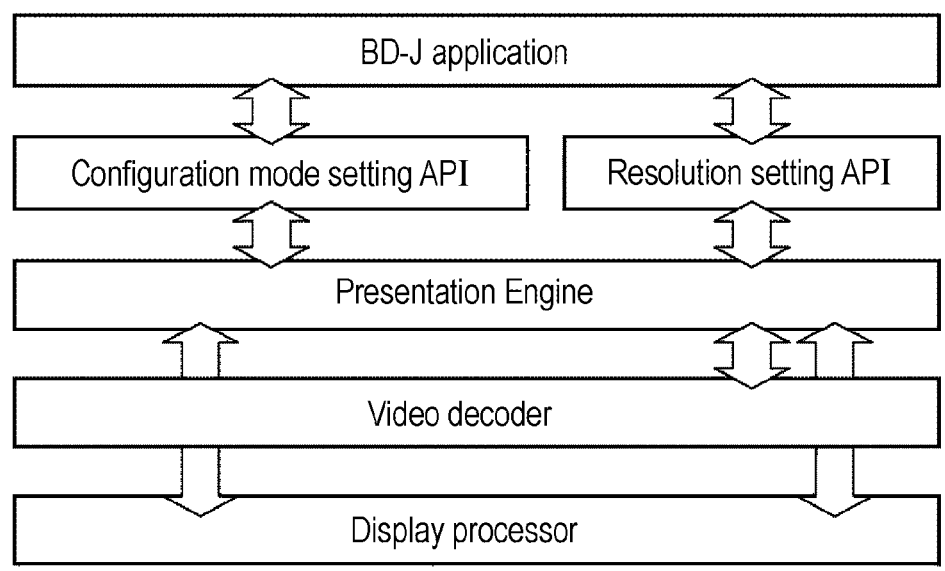
FIG. 26 is a block diagram illustrating a functional configuration example of a 3D-compatible player.

FIG. 26 is a block diagram illustrating a functional configuration example of the BD player in FIG. 3 as such a 3D-compatible player.

With the 3D-compatible player in FIG. 26, the configuration of a device plane which is a storage region where two images worth of image storage regions of an L region which is one image worth of image storage region storing an image for the left eye, and a R region which is one image worth of image storage region storing an image for the right eye are collaterally disposed is defined as to the entirety of the device plane thereof.

Also, five modes of the mono graphics mode, stereo graphics mode, offset graphics mode, forced mono graphics mode, and flattened stereo graphics mode are defined as the graphics mode. Further, five modes of the mono video mode, dual mono video mode, stereo video mode, forced mono video mode, and flattened stereo video mode are defined as the video mode. Also, five modes of the mono background mode, dual mono background mode, stereo background mode, forced mono background mode, and flattened stereo background mode are defined as the background mode.

Also, the configuration of a device plane includes, in addition to (1) image frame (resolution) and color depth, (2) video mode, (3) graphics mode, and (4) background mode, and the setting (change) of (2) video mode, (3) graphics mode, and (4) background mode can be performed by the configuration mode setting API.

With the 3D-compatible player in FIG. 26, in the case of changing the video mode, graphics mode, or background mode, a BD-J application calls up the configuration mode setting API, and requests change (setting) of the video mode, graphics mode, or background mode.

The configuration mode setting API directly or indirectly controls a needed one of the presentation engine (Presentation Engine), video decoder (video decoder), and display processor (Display processor) according to the request from the BD-J application, thereby changing (setting) the video mode, graphics mode, or background mode.

On the other hand, in the case of changing the image frame (resolution) and color depth, the BD-J application calls up the resolution setting API to request change (setting) of resolution and the like.

The resolution setting API directly or indirectly controls a needed one of the presentation engine, video decoder, and display processor according to the request from the BD-J application, thereby changing (setting) the image frame (resolution) and color depth.

Note that, in FIG. 26, the presentation engine (Presentation Engine) provides the decoding function and presentation function (Presentation functions) of audio, video, and HDMV graphics to a playback control engine (Playback Control Engine) not illustrated for controlling playback of BD.

Also, in FIG. 26, the video decoder (Video decoder) performs decoding of images. Further, the display processor (Display processor) is hardware for overlaying each plane of the graphics plane, video (video+PG) plane, and background plane, and then outputting an image obtained with overlaying thereof to the display connected to the BD player.

As described above, the configuration of a device plane is defined as to the entirety of the device plane which is two images worth of image storage regions, and the graphics mode and the like are included in the configuration of the device plane separately from the resolution (image frame) and color depth. Subsequently, the 3D-compatible player sets the graphics mode and the like according to calling up of the configuration mode setting API. Thus, the graphics mode and the like can be changed without changing the resolution.

Switching of PG/Text Subtitle Configuration

Video+PG/TextST (Text subtitle) is handled collectively (without distinction) from BD-J applications. Also, BD-J applications cannot individually control the PG plane 12, but can control the position or scaling (size) of video. Note that, with the current BD standard, in the case that control of the position or scaling of video is performed from a BD-J application, PG/TextST is to be aligned with the video.

Accordingly, in the case of scaling control of video being performed, the PG plane offset value is scaled with a scaling ratio for scaling video (enlargement ratio or reduction ratio).

On the other hand, with regard to PG (including textST), it is desirable to allow the 3D-compatible player to set a mode for playing PG images that are mono images serving as 2D images (1-plane (legacy playback)), a mode for playing PG images that are stereo images serving as 3D images (2-planes), and a mode for playing the PG of 3D images using an image for the left eye and an image for the right eye (with disparity) generated from a 2D image and the offset value (1-plane+offset), as a playback mode for playing PG.

Therefore, with the 3D-compatible player, PG plane control (1-plane (legacy playback)), and switching of configurations between 1-plane+offset and 2-planes are indirectly performed by selecting a PG stream.

Therefore, with regard to HDMV PG, mono PG streams that are the PG streams of a PG image that is a mono image serving as a 2D image, stereo PG streams that are the PG streams of a PG image that is a stereo image serving as a 3D image, and PG streams for offset that are the PG streams of a PG image that is a mono image used for generating a stereo image (e.g., streams including a PG image that is a mono image, and an offset value) are defined as the PG streams of a PG image conforming to the BD standard along with an offset value giving disparity to a mono image.

Further, with regard to HDMV PG, mono 1-stream (legacy content) mode, L/R 2 stream mode, and 1-stream+plane-offset mode are defined as a PG playback mode for playing a PG image.

Now, in the case that the PG playback mode is the mono 1-stream mode, a 2D PG image is played using mono PG streams.

In the case that the PG playback mode is the L/R 2 stream mode, a 3D PG image is played by playing an image for the left eye and an image for the right eye using stereo PG streams.

In the case that the PG playback mode is the 1-stream +plane-offset mode, a 3D PG image is played by generating an image for the left eye and an image for the right eye using PG streams for offset based on the offset value, and playing the image for the left eye and the image for the right eye.

Also, with regard to HDMV TextST, mono TextST streams that are the TextST streams of a TextST image that is a mono image serving as a 2D image, stereo TextST streams that are the TextST streams of a TextST image that is a stereo image serving as a 3D image, and TextST streams for offset that are the TextST streams of a TextST image that is a mono image used for generating a stereo image (e.g., streams including a TextST image that is a mono image and an offset value) are defined as the TextST streams of a TextST image conforming to the BD standard along with an offset value giving disparity to a mono image.

Further, wither regard to HDMV TextST, mono 1-stream (legacy content) mode, L/R 2 stream mode, and 1-stream+plane-offset mode are defined as a TextST playback mode for playing a TextST image.

Now, in the case that the TextST playback mode is the mono 1-stream mode, a 2D TextST image is played using mono TextST streams.

In the case that the TextST playback mode is the L/R 2 stream mode, a 3D TextST image is played by using stereo TextST streams to play the image for the left eye and the image for the right eye.

In the case that the TextST playback mode is the 1-stream+plane-offset mode, a 3D TextST image is played by generating an image for the left eye and an image for the right eye using TextST streams for offset based on the offset value, and playing the image for the left eye and the image for the right eye thereof.

With the 3D-compatible player, the configuration of the PG/TextST can be switched (set) through API for selecting streams.

FIG. 27 illustrates the PG playback mode and TextST playback mode whereby each video mode can be selected.

With regard to HDMV PG, even in the case that the video mode (configuration) is any of the mono video mode (mono), flattened stereo video mode (flattened stereo), dual mono video mode (dual-mono), forced mono video mode (forced-mono), and stereo video mode (stereo), the 1-stream +plane-offset mode (mono+offset) (PG streams for offset) can be selected.

Accordingly, the PG streams for offset can be selected even in the case that the video mode is any of the mono video mode, flattened stereo video mode, dual mono video mode, forced mono video mode, and stereo video mode.

Also, with regard to HDMV PG, the L/R 2 stream mode (stereo) (stereo PG streams) can be selected even in the case that the video mode is any of the flattened stereo video mode (flattened stereo), dual mono video mode (dual-mono), forced mono video mode (forced-mono), and stereo video mode (stereo).

Accordingly, the stereo PG streams can be selected even in the case that the video mode is any of the flattened stereo video mode, dual mono video mode, forced mono video mode, and stereo video mode.

However, in the case that the video mode is the mono video mode (mono), flattened stereo video mode (flattened stereo), forced mono video mode (forced-mono), or dual mono video mode (dual-mono), when the PG streams for offset (mono+offset) are selected, the mono image of the PG streams for offset is played ignoring the offset value (by setting the offset value to 0).

Also, in the case that the video mode is the mono video mode (mono) or forced mono video mode (forced-mono), when the stereo PG streams (stereo) are selected, one of an image for the left eye, and an image for the right eye making up a stereo image corresponding to the stereo PG streams, e.g., the image for the left eye (L PG streams) alone is played.

Further, in the case that the video mode is the flattened stereo video mode or dual mono video mode, when the stereo PG streams are selected, if there are (recorded in BD) PG streams for offset of which the stream number is matched with a stream number to be allocated to the selected stereo PG streams, instead of the selected stereo PG streams, the mono image of the PG streams for offset having the same stream number as the stereo PG streams thereof is played ignoring the offset value.

On the other hand, with regard to HDMV TextST, even in the case that the video mode (configuration) is any of the mono video mode (mono), flattened stereo video mode (flattened stereo), forced mono video mode (forced-mono), and dual mono video mode (dual-mono), the 1-stream+plane-offset mode (mono+offset) (Text subtitle streams for offset) can be selected.

Accordingly, the TextST streams for offset (Text subtitle streams for offset) can be selected in the case that the video mode is one of the mono video mode, flattened stereo video mode, forced mono video mode, and dual mono video mode.

Also, with regard to HDMV TextST, even in the case that the video mode is any of the flattened stereo video mode (flattened stereo), dual mono video mode (dual-mono), forced mono video mode (forced-mono), and stereo video mode (stereo), the L/R 2 stream mode (stereo) (stereo Text subtitle streams) can be selected.

Accordingly, the stereo TextST streams (stereo Text subtitle streams) can be selected even in the case that the video mode is any of the flattened stereo video mode, dual mono video mode, forced mono video mode, and stereo video mode.

However, in the case that the video mode is the mono video mode (mono), flattened stereo video mode (flattened stereo), forced mono video mode (forced-mono), or dual mono video mode (dual-mono), when the TextST streams for offset (mono+offset) are selected, the mono image of the TextST streams for offset is played ignoring the offset value.

Also, in the case that the video mode is the mono video mode (mono) or forced mono video mode (forced-mono), when the stereo TextST streams (stereo) are selected, one of an image for the left eye, and an image for the right eye making up a stereo image corresponding to the stereo TextST streams, e.g., the image for the left eye (L TextST streams) alone is played.

Further, in the case that the video mode is the flattened stereo video mode or dual mono video mode, when the stereo TextST streams are selected, if there are TextST streams for offset of which the stream number is matched with a stream number to be allocated to the selected stereo TextST streams, instead of the selected TextST streams, the mono image of the TextST streams for offset having the same stream number as the stereo TextST streams thereof is played ignoring the offset value.

Figure 28:
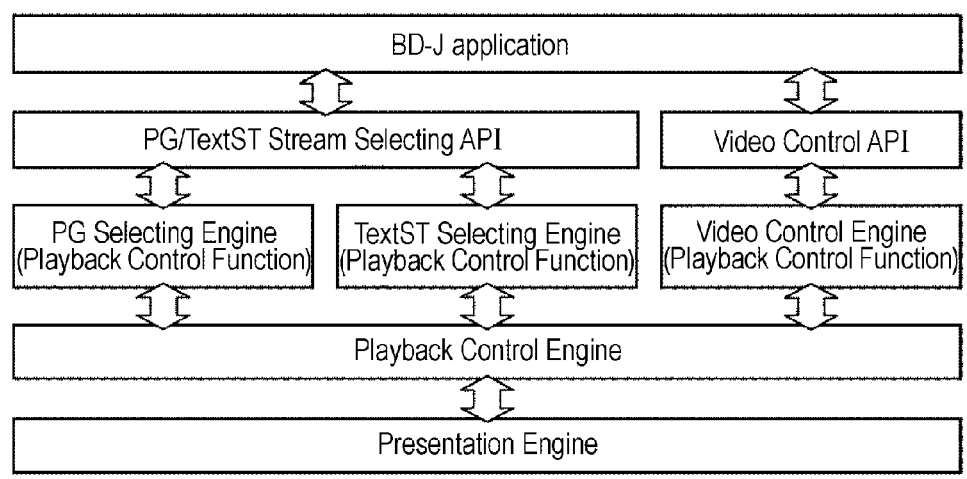
FIG. 28 is a block diagram illustrating a functional configuration example of a 3D-compatible player.

FIG. 28 is a block diagram illustrating a functional configuration example of the BD player in FIG. 3 as a 3D-compatible player for performing playback of PG or TextST image such as described above.

In FIG. 28, a 3D-compatible player is configured of a BD-J application, PG/TextST stream selecting API, video control API, PG selecting engine (Playback Control Function), TextST selecting engine (Playback Control Function), video control engine (Playback Control Function), playback control engine (Playback Control Engine), presentation engine (Presentation Engine), and the like.

Processing of the 3D-compatible player in FIG. 28 will be described with reference to FIG. 29 with processing regarding PG as an example.

The BD-J application calls up the PG/TextST stream selecting API to request selection of PG streams. The PG/TextST stream selecting API selects the PG streams requested from the BD-J application.

That is to say, such as described in FIG. 27, in the event that the PG streams requested from the BD-J application can be selected as to the current video mode, the PG/TextST stream selecting API controls the PG selecting engine so as to select the PG streams thereof.

The PG selecting engine selects the PG streams in accordance with the control of the PG/TextST stream selecting API from the PG streams recorded in the disc 100 (FIG. 3) which is BD, and supplies these to a stereo PG decoder or mono PG decoder not illustrated in FIG. 28.

Now, in the case that the PG streams selected by the PG selecting engine are stereo PG streams, the stereo PG streams thereof are supplied to the stereo PG decoder.

Also, in the case that the PG streams selected by the PG selecting engine are PG streams for offset, the PG streams for offset are supplied to the mono PG decoder.

The stereo PG decoder decodes the PG streams supplied from the PG selecting engine to an image for the left eye, and an image for the right eye making up a stereo image, and draws the image for the left eye and the image for the right eye on the L-PG plane 12L and the R-PG plane 12R of the PG plane 12, respectively.

On the other hand, the mono PG decoder decodes the PG streams for offset supplied from the PG selecting engine to a mono image, and draws this on the logical plane 10.

The PG generating API uses the offset value (e.g., the offset value included in the PG streams for offset, the internal storage region of the 3D-compatible player, or the offset value stored in PSR#21) to generate an image for the left eye and an image for the right eye from the mono image drawn on the logical plane 10. Subsequently, the PG generating API draws the image for the left eye and the image for the right eye thereof on the L-PG plane 12L and the R-PG plane 12R of the PG plane 12, respectively.

Note that, with the 3D-compatible BD player, such as described in FIG. 27, depending on a combination between the current video mode and the PG streams (PG playback mode) selected by the PG selecting engine, one of the image for the left eye and the image for the right eye making up the stereo image corresponding to the stereo PG streams, e.g., only the image for the left eye may be played, or only the mono image corresponding to the PG streams for offset may be played ignoring the offset value.

As described above, with the 3D-compatible player, mono PG streams that are the PG streams of a PG image that is a mono image serving as a 2D image, stereo PG streams that are the PG streams of a PG image that is a stereo image serving as a 3D image, and PG streams for offset that are the PG streams of a PG image that is a mono image used for generating a stereo image are defined as the PG streams of a PG image conforming to the BD standard along with an offset value that is data giving disparity to a mono image. Subsequently, the PG/TextST stream selecting API selects mono PG streams, stereo PG streams, or PG streams for offset in accordance with the request from the BD-J application.

Accordingly, playback of a PG image (configuration of PG) can indirectly be controlled from the BD-J application.
Switching Playback of 3D Image, and Playback of 2D Image FIG. 30 is a diagram for describing switching between playback of a 3D image and playback of a 2D image at the 3D-compatible player.

Figure 30:
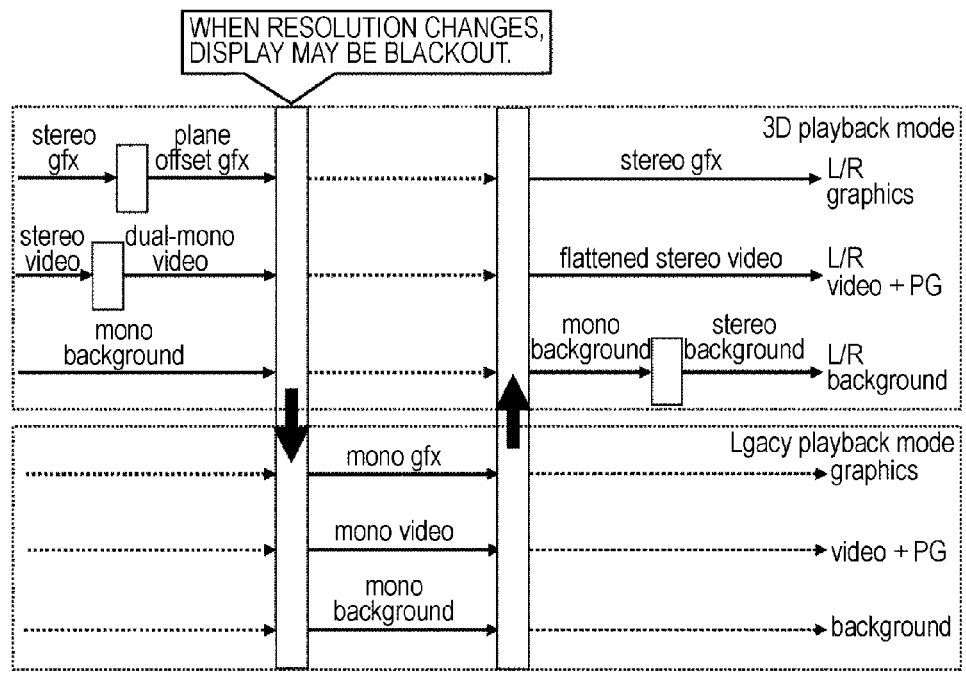
FIG. 30 is a diagram for describing switching between playback of 3D images and playback of 2D images at a 3D-compatible player.

In FIG. 30, first, the operation mode of the 3D-compatible player is a 3D playback mode for playing 3D images.

Subsequently, the graphics mode is the stereo graphics mode (stereo gfx (graphics)), the video mode is the stereo video mode (stereo video), and the background mode is the mono background mode (mono background), respectively.

Subsequently, the graphics mode is changed to the offset graphics mode (plane offset gfx), and the video mode is changed to the dual mono video mode (dual-mono video), respectively.

Further, subsequently, in FIG. 30, the operation mode is changed from the 3D playback mode to the 2D playback mode (Legacy playback mode) for playing 2D images in the same way as with the legacy player.

In accordance with change in the operation mode, the graphics mode is changed from the offset graphics mode (plane offset gfx) to the mono graphics mode (mono gfx). Further, the video mode is changed from the dual mono video mode (dual-mono video) to the mono video mode (mono video). Note that the background mode is still in the mono background mode (mono background).

Subsequently, in FIG. 30, the operation mode is changed from the 2D playback mode to the 3D playback mode again.

In accordance with change in the operation mode, the graphics mode is changed from the mono graphics mode (mono gfx) to the stereo graphics mode (stereo gfx). Further, the video mode is changed from the mono video mode (mono video) to the flattened stereo video mode (flattened stereo video). Note that the background mode is still in the mono background mode (mono background).

In FIG. 30, subsequently, the background mode is changed from the mono background mode (mono background) to the stereo background mode (stereo background).

In FIG. 30, for example, in the case that the operation mode is changed from the 3D playback mode to the 2D playback mode, when change in resolution (image frame) is accompanied, the display screen may black out.
Pixel Coordinate System for Video JMF (Java (registered trademark) Media Framework) control such as "javax.tv.media.AWTVideoSizeControl", "org.dvb.media.BackgroundVideoPRsentationControl", or the like can be used for the control of the position and size of video from a BD-J application.

Note that the author of a BD-J application sets the position and size of video using not the coordinates on the plane (video plane 13) but display coordinates.

Also, the 3D-compatible player has to perform correction of the position and size of each of the image for the left eye (L video source) and the image for the right eye (R video source).

Figure 31:
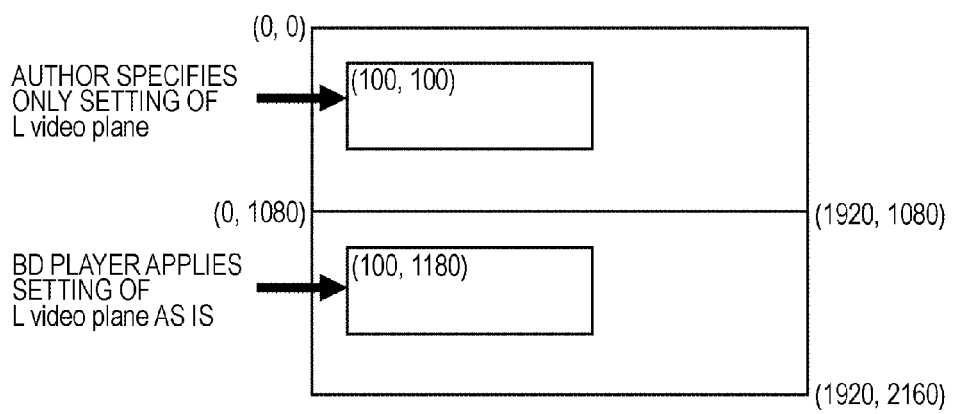
FIG. 31 is a diagram for describing settings of the position and size of a video by an author, and correction of the position and size of a video by a 3D-compatible player.

For example, the display coordinate system is a coordinate system of the size of 1920×1080 pixels as to the video plane 13 of 1920×2160 pixels, vertically a half thereof. In this case, the author has to set the position and size of video such as the following, for example.
RctangL src=new RctangL(0, 0, 1920, 1080);
RctangL dest=new RctangL(100, 100, 960, 540);
AWTVideoSizeControl videoSizeControl=(AWTVideoSizeControl)player.getControl("javax.tv.media.AWTVideoSizeControl");
videoSizeControl.setSize(new AWTVideoSize(src, dest));

FIG. 31 is a diagram for describing the settings of the position and size of video by the author, and correction of the position and size of video by the 3D-compatible player.

The author sets the position and size of the image for the left eye of video. In FIG. 31, the position and size of the image for the left eye of video are set to the display coordinate system of the size of 1920×1080 pixels.

The 3D-compatible player sets the settings of the position and size of the image for the left eye of video as to the display coordinate system to the L video plane 13L of the video plane 13 without change.

Further, the 3D-compatible player applies the settings of the position and size of video of the L video plane 13L to the R video plane 13R without change.

Accordingly, as viewed from the author, in the event that the position and size of video are set to the L video plane 13L, the same position and same size as those of video thereof are also set to the R video plane 13R.

Now, with regard to video, depth information is not provided externally. Accordingly, an arrangement for providing an offset is not only wasteful but also can lead to output unintended by the video producer.

That is to say, while video producers should produce video images so as to display intended 3D images. Accordingly, with the 3D-compatible player, for example, upon processing being performed such as shifting of the positions of the images (image for the left eye and image for the right eye) of video drawn on the video plane 13, or the like, according to information to be provided externally such as the offset value or the like stored in PSR#21 (FIG. 7), an image that the video producer does not intend may be displayed.

Therefore, with the 3D-compatible player, L/R video plane is defined on the configuration, but restraints are provided so as to allow the author of a BD-J application to handle only L video plane. That is to say, the 3D-compatible player also has to apply the API call-up of L video scaling/L video positioning by a BD-J application to R video scaling/R video positioning.

Note that in the event that according to the size of video being set, the video is scaled with the size thereof, the PG plane offset value is, such as described in "Switching of PG/Text Subtitle Configuration", scaled with a scaling ratio (enlargement ratio or reduction ratio) for scaling video, but the graphics plane offset value is also scaled with the scaling ratio of video in the same way.

Figure 32:
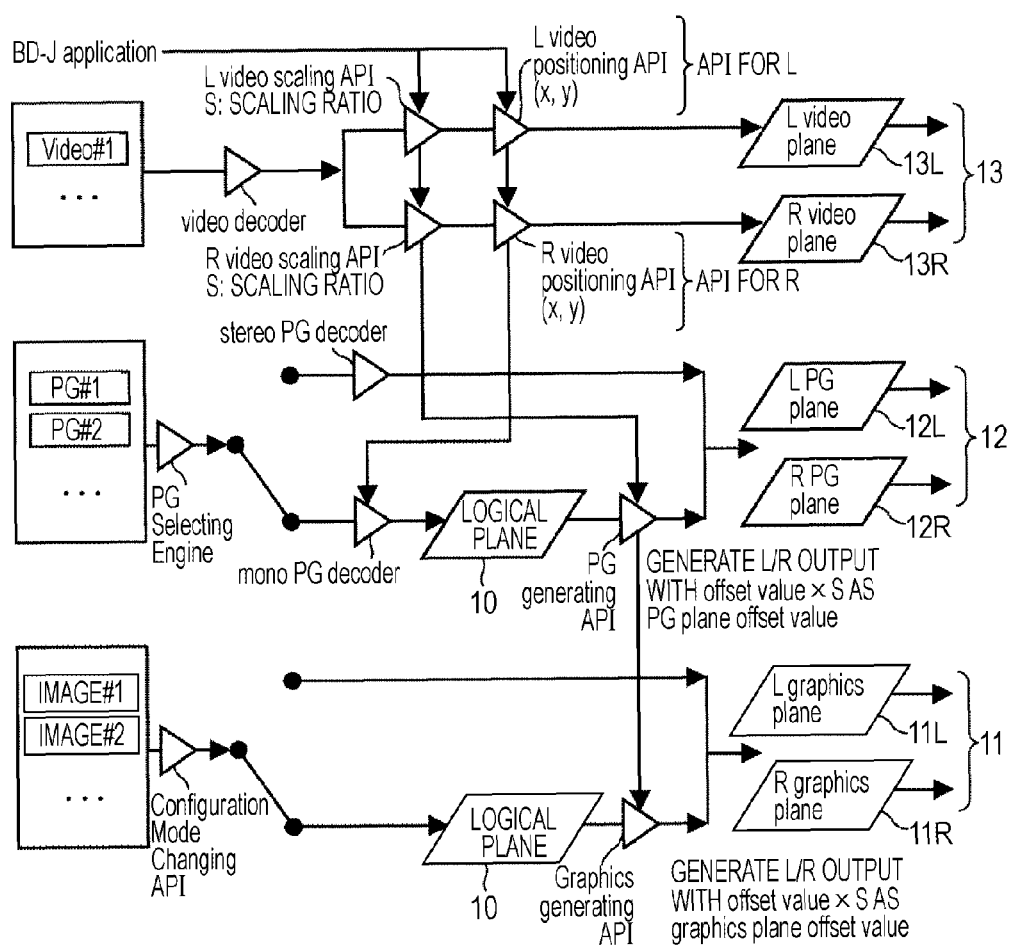
FIG. 32 is a block diagram illustrating a functional configuration example of a 3D-compatible player.

FIG. 32 is a block diagram illustrating a functional configuration example of the BD player in FIG. 3 which is a 3D-compatible player for performing the position setting (correction) and size setting (scaling) of video, such as described above.

The 3D-compatible player in FIG. 32 includes API for L for setting the size and position of an image to be stored in the L video plane 13L (L region), and API for R for setting the size and position of an image to be stored in the R video plane 13R (R region). Subsequently, one of the API for L and the API for R sets the same size and same position as the size and position of the image set by the other API.

That is to say, with the 3D-compatible player in FIG. 32, a video decoder (Video decoder) decodes video, and supplies the image for the left eye, and the image for the right eye, of the video obtained as a result thereof to the API for L and the API for R.

The API for L is made up of L video scaling (L(Left) video scaling) API and L video positioning (L(Left) positioning) API, and sets the position and size of the image for the left eye from the video decoder according to call-up of the setting requests for the position and size of video from a BD-J application.

That is to say, the L video scaling API performs scaling for controlling the size of the image for the left eye from the video decoder so as to obtain the size according to the request from the BD-J application, and supplies this to the L video positioning API.

The L video positioning API controls the position of the image for the left eye from the L video scaling API so as to obtain the position according to the request from the BD-J application, and draws an image for the left eye obtained as a result thereof on the L video plane 13L (draws the image for the left eye from the L video scaling API on the position on the L video plane 13L according to the request from the BD-J application).

Also, the L video scaling API calls up a later-described R video scaling API to perform the same request as the request from the BD-J application. Further, the L video positioning API calls up a later-described R video positioning API to perform the same request as the request from the BD-J application.

Also, according to call-up of the setting requests for the size of video, the L video scaling API supplies a scaling ratio (enlargement ratio or reduction ratio) S at the time of scaling the image (the image for the left eye) of video to the PG generating API and the graphics generating API.

The API for R is made up of R video scaling (R(Right) video scaling) API, and R video positioning (R(Right) positioning) API, and sets the position and size of the image for the right eye from the video decoder according to the setting requests of the position and size of video from the API for L.

That is to say, the R video scaling API controls the size of the image for the right eye from the video decoder so as to obtain the size according to the request from the L video scaling API, and supplies this to the R video positioning API.

The R video positioning API controls the position of the image for the right eye from the R video scaling API so as to obtain the position according to the request from the L video positioning API, and draws an image for the right eye obtained as a result thereof on the R video plane 13R.

As described above, of API for L for setting the size and position of an image to be stored in the L video plane 13L (L region), and API for R for setting the size and position of an image to be stored in the R video plane 13R (R region), one API thereof, e.g., the API for R sets the same size and same position as the size and position of the image set by the API for L that is the other API according to the request from the BD-J application.

Accordingly, with regard to the video plane 13 where a video image conforming to the BD standard is stored, the author is allowed to handle only the L video plane 13L which is one of the L video plane 13L (L region) and the R video plane 13R (R region), and accordingly, a video image unintended by the video producer can be prevented from being displayed.

Figure 29:
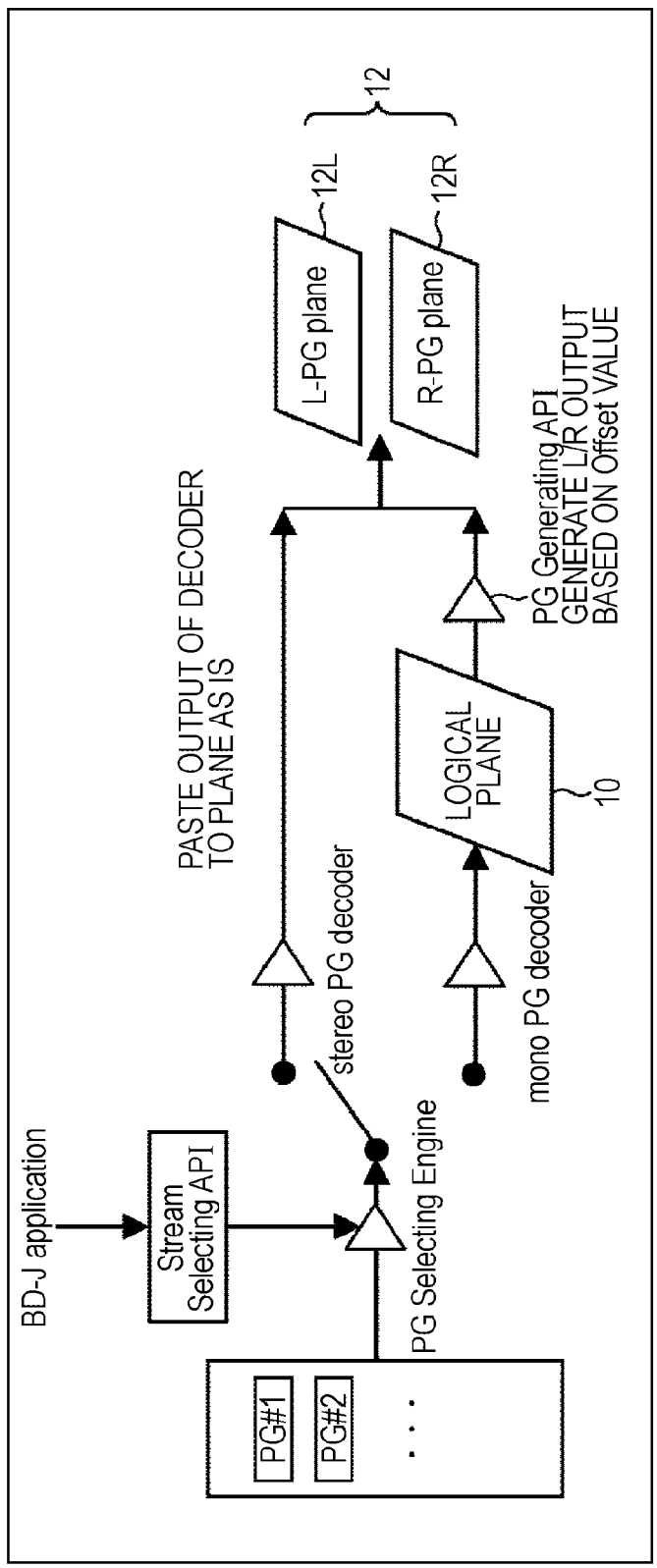
FIG. 29 is a diagram for describing processing of a 3D-compatible player regarding PG.

With the 3D-compatible player, the processing described in FIG. 29 is further performed regarding PG.

However, with the PG generating API, the PG plane offset value (e.g., an offset value included in the PG streams for offset, an offset value stored in the internal storage region or PSR#21 of the 3D-compatible player) is scaled with the scaling ratio S from the L video scaling API (the PG plane offset value is multiplied by the scaling ratio S).

Subsequently, with the PG generating API, an image for the left eye and an image for the right eye are generated from the mono image drawn on the logical plane 10 using the PG plane offset value after scaling.

Also, with the 3D-compatible player, the configuration mode changing API selects an image in the graphics mode according to the request from the BD-J application from the graphics images recorded in the disc 100 (FIG. 3) which is BD, and draws this on the graphics plane 11.

That is to say, in the case that the video mode is, for example, the stereo graphics mode, the image for the left eye and the image for the right eye of graphics that is a stereo image are drawn on the L graphics plane 11L and the R graphics plane 11R of the graphics plane 11, respectively.

Also, in the case that the video mode is, for example, the offset graphics mode, the image of graphics that is a mono image is drawn on the logical plane 10, and further, the graphics generating API scales the graphics plane offset value (e.g., an offset value stored in the internal storage region or PSR#21 of the 3D-compatible player) with the scaling ratio S from the L video scaling API.

Subsequently, the graphics generating API uses the graphics plane offset value after scaling to generate an image for the left eye and an image for the right eye from the mono image drawn on the logical plane 10, and draws these on the L graphics plane 11L and the R graphics plane 11R, respectively.

Pixel Coordinate System for Graphics

The pixel coordinate system effective for the stereo graphics configuration (configuration for displaying graphics 3D images) is one of the following.

(0, 0)-(1920, 2160)
(0, 0)-(1280, 1440)
(0, 0)-(720, 960)
(0, 0)-(720, 1152)
(0, 0)-(960, 1080)

The top half (top-half) is assigned to L graphics view, and the bottom half (bottom-half) is assigned to R graphics view.

Figure 33:
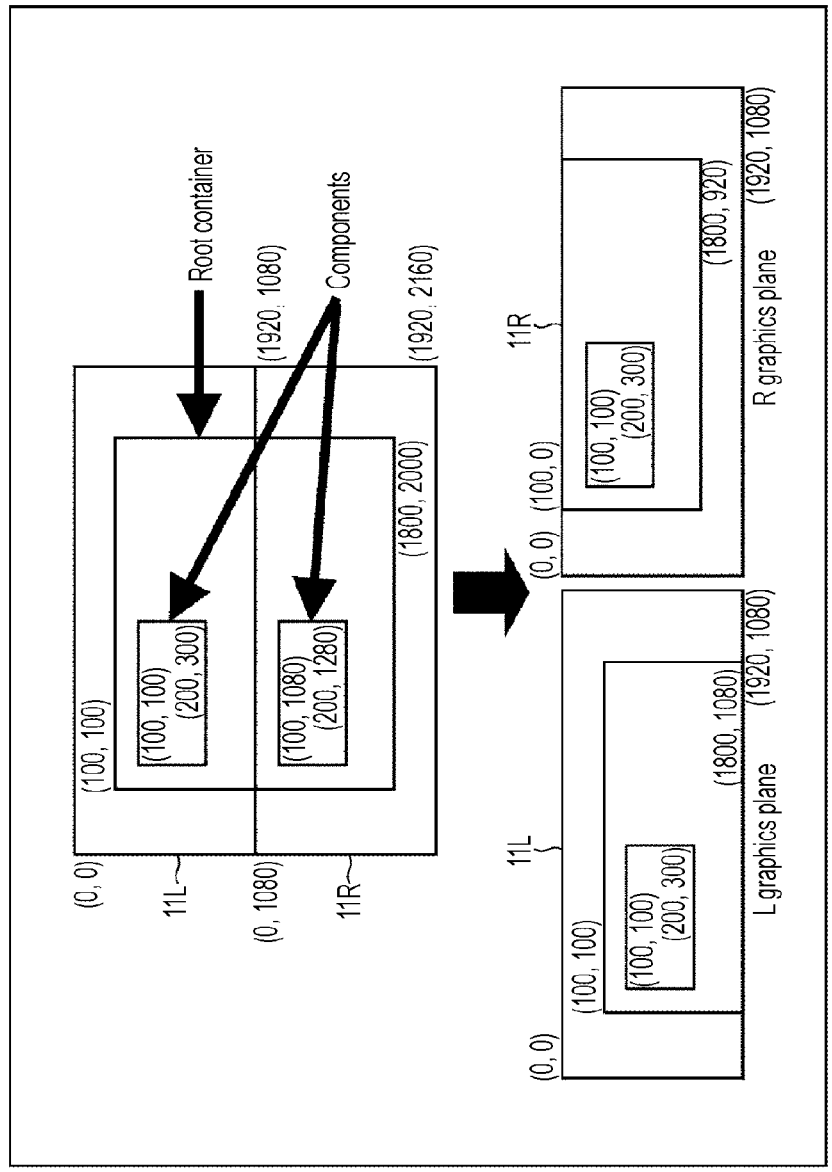
FIG. 33 is a diagram illustrating the graphics plane 11 of 1920×2160 pixels.

FIG. 33 illustrates the graphics plane 11 of 1920×2160 pixels.

An image drawn on the L graphics plane 11L which is a storage region on the upper side of the graphics plane 11 (top-half) is an image for the left eye observed by the left eye (L(Left) graphics view), and an image drawn on the R graphics plane 11R which is a storage region on the lower side of the graphics plane 11 (bottom-half) is an image for the right eye observed by the right eye (R(Right) graphics view).

In FIG. 33, one container (Root container) and two components (Components) that are children of the container thereof are drawn on the graphics plane 11.

The coordinates of a component are represented with relative coordinates with the container serving as the parent of the component thereof as a reference.

Note that, with the 3D-compatible player, a buffer region for the purpose of guard does not have to be provided to the edge of the graphics plane 11.

Also, the 3D-compatible player has to implement an arrangement for suppressing mismatching between L-view and R-view.

Now, the BD player which is a legacy player has no mechanism for detecting completion of drawing by a BD-J application and transferring this to a monitor after completion. In the case of L and R video outputs, output mismatching may occur between L graphics and R graphics.

Therefore, with the 3D-compatible player, some sort of API call-up is defined as a signal indicating completion of drawing by the BD-J application. Conversely, if the BD-J application does not call up the corresponding drawing completion notification API, nothing is output on the screen. The author has to resort to using this technique.

That is to say, after the image (image for the left eye) is drawn on the L graphics plane 11L, before drawing of an image as to the R graphics plane 11R is completed, upon the drawing content of the graphics plane 11 being displayed on the display screen as an image for the left eye and an image for the right eye, the image for the left eye and the image for the right eye thereof are mismatched images not viewable as a 3D image (in this case, drawing of the image for the right eye is imperfect), and accordingly, this causes an uncomfortable feeling to the user who looks at the image on the display screen.

Thus, in order to prevent the user from having uncomfortable feeling, the 3D-compatible player has a function for suppressing mismatching between the image for the left eye and the image for the right eye, i.e., a function for preventing the image for the left eye and the image for the right eye which are in a mismatched state from being displayed on the display screen so as to be viewable as a 3D image.

Specifically, after completing drawing of both of the image for the left eye and the image for the right eye as to the graphics plane 11, the 3D-compatible player outputs the image for the left eye and the image for the right eye thereof to display these.

Accordingly, the 3D-compatible player needs to recognize that drawing of both of the image for the left eye and the image for the right eye as to the graphics plane 11 has been completed.

Direct-Drawing Model

With Direct-drawing, the 3D-compatible player does not have a technique for telling whether or not issuance of drawing commands for drawing a graphics image from the BD-J application has been completed.

Specifically, in the case that the BD-J application has issued drawing commands #1, #2, and so on through #N, and drawing of an image to the graphics plane 11 has been performed in accordance with the drawing commands #1 through #N, thereafter the 3D-compatible player is incapable of recognizing whether or not a drawing command will be further issued, i.e., whether or not issuance of drawing commands by the BD-J application has been completed.

Therefore, in the case of performing drawing of images as to the graphics plane 11 by drawing commands, the author of the BD-J application is obligated to recognize call-up of the drawing integrity guarantee API for guaranteeing the integrity of drawing of graphics so as not to return the processing to the BD-J application until drawing of images as to the graphics plane 11 is completed, as signaling as to the 3D-compatible player.

Alternatively, in the case of performing drawing of images as to the graphics plane 11 by drawing commands, the author of the BD-J application is obligated to recognize call-up of the drawing completion notification API for notifying that drawing of images as to the graphics plane 11 has been completed, as signaling as to the 3D-compatible player.

Alternatively, in the case of performing drawing of images as to the graphics plane 11 by drawing commands, the author of the BD-J application is obligated to recognize call-up of the drawing start notification API for notifying that drawing of images as to the graphics plane 11 is started, and the subsequent call-up of the drawing completion notification API for notifying that drawing of images as to the graphics plane 11 has been completed, as signaling as to the 3D-compatible player.

In this case, the 3D-compatible player can recognize that drawing of images as to the graphics plane 11 has been completed, i.e., issuance of drawing commands has been completed, through call-up of the drawing integrity guarantee API, call-up of the drawing completion notification API, or call-up of the drawing start notification API and the subsequent call-up of the drawing completion notification API by the BD-J application. Subsequently, as a result thereof, the image for the left eye and the image for the right eye can be displayed in a matched state (so as to be viewable as a 3D image).

Here, dedicated API with a drawing command train as an argument can be defined as the drawing integrity guarantee API.

Now, for example, the java.awt.Toolkit#sync( ) method can be employed as the drawing completion notification API. In this case, with the 3D-compatible player, as long as call-up of the java.awt.Toolkit#sync( ) method is not performed, images drawn on the graphics plane 11 are not output, and accordingly, the images drawn on the graphics plane 11 are not displayed on the display screen.

Further, for example, a predetermined method of Java (registered trademark) or dedicated API can be defined as the drawing start notification API.

Note that, upon call-up of the java.awt.Toolkit#sync( ) method being performed multiple times during one frame (during 1-video-frame), graphics-frames may include dropped frames. Accordingly, it is not allowed for call-up of the java.awt.Toolkit#sync( ) method to be consecutively performed multiple times, or to be consecutively performed with little drawing therebetween.

Repaint Model

With an AWT (Abstract Windowing toolkit) paint model, the repaint( ) method of the root container serving as a part making up a graphics image calls up the update( ) method of each component serving a part making up a graphics image.

Subsequently, with the AWT paint model, the drawing process of a graphics image can completely be controlled (fully be controlled) at the 3D-compatible player, and accordingly, the 3D-compatible player can recognize that drawing of images as to the graphics plane 11 has been completed.

Accordingly, implementation of the 3D-compatible player can be performed so that the image for the left eye and the image for the right eye in a matched state are displayed, even in the event that call-up of the above drawing completion notification API is not performed.

Figure 34:
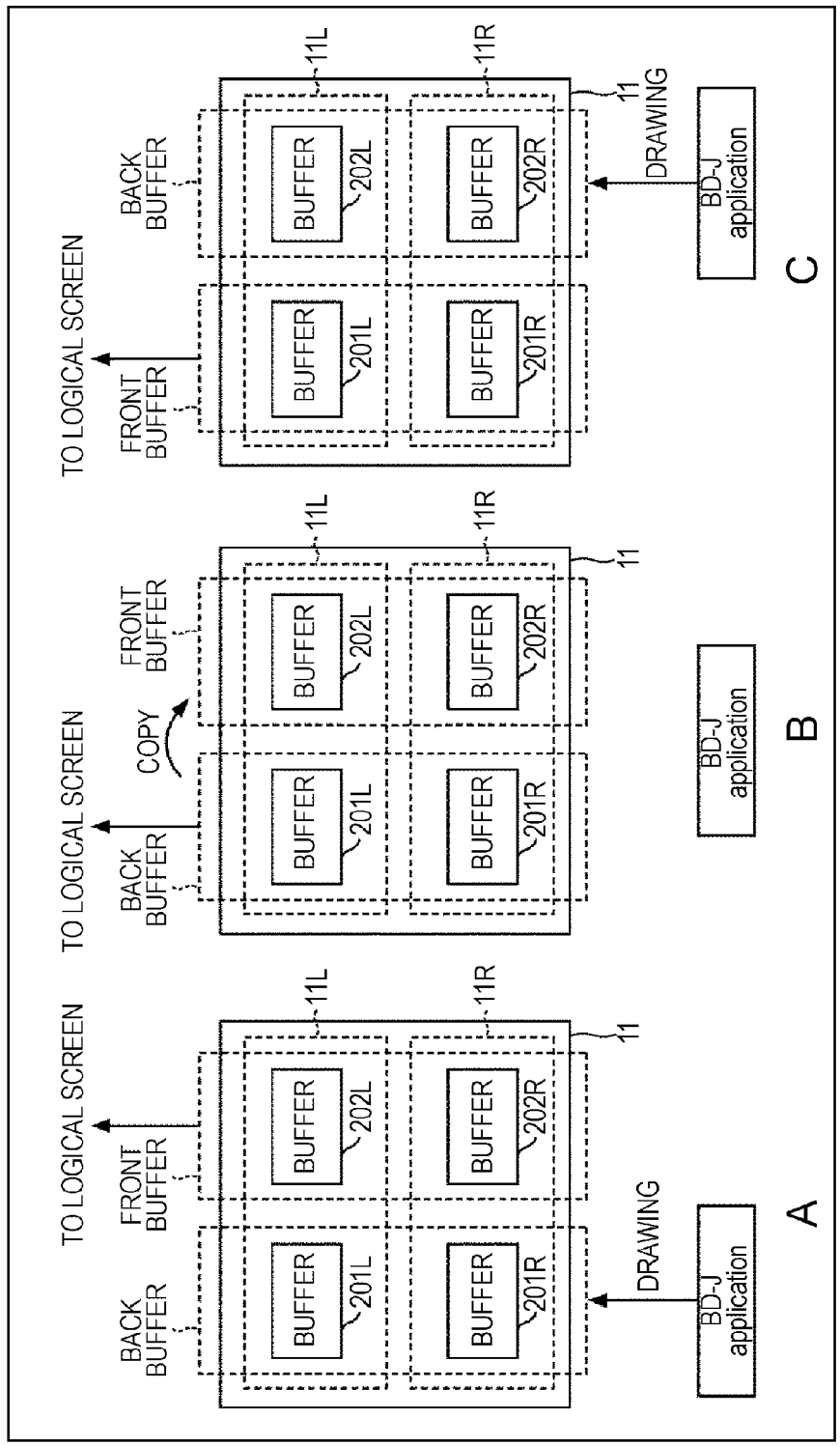
FIG. 34 is a block diagrams illustrating a functional configuration example of a 3D-compatible player.

FIG. 34 is a block diagram illustrating a functional configuration example of the BD player in FIG. 3 which is a 3D-compatible player for recognizing that issuance of drawing commands has been completed by obligating call-up of the drawing integrity guarantee API, or call-up of the drawing completion notification API, and the subsequent call-up of the drawing start notification API.

Now, let us say that call-up of the drawing completion notification API is performed by the BD-J application in the event that drawing of images as to the graphics plane 11 has been completed.

The 3D-compatible player includes buffers 201L and 201R, and buffers 202L and 202R, serving as the graphics plane 11.

Note that, in FIG. 34, the buffers 201L and 202L are equivalent to the L graphics plane 11L, and the buffers 201R and 202R are equivalent to the R graphics plane 11R.

Also, a set of the buffers 201L and 201R, and a set of the buffers 202L and 202R alternately serve as a back buffer (hidden buffer) and a front buffer.

Here, the back buffer is a buffer where drawing of graphics images is performed by the BD-J application, and the front buffer is a buffer where images to be displayed on the display screen (logical screen 21) are stored while drawing of images is performed in the back buffer.

A in FIG. 34 illustrates the 3D-compatible player in a state in which the set of the buffers 201L and 201R are the back buffer, and the set of the buffers 202L and 202R are the front buffer.

In A in FIG. 34, drawing of graphics images (image for the left eye and image for the right eye) by the BD-J application is performed as to the buffers 201L and 201R serving as the back buffer, and images (image for the left eye and image for the right eye) stored in the buffers 202L and 202R serving as the front buffer are output as output to the display screen.

Upon drawing of the graphics images being completed as to the buffers 201L and 201R serving as the back buffer, the BD-J application calls up the drawing completion notification API.

Upon call-up of the drawing completion notification API being performed, the 3D-compatible player starts output of the images stored in the back buffer to the display screen as substitute for the front buffer.

That is to say, B in FIG. 34 illustrates the 3D-compatible player immediately after call-up of the drawing completion notification API is performed.

Upon call-up of the drawing completion notification API being performed, the 3D-compatible player starts output of the images stored in the buffers 201L and 201R serving as the back buffer to the display screen as substitute for the images stored in the buffers 202L and 202R serving as the front buffer.

Further, the 3D-compatible player copies the images stored in the buffers 201L and 201R serving as the back buffer to the buffers 202L and 202R serving as the front butter.

Subsequently, the 3D-compatible player switches the back buffer and the front buffer.

Specifically, the 3D-compatible player sets the buffers 201L and 201R serving as the back buffer to the front buffer, and sets buffers 202L and 202R serving as the front buffer to the back buffer.

That is to say, C in FIG. 34 illustrates the 3D-compatible player in a state in which the set of the buffers 201L and 201R are the front buffer, and the set of the buffers 202L and 202R are the back buffer.

The BD-J application starts drawing of graphics images as to the buffers 202L and 202R serving as the back buffer, and thereafter, the same processing is repeated.

Figure 35:
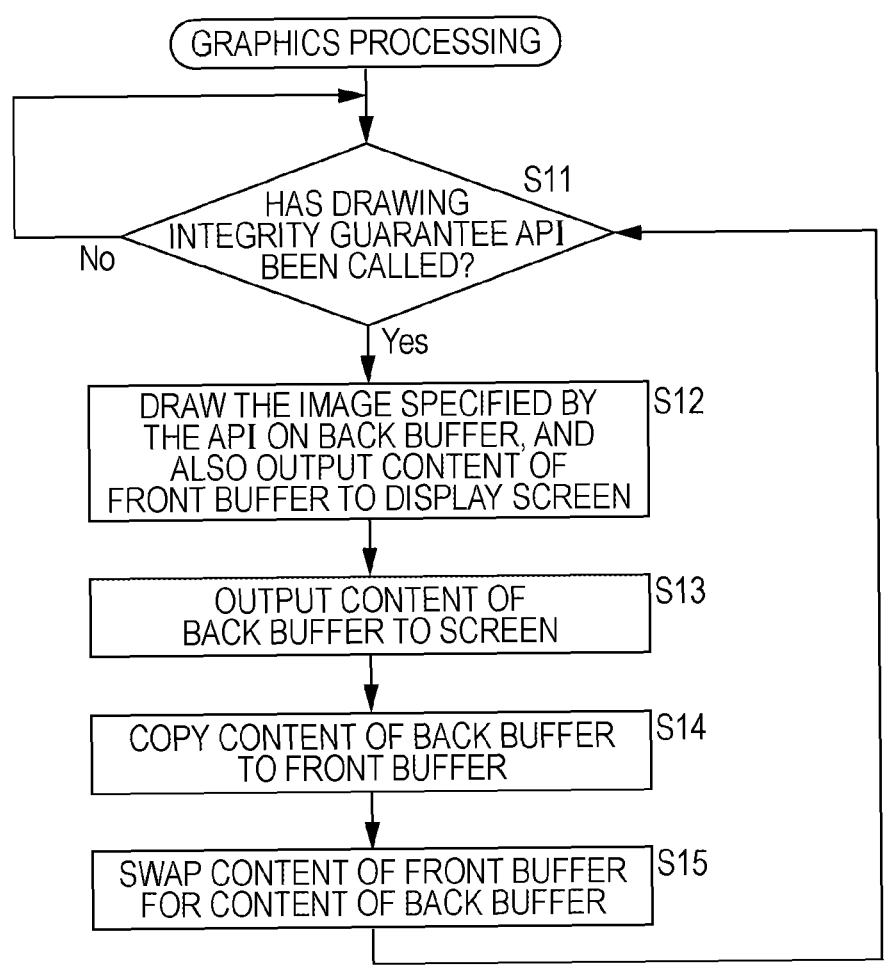
FIG. 35 is a flowchart for describing graphics processing by a 3D-compatible player.

FIG. 35 is a flowchart for describing the graphics processing by the 3D-compatible player in FIG. 34, in the event that the BD-J application calls up the drawing integrity guarantee API.

In step S11, the 3D-compatible player determines whether or not call-up of the drawing integrity guarantee API has been performed from the BD-J application, and in the event that determination is made that call-up of the drawing integrity guarantee API has not been performed, the 3D-compatible player returns to step S11.

Also, in the event that determination is made in step S11 that call-up of the drawing integrity guarantee API has been performed, the 3D-compatible player proceeds to step S12, sequentially executes a drawing command train serving as an argument of the drawing integrity guarantee API, and draws graphics images obtained as a result of execution thereof on the back buffer, and also outputs the graphics images stored in the front buffer to the display screen (output for display).

Subsequently, after drawing to the back buffer is completed, in step S13 the 3D-compatible player outputs the graphics images stored in the back buffer to the display screen as substitute for the front buffer (output for display).

Subsequently, in step S14 the 3D-compatible player copies the graphics images stored in the back buffer to the front buffer.

Subsequently, in step S15 the 3D-compatible player switches the back buffer and the front buffer, returns to step S11, and thereafter, the same processing is repeated.

As described above, with the 3D-compatible player, in the event of call-up of the drawing integrity guarantee API for guaranteeing the integrity of drawing of graphics images being performed from the BD-J application as to the graphics plane 11 (which is the back buffer), the images drawn on the graphics plane 11 are output for display.

Accordingly, with the 3D-compatible player, after awaiting completion of drawing of graphics images by the BD-J application, the images drawn on the graphics plane 11 can be displayed, and accordingly, the image for the left eye and the image for the right eye in a mismatched state can be prevented from being displayed on the display screen.

Figure 36:
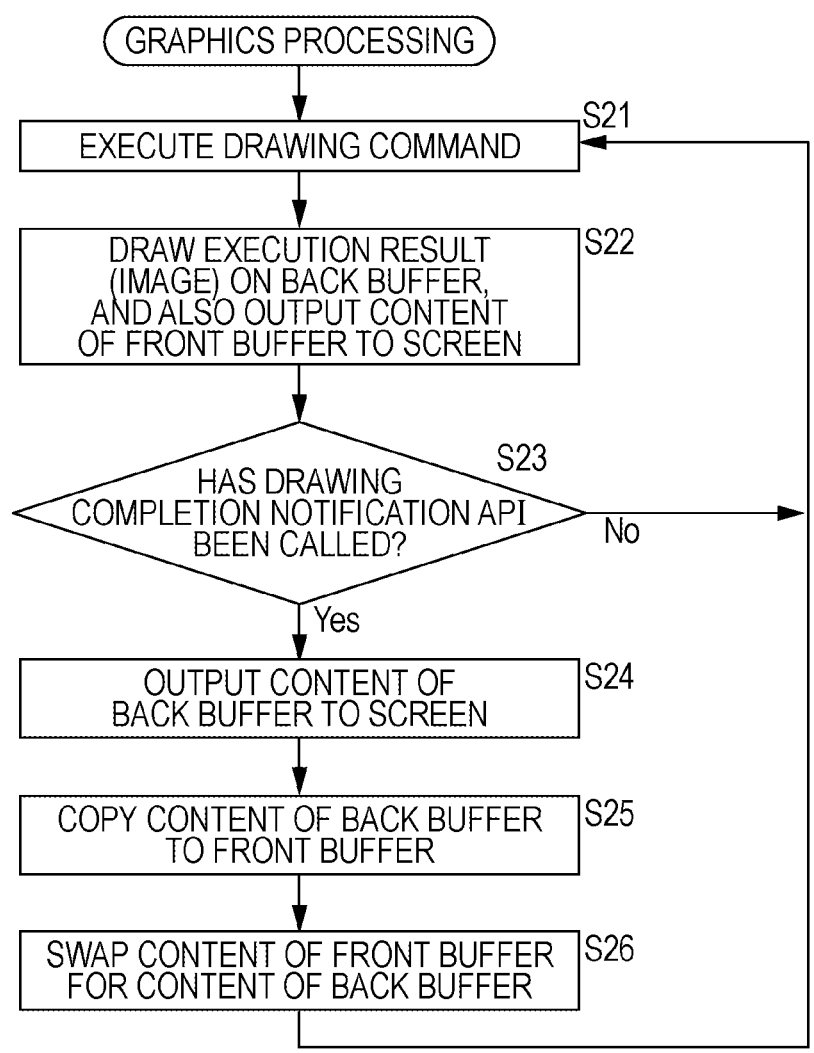
FIG. 36 is a flowchart for describing graphics processing by a 3D-compatible player.

FIG. 36 is a flowchart for describing the graphics processing by the 3D-compatible player in FIG. 34, in the event that the BD-J application calls up the drawing completion notification API.

The 3D-compatible player awaits issuance of a drawing command from the BD-J application, and in step S21 executes the drawing command thereof.

Subsequently, in step S22 the 3D-compatible player draws graphics images obtained as a result of execution of the drawing command in the back buffer, and also outputs the graphics images stored in the front buffer to the display screen (output for display).

Subsequently, in step S23 the 3D-compatible player determines whether or not call-up of the drawing completion notification API has been performed from the BD-J application.

In the case that determination is made in step S23 that call-up of the drawing completion notification API has not been performed, the 3D-compatible player awaits issuance of a drawing command from the BD-J application, and returns to step S21, and thereafter, the same processing is repeated.

Also, in the case that determination is made in step S23 that call-up of the drawing completion notification API has been performed, the 3D-compatible player proceeds to step S24, and outputs the graphics images stored in the back buffer to the display screen as substitute for the front buffer (output for display).

Subsequently, in step S25 the 3D-compatible player copies the graphics images stored in the back buffer to the front buffer.

Subsequently, in step S26 the 3D-compatible player switches the back buffer and the front buffer, awaits issuance of a drawing command from the BD-J application, and returns to step S21, and thereafter, the same processing is repeated.

As described above, with the 3D-compatible player, in the event of call-up of the drawing completion notification API for notifying that drawing of graphics images as to the graphics plane 11 (serving as the back buffer) has been completed being performed from the BD-J application, the images drawn on the graphics plane 11 are output for display.

Accordingly, after notification that drawing of graphics images by the BD-J application has been completed being performed, the images drawn on the graphics plane 11 can be displayed, and accordingly, the image for the left eye and the image for the right eye in a mismatched state can be prevented from being displayed on the display screen.

Figure 37:
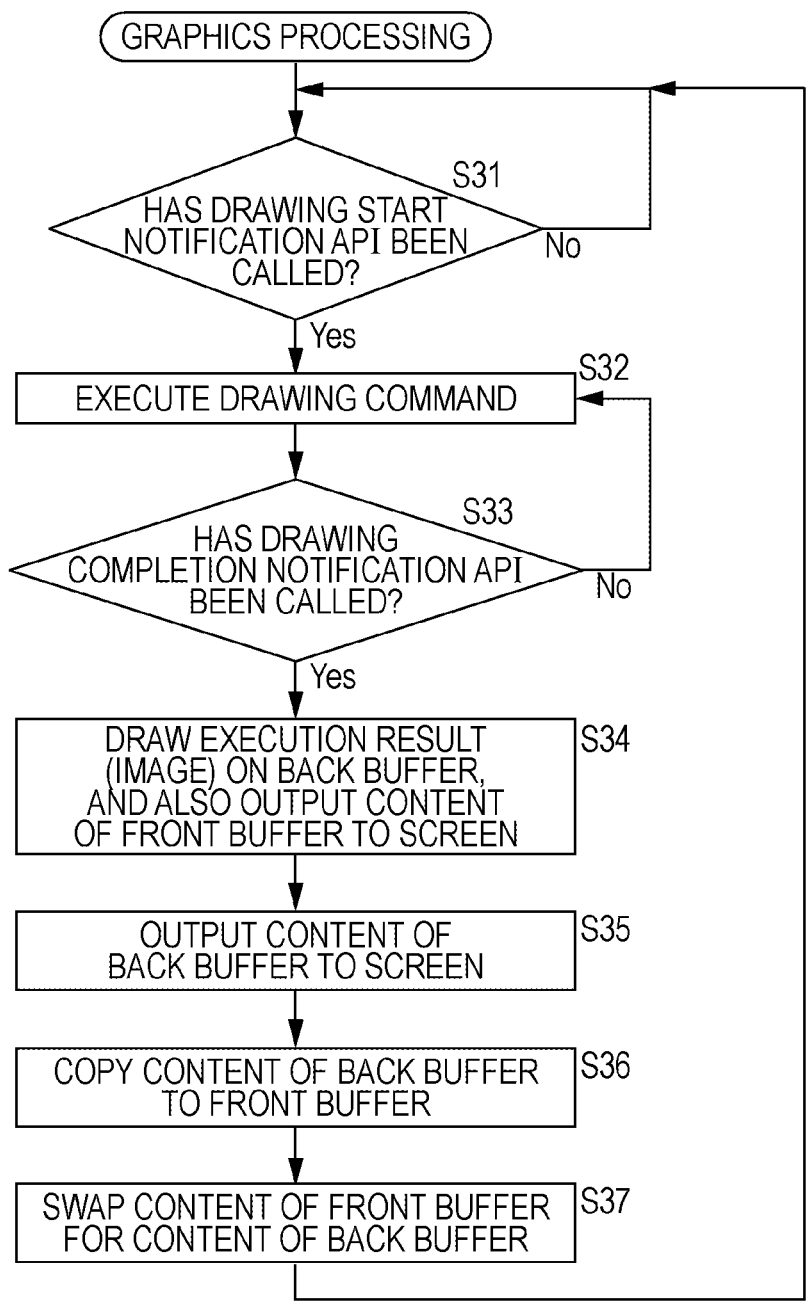
FIG. 37 is a flowchart for describing graphics processing by a 3D-compatible player.

FIG. 37 is a flowchart for describing the graphics processing by the 3D-compatible player in FIG. 34, in the event that the BD-J application performs call-up of the drawing start notification API, and the subsequent call-up of the drawing completion notification API.

In step S31 the 3D-compatible player determines whether or not call-up of the drawing start notification API has been performed from the BD-J application, and in the event that determination is made that call-up of the drawing start notification API has not been performed, returns to step S31.

Also, in the event that determination is made in step S31 that readout of the drawing start API has been performed, the 3D-compatible player awaits issuance of a drawing command from the BD-J application, proceeds to step S32, and executes the drawing command thereof.

Subsequently, in step S33 the 3D-compatible player determines whether or not call-up of the drawing completion notification API has been performed from the BD-J application.

In the case that determination is made in step S33 that call-up of the drawing completion notification API has not been performed, the 3D-compatible player awaits issuance of a drawing command from the BD-J application, and returns to step S32, and thereafter, the same processing is repeated.

Also, in the case that determination is made in step S33 that call-up of the drawing completion notification API has been performed, the 3D-compatible player proceeds to step S34, draws graphics images obtained as the execution result of the drawing command on the back buffer, and also outputs the graphics images stored in the front buffer to the display screen (output for display).

Subsequently, in step S35 the 3D-compatible player outputs the graphics images stored in the back buffer to the display screen as substitute for the front buffer (output for display).

Subsequently, in step S36 the 3D-compatible player copies the graphics images stored in the back buffer to the front buffer.

Subsequently, in step S37 the 3D-compatible player switches the back buffer and the front buffer, returns to step S31, and thereafter, the same processing is repeated.

As described above, with the 3D-compatible player, in the event of call-up of the drawing start notification API for starting drawing of graphics images, and the subsequent call-up of the drawing completion notification API for notifying that drawing of graphics images has been completed, as to the graphics plane 11 (serving as the back buffer), being performed from the BD-J application, the images drawn on the graphics plane 11 are output for display.

Accordingly, after notification that drawing of graphics images by the BD-J application has been completed being performed, the images drawn on the graphics plane 11 can be displayed, and accordingly, the image for the left eye and the image for the right eye in a mismatched state can be prevented from being displayed on the display screen.

Pixel Coordinate System for Background

The pixel coordinate system effective for the stereo background configuration (configuration for displaying background 3D images) is one of the following.

(0, 0)-(1920, 2160)
(0, 0)-(1280, 1440)
(0, 0)-(720, 960)
(0, 0)-(720, 1152)

The top half (top-half) is assigned to L background view, and the bottom half (bottom-half) is assigned to R background view.

Note that the format of background images (Contents format) is one of single color (Single-color), JPEG (JFIF), and MPEG2 drip-feed, and in the case that the format is the MPEG2 drip-feed, background images have to be SD images (SD video only).

Also, JPEG (JFIF) images of 1920×2160 pixels, 1280×1440 pixels, 720×960 pixels, or 720×1152 pixels may be used as background images.

Focus Management

For example, in the case that widget based GUI (Graphical User Interface) or the like is employed as a graphics image, with the legacy player, multiple components which are children of a certain single container, making up the GUI, are incapable of having focus at once.

Also, with the legacy player, multiple root containers making up GUI are incapable of being made active at once (in a focused state).

Here, containers are components (parts) of a graphics image, and are capable of having parents (upper layers) and children (lower layers). A container having no parent but children alone is referred to as a root container.

Components are a kind of container, and are capable of having parents but cannot have children.

In the case that GUI serving as a graphics image is a 3D image, with each of an image for the left eye and an image for the right eye making up the 3D image thereof, the corresponding container has to be focused, and transition of the focus thereof needs to be performed in the same way (equally).

Specifically, in the case that, of the image for the left eye and the image for the right eye, a certain container making up one of the images is focused, but a container making up the other image corresponding to that container is not focused, a user who views a 3D image displayed with such an image for the left eye and an image for the right eye is caused to have uncomfortable feeling.

Thus, in order to prevent the user from having uncomfortable feeling, the 3D-compatible player performs focus management so as to have the same focus transition at the container of the image for the left eye and the container of the image for the right eye.

Figure 38:
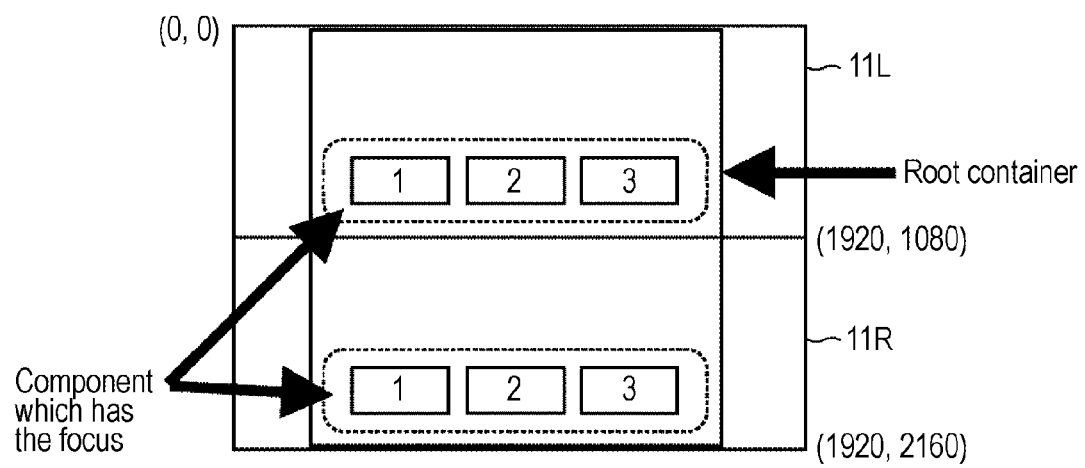
FIG. 38 is a diagram illustrating an example of GUI drawn on a graphics plane 11.

FIG. 38 illustrates an example of GUI drawn on the graphics plane 11.

The GUI in FIG. 38 is made up of every two corresponding components #1, #2, and #3, which make up one root container, and a child of the root container thereof.

Note that, in FIG. 38, the components #1, #2, and #3 drawn on the L graphics plane 11L make up an image for the left eye, and the components #1, #2, and #3 drawn on the R graphics plane 11R make up an image for the right eye.

For example, in the event that the component #i of the image for the left eye is focused, the component #i which is the corresponding component of the image for the right eye also has to be focused.

In order to make widget state transition/management symmetric between L and R, the 3D-compatible player handles this by causing the two containers or components to be focused simultaneously. Therefore, an instance of the containers or components needs to have a flag indicating whether or not focus is held so as to be manageable. Also, the third focus request has to be made to fail. That is to say, the number of containers or components holding focus is restricted to 0 or 2.

A focus method for causing two corresponding containers (components) of the image for the left eye and the image for the right eye to be focused includes a first focus method and a second focus method.

Figure 39:
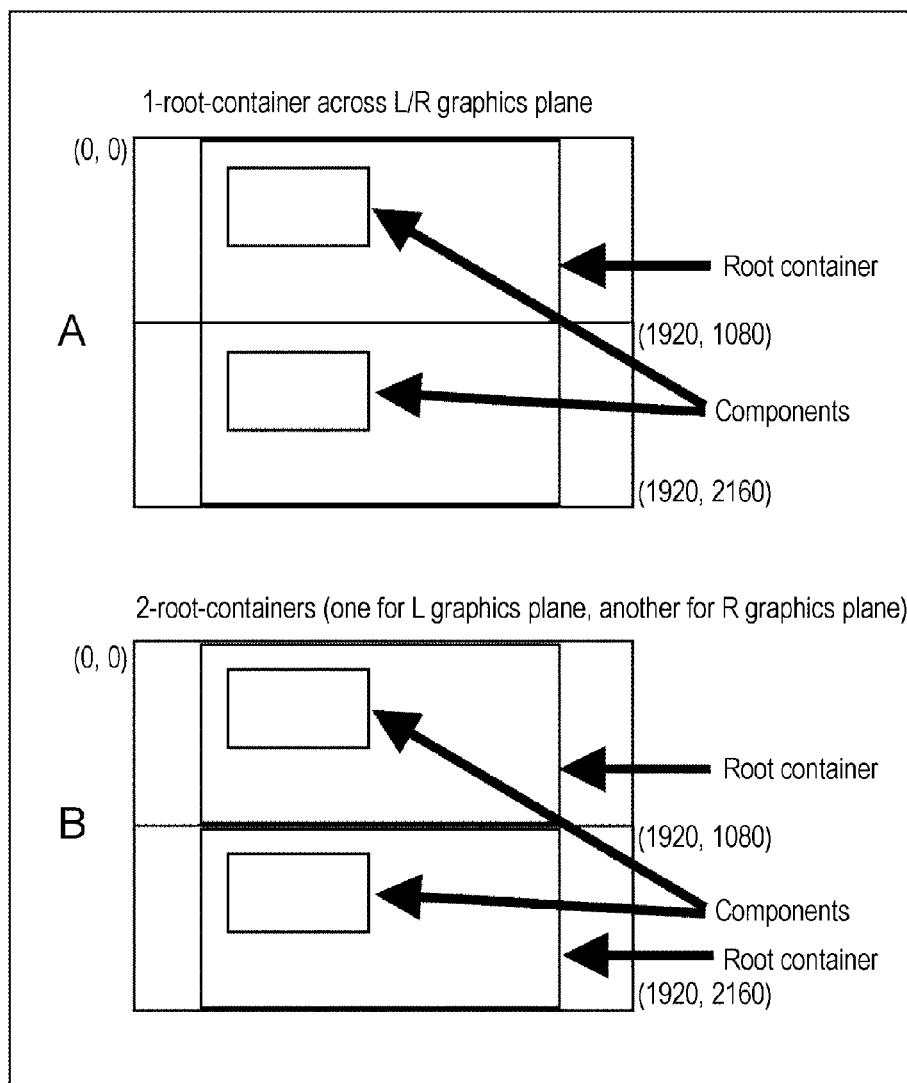
FIG. 39 is a diagram illustrating a first focus method and a second focus method.

FIG. 39 illustrates the first focus method and the second focus method.

A in FIG. 39 illustrates the first focus method (1-root-container across L/R graphics plane).

The first focus method causes two corresponding containers of a container (component) on the L graphics plane 11L and a container (component) on the R graphics plane 11R serving as children of a container (Root Container) straddling the L graphics plane 11L and the R graphics plane 11R to be focused simultaneously.

B in FIG. 39 illustrates the second focus method (2-root-containers (one for L graphics plane, another for R graphics plane)).

With the second focus method, a root container is drawn on each of the L graphics plane 11L and the R graphics plane 11R, and both of the root containers are activated (caused to be focused) simultaneously.

Figure 40:
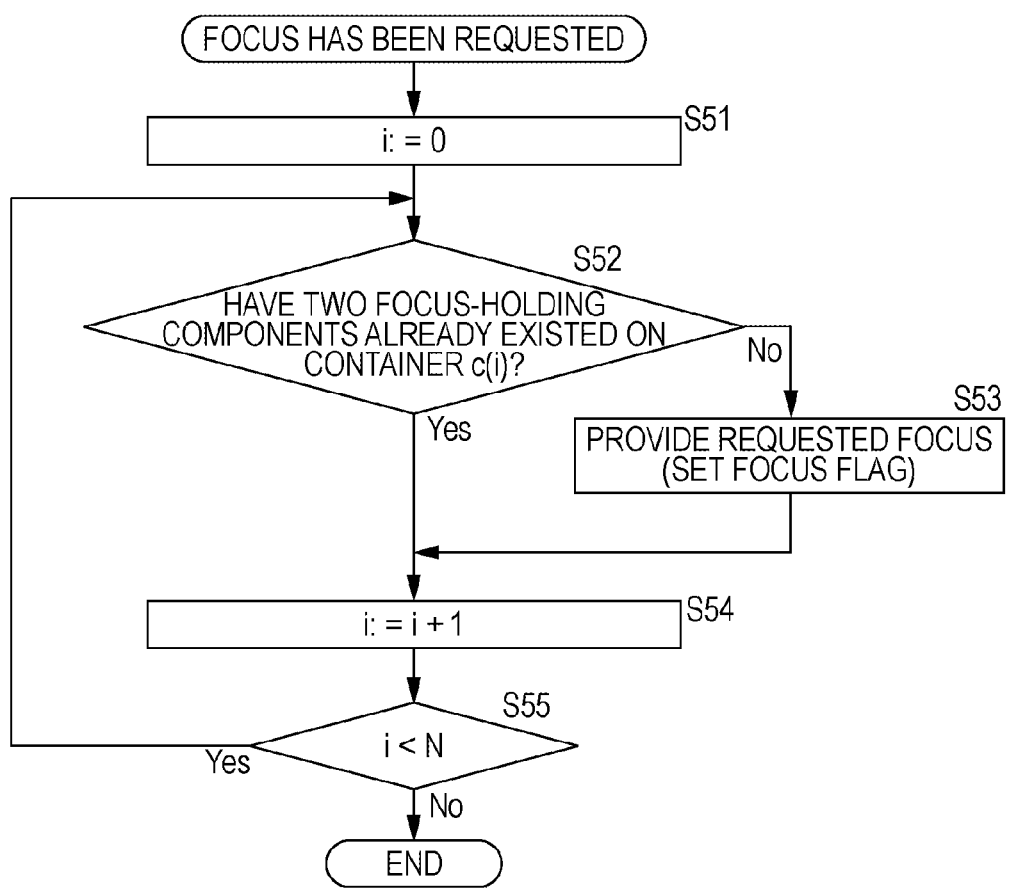
FIG. 40 is a flowchart for describing the focus management of a 3D-compatible player.

FIG. 40 is a flowchart for describing the focus management of the BD player in FIG. 3 which is a 3D-compatible player causing the two corresponding containers (components) of the image for the left eye and the image for the right eye to have focus.

Now, let us say that containers (components) making up GUI to be drawn on the graphics plane 11 have a focus flag representing whether or not the corresponding container (component) is focused.

Upon focus being requested, in step S51 the 3D-compatible player sets a variable i for counting the number of containers to 0 serving as an initial value.

Subsequently, in step S52 the 3D-compatible player determines whether or not there have already been two components in a focused state (hereafter, also referred to as focus holding components) of components (containers) which are the children of a container $c(i)$ on the graphics plane 11, based on the focus flag of each component.

In the case that determination is made in step S52 that there are not two focus holding components of the components serving as the children of the container $c(i)$, the 3D-compatible player proceeds to step S53, and causes the two corresponding components to have the requested focus. Further, in step S53, the 3D-compatible player sets a value to the effect that focus is held to the focus flag of each of the two components caused to be focused, and proceeds to step S54.

On the other hand, in the case that determination is made in step S52 that there are two focus holding components of the components serving as the children of the container $c(i)$, the 3D-compatible player skips step S53, proceeds to step S54, increments the variable i by one, and proceeds to step S55.

In step S55, the 3D-compatible player determines whether or not the variable i is less than the number of containers N on the graphics plane 11. In the case that determination is made in step S55 that the variable i is less than the number of containers N on the graphics plane 11, the 3D-compatible player returns to step S22, and the same processing is repeated Also, in the case that determination is made in step S55 that the variable i is not less than the number of containers N on the graphics plane 11, the processing ends.

As described above, in the case that two containers are not focused as to a focus request, the 3D-compatible player changes a container on the L graphics plane 11L (L region) storing the image for the left eye, and a container on the R graphics plane 11R (R region) storing the image for the right eye, which corresponds to that container, into a focused state.

Accordingly, for example, of containers making up a 3D image widget, the transition of focus can be set in the same way between a container of an image for the left eye and a container of an image for the right eye.

Handling of Mouse Events

In the case of Stereo graphics, the two-dimensional coordinates on the screen of a mouse cursor may be different coordinates on the L and R graphics planes. Accordingly, the BD-J application needs to perform coordinate conversion when describing processing dependent on mouse events, but an offset value for coordinate conversion differs for each implementation of a BD player, and accordingly, is unknown.

Figure 41:
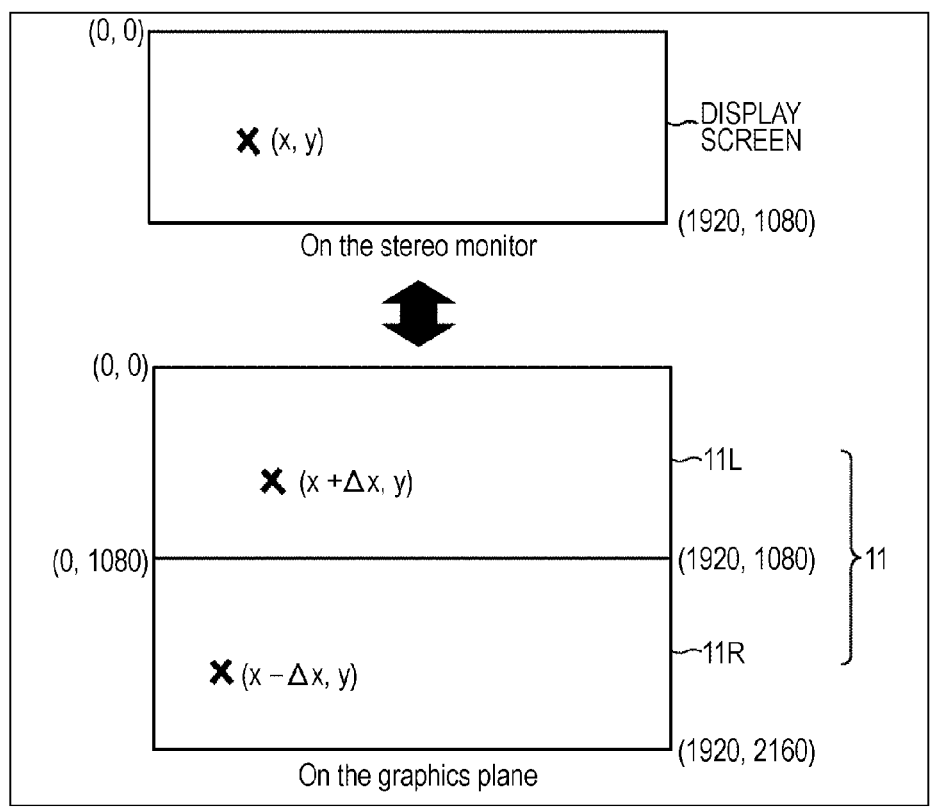
FIG. 41 is a diagram illustrating a position on a display screen and the position of a cursor on the graphics plane 11, whereby the 3D image of the cursor can be viewed.

Specifically, FIG. 41 illustrates a position on the display screen where the 3D image of the cursor of a pointing device, for example, such as a mouse or the like is seen, and cursor positions on the graphics plane 11.

A cursor is displayed by a BD player, but with the 3D-compatible player, it is desirable to display the 3D image of a cursor (so as to be viewable) in a position nearer than a graphics 3D image (3D image to be played from the disc 100).

On the other hand, in the case of displaying the cursor using a 3D image, the cursor of an image for the left eye on the logical screen 21 is in a position $(x+\Delta x, y)$ shifted by a certain offset value $\Delta x$ from a position $(x, y)$ on the display screen where the 3D image of the cursor can be seen, and the cursor of an image for the right eye on the logical screen 21 is also in a position $(x-\Delta x, y)$ shifted by a certain offset value $\Delta x$ from the position $(x, y)$ on the display screen where the 3D image of the cursor can be seen.

Here, a position in the depth direction of the 3D image of the cursor is changed according to the certain offset value $\Delta x$.

With the 3D-compatible player, in the case of displaying the 3D image of the cursor in a position nearer than a graphics 3D image, a value max-depth representing the nearest position in the depth direction (Z direction) of the graphics 3D image is necessary. However, with the 3D-compatible player, it is difficult to compute the value max-depth from the graphics 3D image.

Therefore, for example, the value max-depth is recorded beforehand in the disc 100 (FIG. 3) which is BD, and the 3D-compatible player can set (store) the value max-depth thereof to the PSR (FIG. 7) (e.g., PSR#21).

In this case, the 3D-compatible player (or display which displays the 3D image output by the 3D-compatible player) can obtain the offset value $\Delta x$ for displaying the cursor on nearer side than the position represented with the value max-depth with reference to the value max-depth stored in the PSR. Subsequently, the 3D image of the cursor can be displayed in a position nearer than the graphics 3D image.

Note that OSD (On Screen Display) that the 3D-compatible player displays can also be displayed in a position nearer than the graphics 3D image in the same way as with the cursor.

Also, a value min-depth representing the deepest side position in the depth direction of a 3D image to be played from the disc 100 which is BD is recorded beforehand in the disc 100 (FIG. 3) which is BD along with the value max-depth, whereby the value max-depth and the value min-depth can be set to the PSR (FIG. 7).

As described above, with the 3D-compatible player, the value max-depth representing the nearest side position in the depth direction of the 3D image recorded in the disc 100 which is BD, and the like are set to the PSR, whereby the cursor and OSD can be displayed on nearer side than the 3D image to be played from the BD.

Incidentally, the 3D-compatible player can arbitrarily set the offset value Δx for displaying the 3D image of the cursor. Also, it is not necessary for the offset value Δx to be constant, and for example, may be changed (set) for each frame.

Accordingly, upon employing the position (x, y) of the display screen as the position of the cursor when the 3D-compatible player issues an event with the cursor position as an argument as to the BD-J application, the BD-J application has to perform coordinate conversion of the position (x, y) of the display screen thereof to obtain a cursor position (x+Δx, y) (or (x−Δx, y)) on the graphics plane 11.

However, in order to perform coordinate conversion of the position (x, y) of the display screen, the BD-J application needs to recognize the offset value Δx, and it is difficult for the BD-J application to recognize the offset value Δx that the 3D-compatible player can arbitrarily set.

Therefore, the coordinate system of mouse events is restricted to only on the L graphics plane. The BD player is obligated to employ coordinates on the L graphics plane as the two-dimensional position information at the time of issuing a mouse event.

Specifically, with the 3D-compatible player, for example, the 3D image of the cursor of a pointing device such as a mouse is configured of an image for the left eye, and an image for the right eye, but as the cursor position at the time of issuing an event with the cursor position as an argument, one of the L graphics plane 11L (L region) and the R graphics plane 11R (R region) of the graphics plane 11, of the 3D image of the cursor, e.g., a position on the L graphics plane 11L (L region) is used.

Thus, the BD-J application can know (recognize) a position on the L graphics plane 11L as the cursor position of a 3D image, and accordingly, the author of the BD-J application can describe processing as to an event (mouse event or the like) with the cursor position as an argument using the position on the L graphics plane 11L as the cursor position.

Drawing Operations

The 3D-compatible player has to ensure matching between L-view and R-view. Specifically, the 3D-compatible player has to ensure that the image for the left eye and the image for the right eye of graphics are drawn in a matched state as to the graphics plane 11 (so as to be viewable as a 3D image), and are then displayed on the display screen.

Initialization (reset) of the graphics plane 11 is similarly performed. Specifically, in the case of initializing one of the L graphics plane 11L and the R graphics plane 11R of the graphics plane 11, the other has to also be initialized.

However, the author of the BD-J application has a responsibility (authoring responsibility) for meaningful matching between L-view and R-view, i.e., matching of image contents between the image for the left eye and the image for the right eye of graphics.

Figure 42:
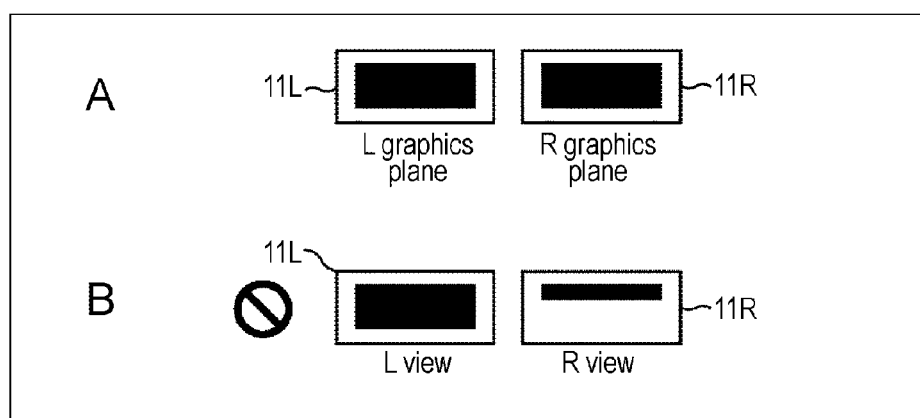
FIG. 42 is a diagram for describing matching between the image for the left eye and the image for the right eye of a graphics.

FIG. 42 is a diagram for describing matching between the image for the left eye and the image for the right eye of graphics.

A in FIG. 42 illustrates the image for the left eye and the image for the right eye of graphics drawn in a matched state.

In A in FIG. 42, drawing of the image for the left eye as to the L graphics plane 11L, and drawing of the image for the right eye as to the R graphics plane 11R have been completed, and thus after completion of drawing, the 3D-compatible player has to display the image for the left eye and the image for the right eye on the display screen.

Note that the drawing integrity guarantee API described with reference to FIG. 35 takes a drawing command train as an argument, but the drawing command train that is an argument of the drawing integrity guarantee API thereof has to be a drawing command train for drawing an image for the left eye and an image for the right eye in a matched state (so as to be viewable as a 3D image), and according to such drawing integrity guarantee API, it is ensured that the image for the left eye and the image for the right eye of graphics are drawn in a matched state.

B in FIG. 42 illustrates the image for the left eye and the image for the right eye of graphics in a mismatched state.

In B in FIG. 42, drawing of the image for the left eye as to the L graphics plane 11L has been completed, but drawing of the image for the right eye as to the R graphics plane 11R has not been completed.

The 3D-compatible player does not have to display the image for the left eye and the image for the right eye in the state in B in FIG. 42 on the display screen.

Matching between the image for the left eye and the image for the right eye of graphics can be ensured, for example, by employing triple buffering at the 3D-compatible player.

Figure 43:
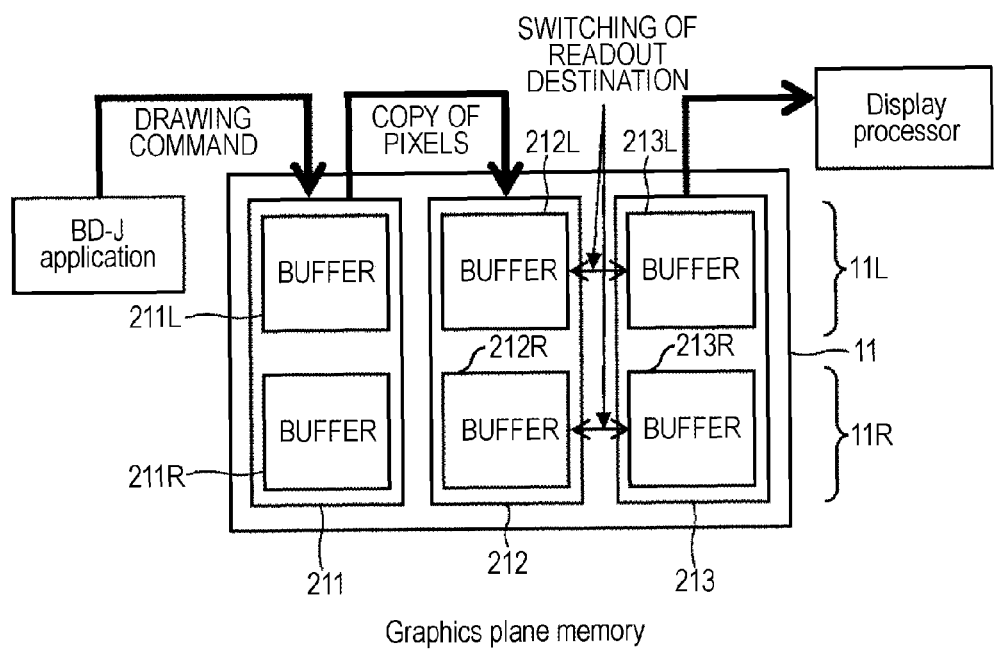
FIG. 43 is a block diagram illustrating a functional configuration example of a 3D-compatible player.

FIG. 43 is a block diagram illustrating a functional configuration example of the BD player in FIG. 3 which is a 3D-compatible player employing triple buffering.

The 3D-compatible player includes a back buffer (hidden buffer) 211 serving as the graphics plane 11, front buffers 212 and 213.

The back buffer 211 is configured of buffers 211L and 211R. The front buffer 212 is configured of buffers 212L and 212R, and the front buffer 213 is configured of buffers 213L and 213R.

Note that, in FIG. 43, the buffers 211L, 212L, and 213L are equivalent to the L graphics plane 11L, and store an image for the left eye. The buffer 211R, 212R, and 213R are equivalent to the R graphics plane 11R, and store an image for the right eye.

The BD-J application issues a drawing command, and the 3D image (image for the left eye and image for the right eye) of graphics serving as a result of execution of the drawing command thereof is drawn on the back buffer 211.

On the other hand, the front buffers 212 and 213 are alternately selected, and the image for the left eye and the image for the right eye stored in the buffer which is the selected one (hereafter, also referred to as selected buffer) are displayed on the display screen (supplied to Display processor).

After completion of drawing of the image for the left eye and the image for the right eye as to the back buffer 211, the image for the left eye and the image for the right eye stored (drawn) in the back buffer 211 thereof are copied to the unselected one of the front buffers 212 and 213.

Switching of selection for alternately selecting the front buffers 212 and 213 as a selected buffer is executed at timing of VBI (Vertical Blanking Interval) after readout (copy) of the image for the left eye and the image for the right eye from the back buffer is completed up to the last horizontal line to prevent occurrence of tearing artifacts.

Frame Accurate Animation

FAA (Frame Accurate Animation) includes two of Image Frame Accurate Animation and Sync Frame Accurate Animation, but in order to operate an image for the left eye and an image for the right eye used for animation synchronously (for the sake of L/R synchronization) with the 3D-compatible player, it is desirable to individually perform drawing of the image for the left eye for animation, and drawing of the image for the right eye for animation even with any of Image Frame Accurate Animation and Sync Frame Accurate Animation (to operate animation at two places simultaneously).

That is to say, with the legacy player, animation is operated only at one place. In the event of using an image or buffer so as to straddle L and R, animation operation can be performed at two places in a pseudo manner, but a sufficient animation frame rate is not output due to performance demands on the BD player side.

Figure 44:
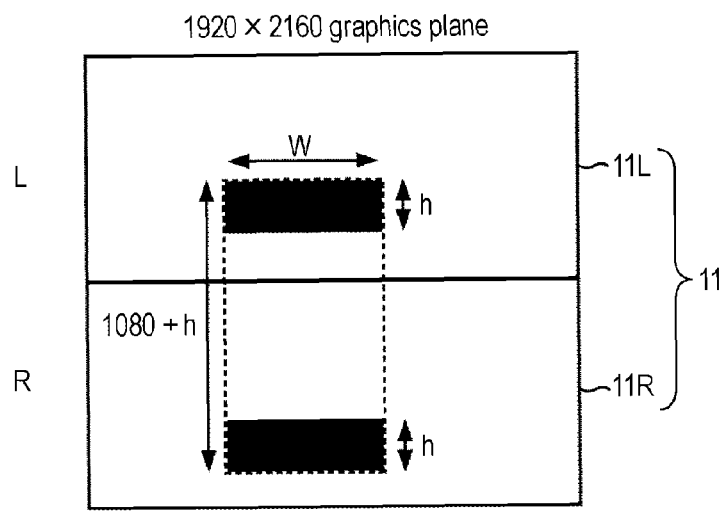
FIG. 44 is a diagram illustrating an image that straddles an L graphics plane 11L and a R graphics plane 11R.

FIG. 44 is a diagram for describing animation by an image straddling L and R.

In FIG. 44, a single image of w×(h+1080) pixels is drawn straddling the L graphics plane 11L and the R graphics plane 11R of the graphics plane 11 of 1920×2160 pixels.

In FIG. 44, of the image of w×(h+1080) pixels, a portion excluding the upper portion of a w×h-pixel image and the lower portion of a w×h-pixel image (central portion) is filled with transparent pixels (transparent color), whereby the upper portion of a w×h-pixel image can be taken as the image for the left eye for animation and the lower portion of a w×h-pixel image can be taken as the image for the right eye for animation.

That is to say, the central portion of the single image in FIG. 44 is filled with transparent color, whereby appearance when viewing the single image can be set to a state in which the w×h-pixel image is drawn on the same position of the L graphics plane 11L and the R graphics plane 11R. Accordingly, 3D image animation can be realized wherein the w×h-pixel image on the L graphics plane 11L, and the w×h-pixel image on the R graphics plane 11R are operated synchronously.

However, in FIG. 44, regardless of the image for the left eye and the image for the right eye used for animation being the w×h-pixel images, drawing of a huge single image of w×(h+1080) pixels needs to be performed.

As a result, it may take time to draw the image depending on the performance of the BD player, and it is difficult to display 3D image animation with a sufficient frame rate.

Therefore, with the 3D-compatible player, drawing of the image for the left eye for animation, and drawing of the image for the right eye for animation are individually performed.

Figure 45:
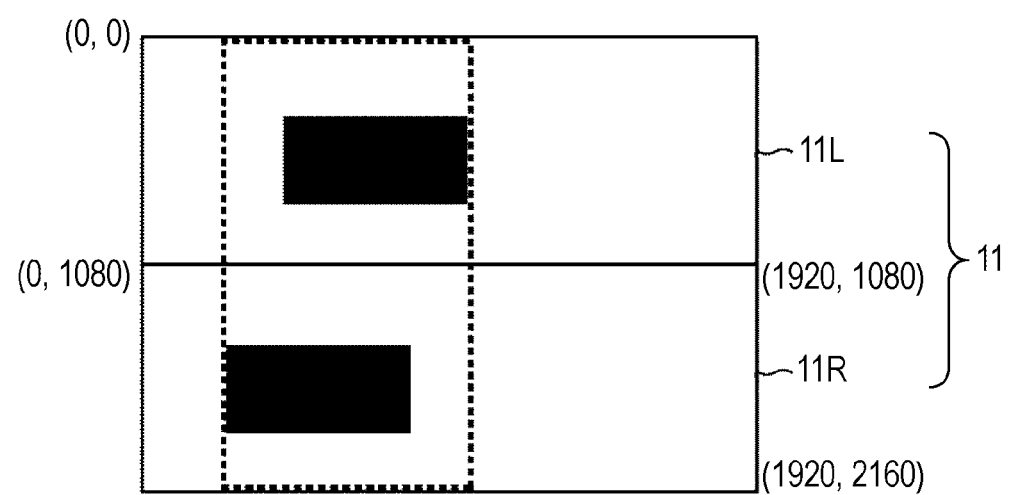
FIG. 45 is a diagram illustrating drawing of an image for the left eye for animation, and drawing of an image for the right eye for animation.

FIG. 45 is a diagram illustrating drawing of the image for the left eye for animation, and drawing of the image for the right eye for animation.

With the 3D-compatible player, the image for the left eye for animation is drawn on the L graphics plane 11L (L region). Further, with the 3D-compatible player, the image for the right eye for animation is drawn on the R graphics plane 11R (R region) separately from drawing of the image for the left eye for animation as to the L graphics plane 11L (L region).

Thus, drawing of the image for the left eye and the image for the right eye used for animation can rapidly be performed, and as a result thereof, 3D image animation can be displayed with a sufficient frame rate.

Figure 46:
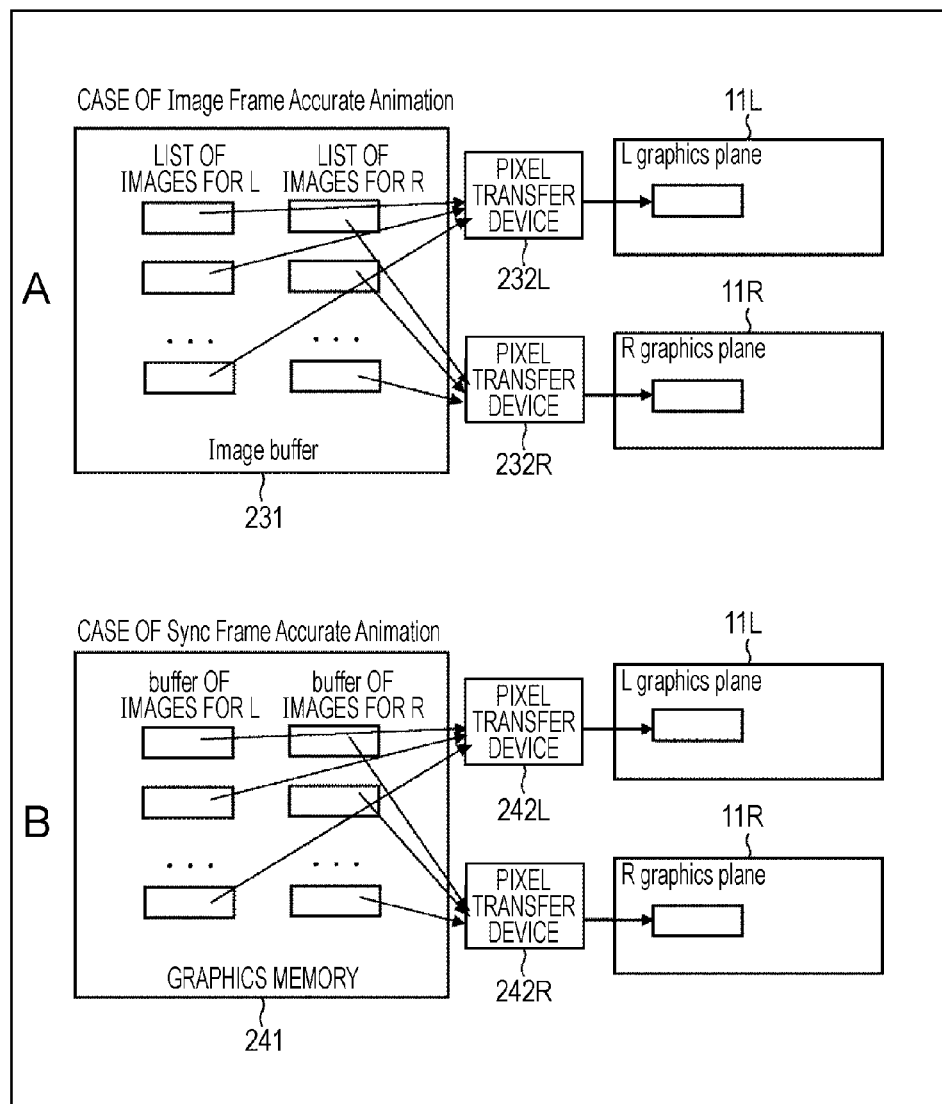
FIG. 46 is a block diagram illustrating a functional configuration example of a 3D-compatible player.

FIG. 46 is a block diagram illustrating a functional configuration example of the BD player in FIG. 3 which is a 3D-compatible player for individually performing drawing of the image for the left eye for animation as to the L graphics plane 11L, and drawing of the image for the right eye for animation as to the R graphics plane 11R.

A in FIG. 46 illustrates a configuration example of a 3D-compatible player for drawing animation as Image Frame Accurate Animation.

An image buffer 231 is a buffer serving as cache memory for a BD-J application loading and saving a resource from the disc 100 (FIG. 3) which is BD, and stores a list of images for the left eye for animation (list of images for L), and a list of images for the right eye for animation (list of images for R).

A pixel transfer device 232L sequentially reads out images for the left eye for animation from the image buffer 231 in increments of pixels to draw these on the L graphics plane 11L.

A pixel transfer device 232R sequentially reads out images for the right eye for animation from the image buffer 231 in increments of pixels to draw these on the R graphics plane 11R.

B in FIG. 46 illustrates a configuration example of a 3D-compatible player for drawing animation as Sync Frame Accurate Animation.

Graphics memory 241 is work memory of the 3D-compatible player, and is configured of a buffer storing images for the left eye for animation (buffer for images for L), and a buffer storing images for the right eye for animation (buffer for images for R).

A pixel transfer device 242L sequentially reads out images for the left eye for animation from the graphics memory 241 in increments of pixels to draw these on the L graphics plane 11L.

A pixel transfer device 242R sequentially reads out images for the right eye for animation from the graphics memory 241 in increments of pixels to draw these on the R graphics plane 11R.

Now, definition of extended API of Image Frame Accurate Animation is illustrated in FIG. 47.

Also, definition of extended API of Sync Frame Accurate Animation is illustrated in FIG. 48.

Further, sample code of Image Frame Accurate Animation is illustrated in FIGS. 49 and 50. Note that FIG. 50 is a diagram continued on FIG. 49.

Also, sample code of Sync Frame Accurate Animation is illustrated in FIGS. 51 and 52. Note that FIG. 52 is a diagram continued on FIG. 51.

Now, the embodiments of the present invention are not restricted to the above-mentioned embodiment, and various modifications can be performed without departing from the essence of the present invention.

That is to say, with the present embodiment, with the BD player in FIG. 3 which is a 3D-compatible player, processing has been carried out with a 3D image content or Java (registered trademark) application recorded in the disc 100 as an object, a 3D image content or Java (registered trademark) application which is a processing object at the 3D-compatible player is supplied from data supply means other than a recording medium such as the disc 100 or the like, and specifically, for example, an object carousel or data carousel that is a digital broadcasting application to the 3D-compatible player, and the 3D-compatible player can perform processing with the 3D image content or Java (registered trademark) application thereof to be supplied from the object carousel or data carousel as an object.

REFERENCE SIGNS LIST 10 logical plane
11 graphics plane
11L L graphics plane
11R R graphics plane
12 PG plane
12L L-PG plane
12R R-PG plane
13 video plane
13L L video plane
13R R video plane
14 background plane
14L L background plane
14R R background plane
15 mixer
21 logical screen
101 bus
102 CPU
103 ROM
104 RAM
105 hard disk
106 output unit
107 input unit
108 communication unit
109 drive
110 input/output interface
111 removable recording medium
201L, 201R, 202L, 202R buffer
211 back buffer
211L, 211R, 212 front buffer
212L, 212R buffer
213 front buffer
213L, 213R buffer
231 image buffer
232L, 232R pixel transfer device
241 graphics memory
242L, 242R pixel transfer device

The invention claimed is:

1. An information processing device, wherein a video plane for storing a video image corresponds to a storage region for images corresponding to two screens, the storage region being configured as an L region to store an image for a left eye corresponding to one screen and an R region to store an image for a right eye corresponding to one screen,
wherein a configuration of said video plane is defined for the entire video plane as the storage region for the images corresponding to the two screens,
wherein as video modes which are modes for reproducing the video image, there are defined
a stereo video mode to store, in a case that said video image is a stereoscopic image that is a 3D image, said image for the left eye and said image for the right eye making up said stereoscopic image in said L region and said R region of said video plane respectively,
a flattened stereo video mode to store, in an event that said video image is said stereoscopic image, only one of said image for the left eye and said image for the right eye making up said stereoscopic image in both of said L region and said R region of said video plane,
wherein as PG streams of a PG (Presentation Graphics) image, there are defined
a stereo PG stream that is a PG stream of said PG image of a stereoscopic image that is a 3D image, and
a PG stream for offset that is a PG stream of said PG image of a monoscopic image to be used for generating a stereoscopic image along with an offset value that is data for giving disparity to said monoscopic image that is a 2D image;
wherein the information processing device comprises:
at least one processor programmed to act as a stream selecting API (Application Programming Interface) for selecting said stereo PG stream or said PG stream for offset,
wherein said PG stream for offset is selectable via the stream selecting API in an event that said video mode is set to said flattened stereo video mode or said stereo video mode;
wherein said stereo PG stream is selectable via the stream selecting API in an event that said video mode is set to said flattened stereo video mode, or said stereo video mode; and
wherein in an event that said video mode is set to said flattened stereo video mode, said stereo PG stream is selected via the stream selecting API, and there is said PG stream for offset available, said offset value is set to 0 and said monoscopic image corresponding to the PG stream for offset thereof is reproduced.

2. An information processing method, wherein a video plane for storing a video image corresponds to a storage region for images corresponding to two screens, the storage region being configured as an L region to store an image for a left eye corresponding to one screen and an R region to store an image for a right eye corresponding to one screen,
wherein a configuration of said video plane is defined for the entire video plane which is a storage region for images corresponding to the two screens,
wherein as video modes which are modes for reproducing the video image, there are defined
a stereo video mode to store, in a case that said video image is a stereoscopic image that is a 3D image, said image for the left eye and said image for the right eye making up said stereoscopic image in said L region and said R region of said video plane respectively,
a flattened stereo video mode to store, in an event that said video image is said stereoscopic image, only one of said image for the left eye and said image for the right eye making up said stereoscopic image in both of said L region and said R region of said video plane,
wherein as PG streams of a PG (Presentation Graphics) image, there are defined
a stereo PG stream that is a PG stream of said PG image of a stereoscopic image which is a 3D image, and
a PG stream for offset that is a PG stream of said PG image of a monoscopic image to be used for generating a stereoscopic image along with an offset value that is data for giving a disparity to said monoscopic image that is a 2D image;
wherein the information processing method comprises the step of:
selecting, via a stream selecting API (Application Programming Interface) said stereo PG stream or said PG stream for offset,
wherein said PG stream for offset is selectable via the stream selecting API in an event that said video mode is set to said flattened stereo video mode or said stereo video mode; and
wherein said stereo PG stream is selectable via the stream selecting API in an event that said video mode is set to said flattened stereo video mode, or said stereo video mode; and
wherein in an event that said video mode is set to said flattened stereo video mode, said stereo PG stream is selected via the stream selecting API, and there is said PG stream for offset available, said offset value is set to 0 and said mono image corresponding to the PG stream for offset thereof is reproduced.

3. At least one non-transitory computer-readable storage medium having encoded thereon executable instructions that, when executed by at least one computing device, cause the at least one computing device to carry out a method, wherein a video plane for storing a video image corresponds to a storage region for images corresponding to two screens, the storage region being configured as an L region to store an image for a left eye corresponding to one screen and an R region to store an image for a right eye corresponding to one screen, wherein a configuration of said video plane is defined for the entire video plan as the storage region for the images corresponding to the two screens, wherein as video modes which are modes for reproducing the video image, there are defined a stereo video mode to store, in a case that said video image is a stereoscopic image that is a 3D image, said image for the left eye and said image for the right eye making up said stereoscopic image in said L region and said R region of said video plane respectively, a flattened stereo video mode to store, in an event that said video image is said stereoscopic image, only one of said image for the left eye and said image for the right eye making up said stereoscopic image in both of said L region and said R region of said video plane, wherein as PG streams of a PG (Presentation Graphics) image, there are defined a stereo PG stream that is a PG stream of said PG image of a stereoscopic image which is a 3D image, and a PG stream for offset that is a PG stream of said PG image of a monoscopic image to be used for generating a stereoscopic image along with an offset value that is data for giving a disparity to said monoscopic image that is a 2D image;

wherein the method comprises:

selecting, via a stream selecting API (Application Programming Interface) said stereo PG stream or said PG stream for offset, wherein said PG stream for offset is selectable via the stream selecting API in an event that said video mode is set to said flattened stereo video mode or said stereo video mode; and wherein said stereo PG stream is selectable via the stream selecting API in an event that said video mode is set to said flattened stereo video mode, or said stereo video mode; and wherein in an event that said video mode is set to said flattened stereo video mode said stereo PG stream is selected, and there is said PG stream for offset available , said offset value is set to 0 and said monoscopic image corresponding to the PG stream for offset thereof is reproduced.

* * * * *